United States Patent [19]

Stolfo et al.

[11] Patent Number: 4,860,201
[45] Date of Patent: Aug. 22, 1989

[54] BINARY TREE PARALLEL PROCESSOR

[75] Inventors: Salvatore J. Stolfo, Ridgewood, N.J.; Daniel P. Miranker, Austin, Tex.

[73] Assignee: The Trustees of Columbia University in the City of New York, New York, N.Y.

[21] Appl. No.: 902,547

[22] Filed: Sep. 2, 1986

[51] Int. Cl.⁴ .............................................. G06F 13/00
[52] U.S. Cl. .............................. 364/200; 364/227.11; 364/231.9
[58] Field of Search ... 364/200 MS File, 900 MS File

[56] References Cited

U.S. PATENT DOCUMENTS

| | | | |
|---|---|---|---|
| 4,101,960 | 7/1978 | Stokes et al. | 364/200 |
| 4,247,892 | 1/1981 | Lawrence | 364/200 |
| 4,251,861 | 2/1981 | Mago | 364/200 |
| 4,344,134 | 8/1982 | Barnes | 364/200 |
| 4,388,683 | 6/1983 | Beifuss et al. | 364/200 |
| 4,435,758 | 3/1984 | Lorie et al. | 364/200 |
| 4,466,060 | 8/1984 | Riddle | 364/200 |
| 4,543,630 | 9/1985 | Neches | 364/200 |
| 4,583,164 | 4/1986 | Tolle | 364/200 |
| 4,622,632 | 11/1986 | Tanimoto et al. | 364/200 |
| 4,633,431 | 12/1986 | Bar | 364/900 |

OTHER PUBLICATIONS

D. P. Miranker, 11/15/83, "Performance Analysis of Two Competing DADO PE Designs".
S. Taylor, 7/29/83, "Prolog on the DADO Machine: A Parallel System for High-Speed Logic Programming".
S. J. Stolfo, Mar. 1982, "A Tree-Structured Machine Architecture for Production Systems".
S. J. Stolfo, Aug. 15, 1983, "The DADO Parallel Computer".
S. J. Stolfo, 9/15/80, "Learning Control of Production Systems".
M. van Biema, 2/6/84, "PSL: A Parallel Lisp for the DADO Machine".
M. D. Lerner, 2/4/85, "LISP Compiler for the DADO Parallel Computer".
S. J. Stolfo, 2/29/84, "PPL/M: The System Level Language for Programming the DADO Machine".
S. Alterman, 4/15/85, "The Application of the AI and DADO Parallel Processor Technology to Future Unmanned Vehicle Systems".

(List continued on next page.)

*Primary Examiner*—Eddie P. Chan
*Assistant Examiner*—Adolfo Ruiz
*Attorney, Agent, or Firm*—Brumbaugh, Graves, Donohue & Raymond

[57] ABSTRACT

A plurality of parallel processing elements are connected in a binary tree configuration, with each processing element except those in the highest and lowest levels being in communication with a single parent processing element as well as first and second (or left and right) child processing elements. Each processing element comprises a processor, a read/write or random access memory, and an input/output (I/O) device. The I/O device provides interfacing between each processing element and its parent and children processing elements so as to provide significant improvements in propagation speeds through the binary tree. The I/O device allows the presently preferred embodiment of the invention to be clocked at 12 megahertz, producing in the case of a tree of 1023 processors, each having an average instruction cycle time of 1.8 µs, a system with a raw computational throughput of approximately 570 million instructions per second. The I/O device communicates data and queries from the root processing element to all other N processing elements in the array in one processor instruction cycle instead of in O($\log_2 N$) processor instruction cycles as in prior art binary tree arrays. Primitive queries are executed in parallel by each processing element and the results made available for reporting back to the root processing element. In several important cases, these results can be combined and reported back to the root processing element in a single processor instruction cycle instead of in O($\log_2 N$) processor instruction cycles as in prior art binary tree arrays. Thus, the elapsed time for a broadcast and report operation is in effect a constant time regardless of the number of processors in the array.

9 Claims, 15 Drawing Sheets

OTHER PUBLICATIONS

P. Waldes, 4/16/85, "Are Maintenance Expert Systems Practical Now?".
S. J. Stolfo, 5/5/84, "Is CAD/CAM Ready for AI?".
S. J. Stolfo, 5/5/83, "Knowledge Engineering: Theory and Practice".
S. J. Stolfo, 10/15/83, "ACE: An Expert System Supporting Analysis and Management Decision Making".
M. D. Lerner, 6/12/85, "An Overview of the DADO Parallel Computer".
S. J. Stolfo, 6/6/85, "DADO: A Parallel Computer for Artificial Intelligence".
S. J. Stolfo, 10/29/84, "The DADO Production System Machine".
S. J. Stolfo, 8/15/84, "DADO: A Parallel Processor for Expert Systems".
S. J. Stolfo, 1/18/83, "Architecture and Applications of DADO: A Large Scale Parallel Computer for Artificial Intelligence".
S. J. Stolfo, Apr., 1981, "Specialized Hardware for Production Systems".
S. J. Stolfo, 8/15/84, "Five Parallel Algorithms for Production System Execution on the DADO Machine".
S. J. Stolfo, 4/16/85, "More Rules May Mean Faster Execution".
S. J. Stolfo, 4/16/85, "A Simple Preprocessing Scheme to Extract and Balance Implicit Parallelism in the Concurrent Match of Production Rules".
T. Ishida, 10/25/84, "Towards the Parallel Execution of Rules in Production System Programs".
D. P. Miranker, 4/9/84, "Performance Estimates for the DADO Machine: A Comparison of TREAT and RETE".
A. Lowery, 10/15/84, "LPS Algorighms".
A. Lowery, 3/15/84, "LPS Algorithms: A Detailed Examination".
A. Lowery, 3/15/84, "LPS Algorithms: A Critical Analysis".
S. Taylor, 2/1/84, "Logic Programming Using Parallel Associative Operations".
S. J. Stolfo, 1/1/85, "On the Design of Parallel Production System Machines: What's in a LIP?".
T. Ishida, 3/28/84, "Simultanieous Firing of Production Rules on Tree Structured Machines".
S. J. Stolfo, 3/15/82, "DADO: A Tree-Structured Machine Architecture for Production Systems".
Chuan-Lin Wu and Tse-vun Feng, "Interconnection Networks for Parallel and Distributed Processing", (IEEE 1984).
S. A. Browning, "Computations on a Tree of Processors", Proc. VLSI Conf., California Institute of Technology/Pasedena, Jan. 22–24, 1979.
A. M. Despain et al., "The Computer as a Component", (Unpublished 1979).
G. A. Mago, "A Cellular Language-Directed Computer Architecture", Proc. VLSI Conf., California Institute of Technology, Jan. 22–24, 1979.
R. J. Swan et al., "The Structure and Architecture of Cm*: A Modular Multi-Microprocessor," Proc. 1977 NCC, (Jun., 1977).
J. R. Goodman, "Hypertree: A Multiprocessor Interconnection Topology", IEEE Trans. on Computers, vol. C-30, No. 12, pp. 923–933, (Dec., 1981), reprinted in the above-cited Wu and Feng reference at pp. 46–56.
J. L. Bently and H. T. Kung, "Two Papers on a Tree-Structured Parallel Computer", Technical Report, Dept. of Computer Sciences Carnegie-Mellon University, Sep. 1979.
J. L. Bently, "Decomposable Searching Problems", Information Processing Letters, vol. 8, No. 5, pp. 244–250, (Jun. 1978).
Carlo H. Sequin, "Single-Chip Computers, the New VLSI Building Blocks", Proc. VLSI Conf., California Institute of Technology, Pasedena, Calif., Jan. 1979.

BINARY TREE PARALLEL PROCESSOR

The U.S. Government has a paid-up license in this invention and the right in limited circumstances to require the patent owner to license others on reasonable terms as provided for by the terms of contract No. N00039-82-C-0427 and No. N00039-84-C-0165 awarded by Defense Advanced Research Projects Agency.

CROSS-REFERENCE TO RELATED APPLICATION

A related application is "Parallel Processing Method", U.S. Ser. No. 903,031, filed concurrently herewith, which is incorporated herein by reference.

BACKGROUND OF THE INVENTION

This invention relates generally to data processing and more particularly to a binary tree-structured parallel processing machine employing a large number of processors, each such processor incorporating its own I/O device.

Throughout the history of the computer there has been a continuing demand to increase the throughput of the computer. Most of these efforts have concentrated on increasing the speed of operation of the computer so that it is able to process more instructions per unit time In serial computers, however, these efforts have in certain senses been self-defeating since all the processing is performed by a single element of the computer leaving most of the resources of the computer idle at any time.

In an effort to avoid some of these problems, special purpose machines such as array processors have been developed which are especially designed for the solution of special classes of problems. Unfortunately, while commercially successful in the performance of certain computational tasks, such computers fall far short of adequate performance in others.

In recent years substantial efforts have been made to increase throughput by operating a plurality of processors in parallel. See, for example, Chuan-lin Wu and Tse-yun Feng, *Interconnection Networks for Parallel and Distributed Processing* (IEEE 1984). One such parallel processor is that in which a plurality of processors are connected in a tree-structured network, typically a binary tree. S. A. Browning, "Computations on a Tree of Processors," *Proc. VLSI Conf.*, California Institute of Technology, Pasadena, Jan. 22-24, 1979; A. M. Despain et al., "The Computer as a Component", (1979 unpublished); A. Mago, "A Cellular Language-directed Computer Architecture," *Proc. VLSI Conf.*, California Institute of Technology, Jan. 22-24, 1979; R. J. Swan et al., "Cm*-A Modular, Multimicroprocessor", *Proc.* 1977 *NCC*, pp. 645-655 (June 1977); J. R. Goodman et al., "Hypertree: A Multiprocessor Interconnection Topology", *IEEE Trans. on Computers*, Vol. C-30, No. 12, pp. 923-933 (December 1981), reprinted in Wu and Feng at pp. 46-56; J. L. Bentley and H. T. Kung, "Two Papers on a Tree-Structured Parallel Computer", Technical Report, Dept. of Computer Science, Carnegie-Mellon University, Sept. 1979.

In a binary tree computer, a large number of processors are connected so that each processor except those at the root and leaves of the tree has a single parent processor and two children processors. The processors typically operate synchronously on data flowing to them from the parent processor and pass results to descendant processors.

Important problems in the storage and retrieval of data can be analyzed following J. L. Bentley, "Decomposable Searching Problems", *Information Processing Letters*, Vol. 8, No. 5, pp. 244-250 (June 1978). Bentley defines a static searching problem as one of preprocessing a set F of N objects into an internal data structure D and answering queries about the set F by analyzing the data structure D. Bentley defines three functions of N that characterize the complexity of the searching function: the amount of storage S required by D to store the N objects, the preprocessing time P required to form D in S, and the time Q required to answer a query by searching D.

An illustration of a problem that can be solved by such a database is the membership problem. In this case N elements of a totally ordered set F are preprocessed so that queries of the form "Is x in F?" can be answered quickly. The common solution for serial computers is to store F in a sorted array D and binary search. Thus, the membership problem can be computed on sequential computers with the following complexity: $S=N$; $P=O(N \log N)$; $Q=O(\log N)$.

Bentley defines a decomposable searching problem as one in which a query asking the relationship of a new object x to a set of objects F can be written as:

$$\text{Query}(x, F) = B \, q(x, f)$$

where B is the repeated application of a commutative, associative binary operator b that has an identity and q is a primitive query applied between the new object x and each element f of F. Hence the membership problem is a decomposable searching problem when cast in the form:

$$\text{Member}(x, F) = \text{OR equal}(x, f)$$

where OR is the logical function OR and equal is the primitive query "Is x equal to f?" applied between the object x and each element f of F.

The key idea about this type of problem is its decomposability. To answer a query about F, we can combine the answers of the query applied to arbitrary subsets of F.

This type of problem is well suited to quick execution in a parallel processing environment. The set F is partitioned into a number of arbitrary subsets equal to the number of available processors. The primitive query q is then applied in parallel at each processor between the unknown x that is communicated to all processors and the locally stored set element f. The results are then combined in parallel by $\log_2 N$ repetitions of the operator b, first performing b computations on N/2 adjacent pairs of processors, the b computations on N/4 pairs of results of the first set of computations and so on until a single result is obtained.

The complexity of this operation in the parallel processing environment is computed as follows. Each of the N elements of the set F must be distributed among the processors so that the N elements are distributed among all the processors. The number of time steps to do this equals the number of elements of the set. Thus, $P = O(N)$. If each element is stored in a different processor such that $S = N$, the time required to answer a primitive query is a single time step; and the time required to compute the final answer is the number of time steps required to report back through the binary tree which is $O(\log_2 N)$ Thus, $Q = O(1) + O(\log_2 N)$. Compared with the complexity of the membership problem when executed on a serial computer, the use of a parallel processor provides substantial savings in the preprocessing time required to build the data structure since there is no need to store the data structure in an ordered array.

Bentley and Kung proposed a specific tree structure illustrated in FIG. 1 which was designed to achieve throughputs on the order described above. As shown in FIG. 1, their tree structure comprises an array of processors P1–P10 organized into two binary trees that share leaf processors P4–P7. Data flows in one binary tree from root processor P1 to leaf processors P4–P7. Data is operated on at the leaf processors and the results flow in the second tree from leaf processors P4–P7 to root processor P10. Obviously, many more processors can be used in the array if desired.

To load data into each of leaf processors P4–P7 of FIG. 1, the data for each leaf processor is provided to the root processor P1 at successive time steps and is routed through the array to each leaf processor via intermediate processors P2 and P3. Thus, it takes at least one time step per leaf processor to load data into the leaf processors.

The data structure is queried by providing the query to root processor P1 and propagating the query in parallel to each leaf processor. The results of the query are then reported out through processors P8 and P9 to root processor P10 with each of these processors computing a result from two inputs higher up in the tree. As will be apparent, propagation times of the query and the result through the binary tree introduce significant delays in overall throughput comparable to those of a serial computer.

While the time required to answer a single query in the parallel processor is comparable to that in a serial computer, queries can sometimes be processed in pipeline fashion in the parallel processor while they cannot be in the serial computer. Thus, after $O(\log_2 N)$ steps, results begin to flow out of the parallel processor at a rate of one per time step. If the number of queries is large enough that the pipe filling and flushing times can be considered negligible, the complexity can be computed as: $S = N$, $P = O(N)$ and $Q = O(1)$.

There are, however, numerous instances in which pipelining cannot be used to minimize the effect of propagation delays in the binary tree. These include:

1. Decomposable searching problems where the number of "external" queries is small, or a series of queries are generated internally from processing elements within the tree. Internally generated queries would need to migrate to the root in $\log N$ steps under Bentley and Kung's scheme, and be "broadcast" down once again in $\log N$ steps. Since each query would force pipe flushing, $Q = O(\log N)$ for all queries. Artificial Intelligence production systems provide an illustration of these kinds of problems.

2. Searching problems where a single data structure D cannot be constructed. That is, for certain sets of complex (or multi-dimensional) objects, searching problems cannot be applied to a single data structure D. Consider relational databases where each element of a set is a complex record structure with possibly numerous fields or keys. To search such records, a data structure D would necessarily be needed for each field. Hence, in this case $P(N) = kN$ for k fields in each record.

3. A set F of first order predicate logic literals, i.e., a knowledge base. We wish to compute a series of unifications of a series of "goal literals" against each of the elements of F. Since logic variables can bind to arbitrary first order terms during unification, a single query can change the entire set of elements in the knowledge base by binding and substituting new values for variable terms. Successive queries, therefore, are processed against succeedingly different sets of literals. (The simpler case involves frequent modifications to a dynamic set F, necessitating frequent reconstruction of D. Relational databases provide a convenient example.) Hence, $$\text{Query}(x_i, F_i) = B \; q(x_i, f_i)$$

where $F_i = \text{function}\,(F_{i-1}, \text{Query}\,(x_{i-1}, F_{i-1}))$. (In the case of logic programming, function is substitution after logical unification, while for relational databases function may be insert or delete.)

4. Problems where a single query in a series of queries cannot be computed without knowing the result of the previous query. In dynamic programming approaches to statistical pattern matching tasks, a single match of an unknown against the set of reference templates cannot be computed without knowing the best match(es) of the previous unknown(s). Hence, for a series of unknown $x_i$, $i = 1, \ldots, M$, $$\text{Query}(X_i, F) = B \; q(x_i, \text{Query}\,(x_{i-1}, F), f).$$

In this case, the same pipe flushing phenomenon appears as in the first case noted above. 5. Searching problems where we wish to compute a number of different queries about the same unknown x over a set, or possibly different sets. Hence, $$\text{Query}_i(x, F) = B \; q_i(x, f) \text{ for } i = 1, \ldots, M.$$

Artificial intelligence production systems provide an illustration of this type of problem as well.

We will refer to problems of this type as almost decomposable searching problems.

Additional deficiencies of binary tree type parallel processors include efficiency and fault tolerance. Efficiency of a computation performed by the tree is often reduced since the amount of computation time required by each processor on a particular cycle may be vastly different depending on its local state. Such differences often result in unnecessary waiting and increased computation time. Additionally, it is well known that binary tree processors are inherently not very fault tolerant. Since any such fault has a tendency to ripple through the binary tree architecture, it is imperative that the fault(s) be not only detected but also compensated for so as to produce an accurate computation despite the fault(s).

SUMMARY OF THE INVENTION

The present invention comprises a plurality of parallel processing elements connected in a binary tree configuration, with each processing element except those in the highest and lowest levels being in communication with a single parent processing element as well as first and second (or left and right) child processing elements. Illustratively, 1023 processing elements are arranged in the tree in ten levels.

Each processing element comprises a processor, a read/write or random access memory, and an input/output (I/O) device. The I/O device provides interfacing between each processing element and its parent and children processing elements so as to provide significant improvements in propagation speeds through the binary tree. The I/O device allows the presently preferred embodiment of the invention to be clocked at 12 megahertz. The average processor instruction cycle time is 1.8 microseconds, producing in the case of a tree of 1023 processors a system with a raw computational throughput of approximately 570 million instructions per second, very little of which is required for communication overhead.

To minimize propagation delays in the binary tree computer of the present invention, the I/O device communicates data and queries from the root processing element to all other N processing elements in the array in one processor instruction cycle instead of in $O(\log_2 N)$ processor instruction cycles as in prior art binary tree arrays.

Primitive queries are executed in parallel by each processing element and the results made available for reporting back to the root processing element. In several important cases, these results can be combined and reported back to the root processing element in a single processor instruction cycle instead of in $O(\log_2 N)$ processor instruction cycles as in prior art binary tree arrays. This mode of operation is called Broadcast/Match/Resolve/Report.

The result is that the elapsed time for a broadcast and report operation with the apparatus of the present invention is in effect a constant time regardless of the number of processors in the array. In the present embodiment of the invention, this time is approximately 1.5 microseconds/byte. As a result, each of the above noted almost decomposable searching problems is efficiently run by the present invention. Internally generated queries, as in case 1, can be reported and broadcast in a constant number of machine cycles. Similarly, case 4 is efficiently handled by the same constant time broadcast/report cycle. In case 2, multiple data structures are not needed for the processor array of the present invention. Queries about different fields within a record can be implemented by broadcast of the field location prior to the execution of the query. In case 3, the successively different sets are computed on the fly and left intact in each processing element while successive queries are continuously broadcast, each in a constant number of machine cycles.

Another key capability of the present invention is to provide direct hardware support for quickly computing a range of commutative and associative binary operators b. In the membership problem defined above, the binary operator OR is repeatedly applied to all of the results of the primitive query: equal (x,f). In a sequential environment, this operation may require linear time to compute. In a parallel environment it can be computed in log time. With the present invention, it is computed in constant time.

The I/O circuit of the present invention also provides a high speed function resolve and report function that determines a most favorable value of a set of values stored in the processing elements and reports this value. Illustratively, this value is a minimum value and the function is called min-resolve. Min-resolve calculates in hardware in one instruction cycle the minimum value of a set of values distributed one to a processing element. Not only is the minimum value reported, but the processing element with the minimum value is set to a "winner state," providing an indication to all processing elements of the losers and the single winner in the computation, which can subsequently be reported in constant time. (Ties are arbitrated in hardware according to a fixed processing element ordering scheme.) The membership problem can thus be computed by applying min-resolve to zeros and ones (distributed throughout the tree after the application of the complemented equality operator) to compute OR. Similarly data generated within the processor array can be read in sorted order in O(N) time by sequential enumeration of min-resolved winners.

For example, in the case of the membership problem, the min-resolve function is implemented as follows:
1. Preprocess N objects of set F by distributing each element in turn to one processing element of the array. Note $S = N$ for the entire machine and $P = N$.
2. Broadcast the unknown object x to all processing elements in constant time.
3. Apply the query equal (x,f)? in parallel at each processing element. In parallel, each processing element sets the min-resolve value to 0 if $x = f$, else sets to 1.
4. Min-resolve in one instruction cycle.

The overall computation time is $Q = O(1)$, the sum of steps 2, 3 and 4. In cases where the primitive query q is more complex than equality, the running time is proportional to the slowest of the entire set of concurrent executions of q.

Thus, if four data elements are to be stored in the processor array of the present invention, it will take four instruction cycles to store such data elements in four processing elements. At any time thereafter a query may be processed by presenting the query to the root processing element. Within one instruction cycle, the query is propagated to each processing element, is tested against the information stored at each processing element and an answer is reported back.

Other illustrations of problems which are well suited to solution on the apparatus of the present invention are artificial intelligence production systems. Examples of such production systems are described in Salvatore J. Stolfo, "Five Parallel Algorithms for Production System Execution on the DADO Machine", *Proc. of National Conference on Artificial Intelligence,* AAAI, University of Texas at Austin, pp. 300–307 (Aug. 6–10, 1984).

Logic programming, relational database operations and statistical pattern recognition can be similarly defined as almost decomposable searching problems. Each of these problems shares the same common programming paradigm on the processor array of the present invention:

Distribution of an initial set of data.

Broadcast of data in constant time.

Local execution of some primitive query against a prestored element of the reference set (unification of first order logic literals, relational selection of tuples, dynamic time warp match of template of a speech utterance, respectively).

Resolution to find the best answer in constant time.

Report of the final answer.

From the foregoing, several key principles of the present invention can be identified:

The form of the data manipulated by the apparatus of the present invention can be of any type or size and hence can process the same wide range of data that any conventional computer system in existence today can manipulate.

The primitive query q can be any computation that is programmable on any computer in existence today.

Hence, the apparatus of the present invention is not limited to any particular class of applications.

The inventive apparatus can quickly execute arbitrary storage and retrieval functions definable as an almost decomposable searching problem for any application area definable including AI, signal processing, database processing, text processing, numeric processing, etc.

For example, the primitive query q can be more complex than simple equality testing. In the speech recognition area we may wish to define a primitive query q which calculates the degree of match between the unknown and each of the reference set elements (set F in our example). In this case q can be a function which calculates 0 if the unknown exactly matches the set element, infinity (the largest number representable in the computer's memory) if there are no similarities at all, and some integer representing a distance metric, i.e., roughly how close the unknown matches the set element. A variety of programmable techniques can be employed in defining this function. The present invention supports them all since each processing element is a programmable computer.

Thus, in the case of a computer match of names a suitably defined primitive query q might rate the partial match of "Smith" to "Smythe" as closer (to 0) than would the evaluation of the match of "Jones", "Mason" and "Hamershold". If we name q in this context as distance, then to determine whether "Smith" is an element of our set, or whether "Smith" closely matches some element of F, we define Query(x,F) = MIN distance (x,f)

The key point is that the principles set forth above for fast execution of almost decomposable searching problems are generic and hence applicable to a wide range of problem areas—indeed, to all problem areas. In this brief example, the distance function can pertain to partial matching of character strings, Manhattan distances of a set of points in the plane, partial matches of AI symbolic expressions (definable for example in LISP expressions, or First Order Logic expressions or PROLOG expressions), or a set of vectors representing measured parameters of some signal, as for example LPC coefficients of a speech or acoustic waveform. The present invention supports all of these data types and others which may be defined, represented and stored on any computer system.

Accordingly, it is a principle object of the present invention to provide new and improved parallel processing systems.

Another object of the invention is to provide a plurality of processing elements arranged in a binary tree configuration wherein each processing element has associated with it its own I/O device capable of communication with that processing element as well as other processing elements.

A further object of the invention is to provide a parallel processor arranged in a binary tree configuration having improved efficiency and fault tolerance capabilities.

A still further object of the invention is to provide a parallel processor which essentially guarantees proper operation of a binary tree machine after two successive faults, as well as a 50% chance of proper operation after a third successive fault.

Another object of the invention is to provide a system which improves the efficiency of parallel processing machines by reducing the computation time deviation of each processor from the mean computation time.

BRIEF DESCRIPTION OF THE DRAWINGS

These and other objects, features and advantages of the invention will become more readily apparent with reference to the following description of the invention in which.

DETAILED DESCRIPTION OF THE INVENTION

Figure 2:
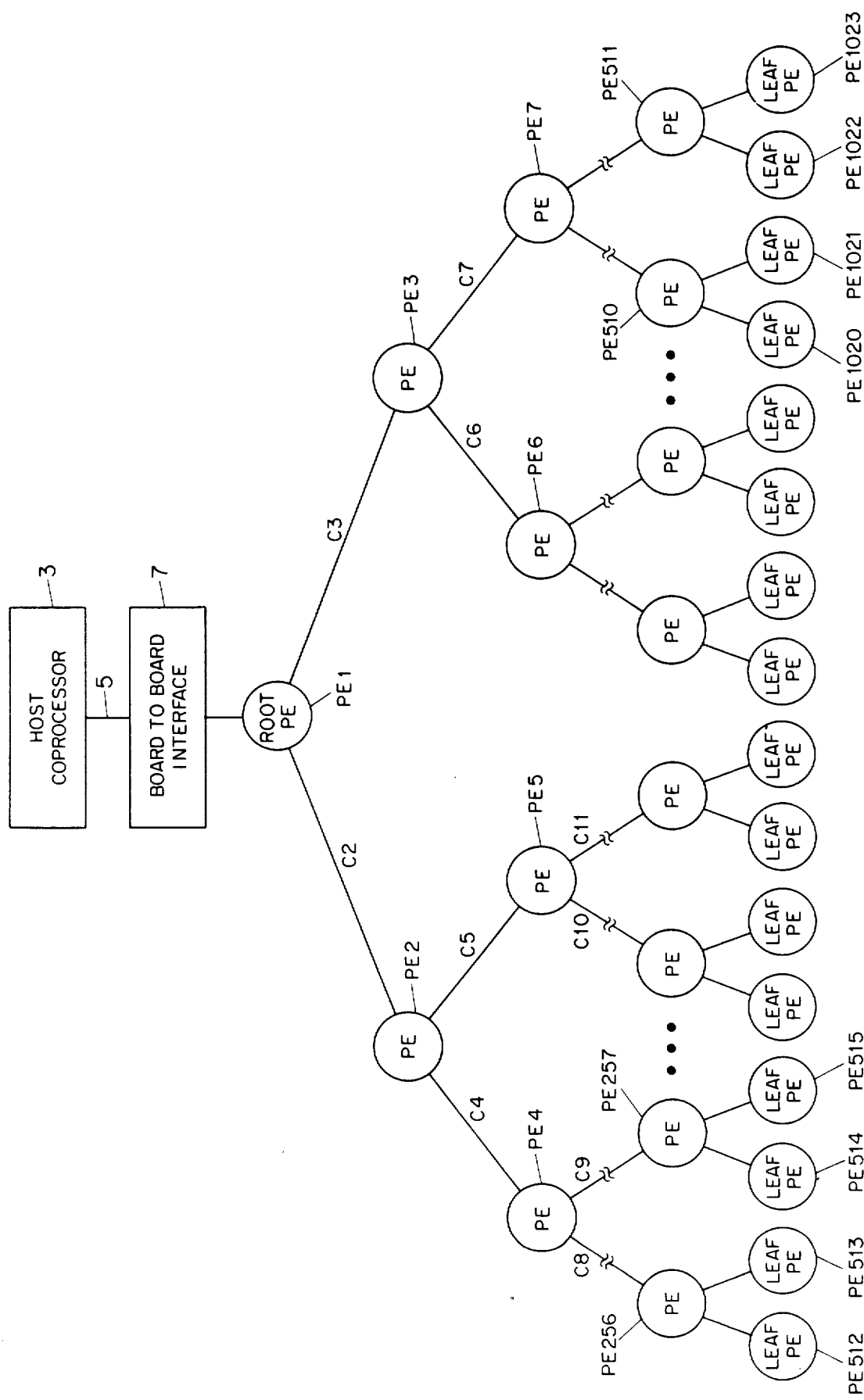
FIG. 2 illustrates the general configuration of a preferred embodiment of the invention comprising a binary tree of 1023 processing elements.

As shown in FIG. 2, the binary tree parallel processor of the present invention comprises a plurality of processing elements identified as PE1 through PE1023 arranged in the form of a binary tree. Each PE except the root PE1 which has no parent processing element and the leaf processing elements PE512-PE1023 which have no children processing elements communicates with a parent processing element as well as two children processing elements For example, PE2 communicates with its parent PE1 over communication line C2, with a first (or left) child PE4 over communication line C4 and with a second (or right) child PE5 over communication line C5. Similarly, PE4 communicates with its parent PE2 over communication line C4 as well as with its left and right children PE8 and PE9 (not shown) over communication lines C8 and C9.

Root processing element PE1 communicates with a host coprocessor 3 via board to board interface circuitry 7 over line 5. In the preferred embodiment, a Digital Equipment Corp. VAX 11/750 (TM) serves as the host coprocessor and is the only device that would be apparent to a user of the present invention. The presently preferred embodiment may thus be viewed as a transparent back-end processor to the VAX 11/750.

Figure 1:
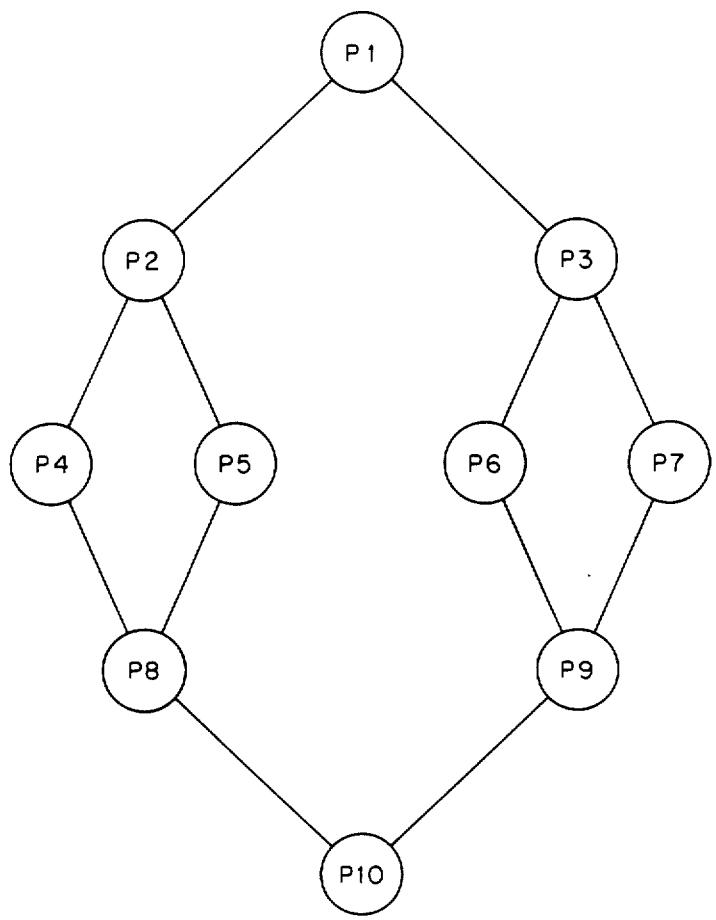
FIG. 1 is a schematic illustration of a prior art binary tree structure.
Figure 3:
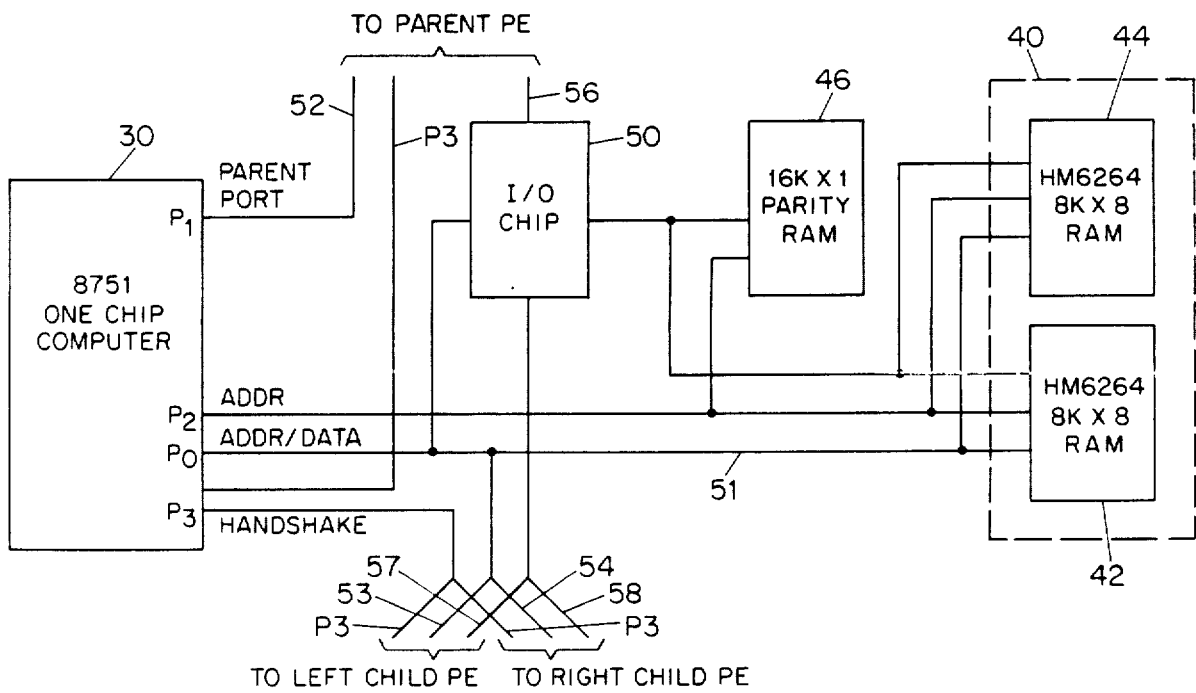
FIG. 3 depicts, in block diagram form, a single processing element comprising an 8751 processor, an I/O device, and a random access memory.
Figure 4A:
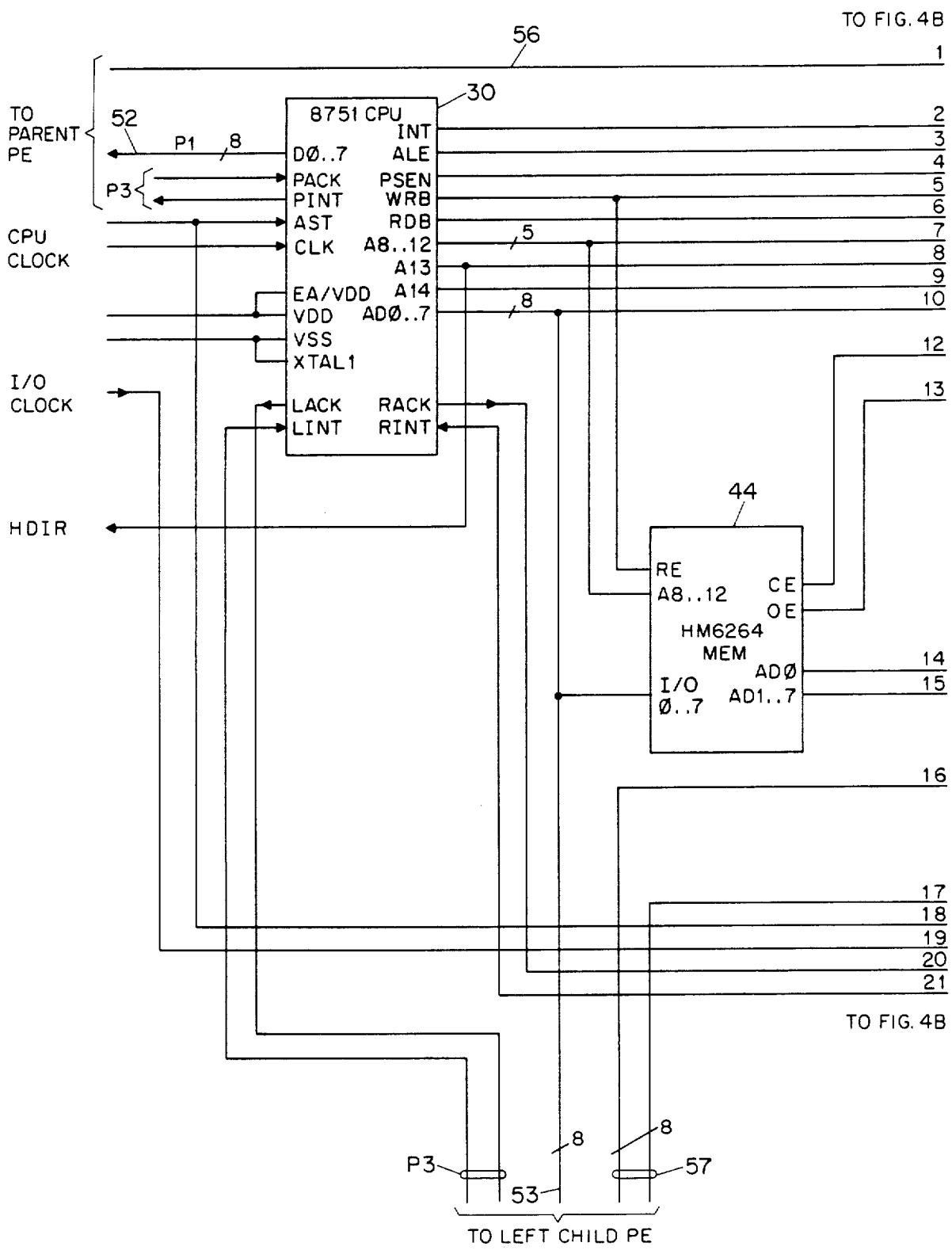
FIGS. 4A and 4B depict a detailed schematic of the single processing element of FIG. 3.
Figure 4B:
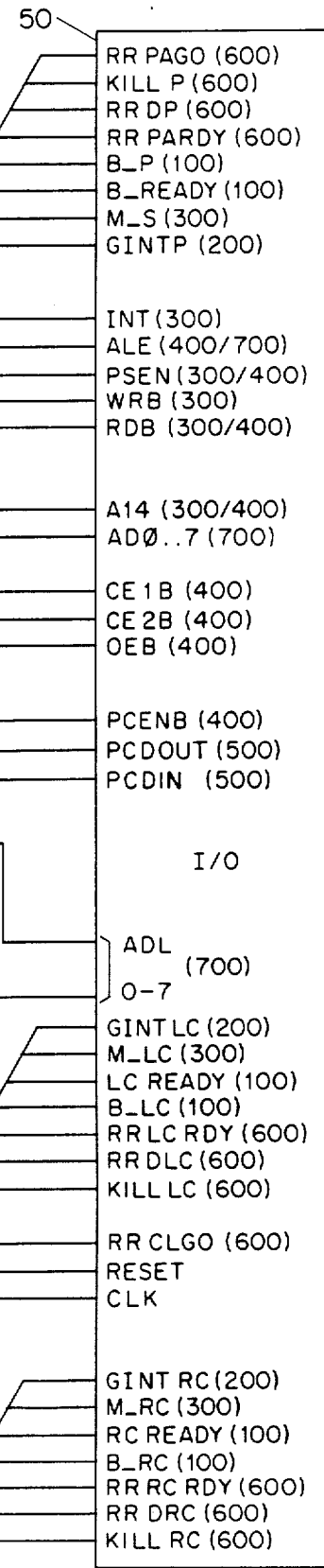

Referring to FIGS. 3, 4A and 4B, a single processing element of the preferred embodiment is shown in block diagram form. This processing element comprises an Intel 8751 microcomputer chip functioning as processor 30, a read/write or random access memory (RAM) 40 comprising two 8k×8 static random access memory chips 42, 44 and a 16k×1 parity RAM 46, and an I/O device 50.

Processor 30 is an 8-bit microcomputer incorporating a 4K erasable programmable read only memory (EPROM) and a 256-byte RAM on a single silicon chip. The EPROM may advantageously be used for subsequent debugging, modifications or the like. Processor 30 is provided with four parallel, 8-bit ports which simplify interconnection between processors and greatly assist the I/O procedure. RAMs 42, 44 function as the local memory for processor 30.

I/O device 50 serves as the primary means for inputting and outputting instructions and data to and from the processing element. I/O device 50 contains memory support circuitry and also computes parity for both memory and communication, facilitating fault detection. I/O device 50 preferably is an IC implemented in gate array technology to allow the parallel processor to be clocked at 12 megahertz, the maximum speed of processor 30 and RAMs 42, 44, 46. The average machine instruction cycle time is 1.8 microseconds, producing a system with a raw computational throughput of roughly 570 million instructions per second. As will be detailed below, very little of this computational resource is required for communication overhead.

I/O device 50 is accessed as a memory mapped device, that is, processor 30 accesses the I/O device by reading and writing to special locations in its address space. I/O device 50 contains six writable locations and eight readable locations. The four eight-bit parallel ports of processor 30 are designated ports P0 through P3. Port P0 is connected to an address/data bus 51 that connects processor 30 to port P1 of its left and right children processors, that serves as a data bus between processor 30 and memory 40 and also serves as the address bus for the low order eight bits of address which are stored in a latch in I/O device 50. Port P1 serves as the connection between processor 30 and its parent. The connection between port P0 processor 30 and port P1 of its children serves as the data path between the processors and may be a direct processor chip to processor chip connection or may be an off the board connection via a bus transceiver.

Five bits of eight-bit port P2 represented on pins A8 to A12 provide the high order five bits of address to memory 40. One bit of port P2 represented on pin A13 of processor 30 is used as the direction control for the bus transceiver while another bit represented on pin A14 of processor 30 serves as an incoming handshake line.

Five bits of the lines from port P3 and one bit of the lines from port P2 are used as handshake lines when accessing neighboring processing elements, and two bits from port P3 are used as the read and write strobes for memory. Referring to FIGS. 4A and 4B, pins LACK of port P2, LINT of port P3 on processor 30 are connected to pins PACK, PINT of its left child while pins RACK, RINT of port P3 on processor 30 are connected to pins PACK, PINT of its right child. Similarly, pins PACK, PINT of port P3 on processor 30 are connected to either LACK, LINT (if left child) or RACK, RINT (if right child) of its parent. Signals on these six pins represent handshaking to/from the children/parent processors. An asynchronous four cycle handshake protocol is used to move data when transfers are limited to neighboring processors (tree neighbor communication).

Referring again to FIGS. 3, 4A and 4B, lines 52, 53, 54 comprise the data lines connected from processor 30 of the PE to its parent, left child and right child, respectively. As will be apparent, data line 52 of a PE is connected to either data line 53 or data line 54 of its parent on the next upper level. Similarly, lines 56, 57, 58 comprise I/O lines connected from I/O device 50 of the PE to its parent, left child and right child, respectively; and I/O line 56 of a PE is connected to either I/O line 57 or I/O line 58 of its parent on the next upper level.

Figure 5:
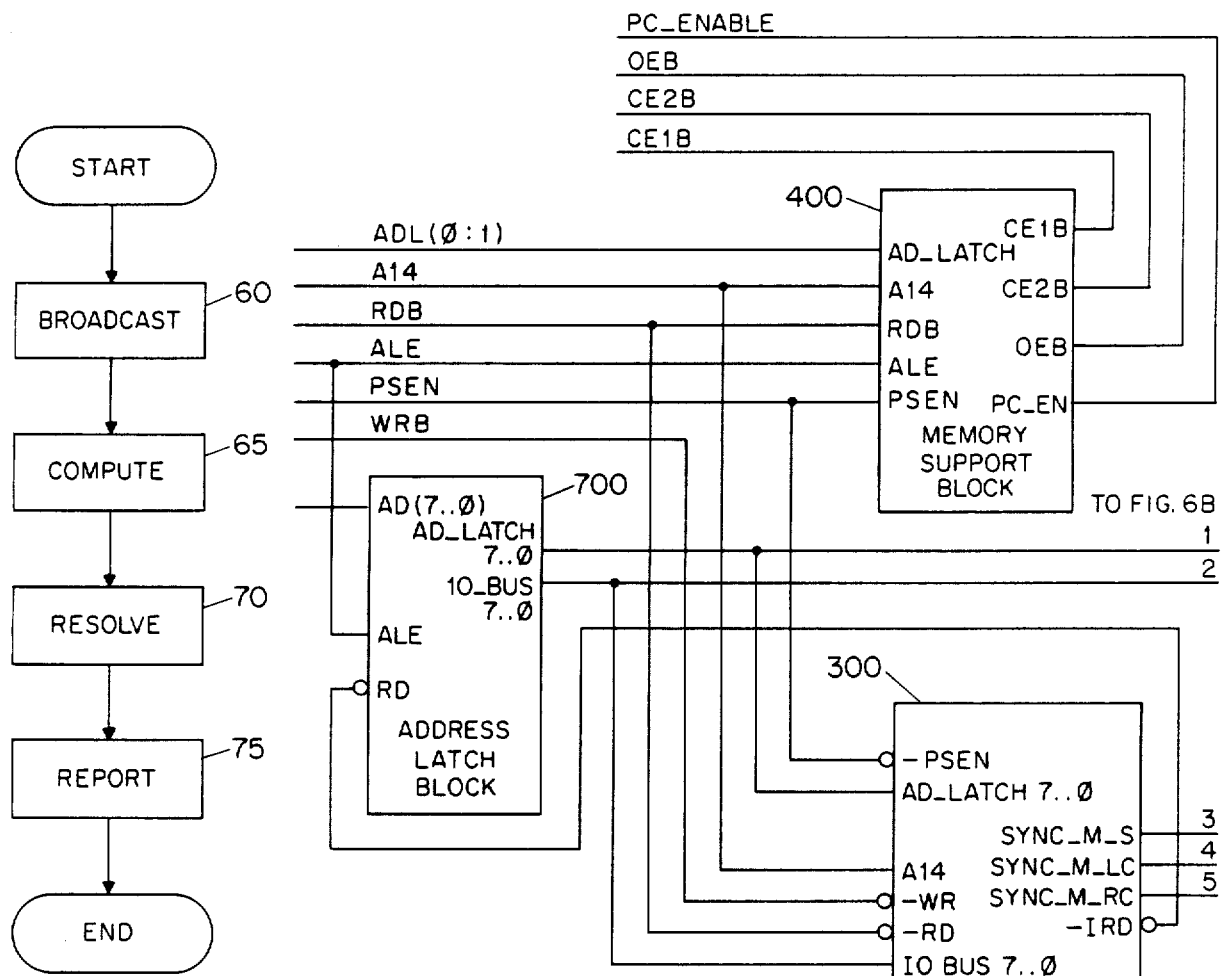
FIG. 5 is a functional flow chart of the underlying model for a single computation cycle.

Referring to FIG. 5, there is shown a functional flow chart of the underlying model for a single computation cycle as performed by a plurality of PEs in accordance with the present invention. In essence, a single computation cycle comprises a broadcast phase 60, a compute phase 65, a resolve phase 70 and a report phase 75. The broadcast phase 60 comprises the steps of broadcasting data and/or instructions to a subset of PEs in the binary tree. Following this broadcast, a computation is performed by a second subset of PEs during the compute phase 65. Subsequent to this computation, the resolve phase 70 determines the identity of a third subset of PEs which will report the result of the computation during the report phase 75. Illustratively the data and instructions are broadcast by the host coprocessor.

For this model, four software dependent modes of operation are distinguishable, depending on the subset of PEs selected during each phase and the type of data and/or instructions which is broadcast. These four modes are: SIMD for single instruction stream multiple data stream, MIMD for multiple instruction stream multiple data stream, MSIMD for multiple-single instruction stream multiple data stream and SPMD for single program multiple data.

More specifically, in SIMD mode, each PE is first loaded with its own data and then a single stream of instructions is broadcast to all PEs. Depending on its local state, which is the result of the originally broadcast data and the preceding instructions, each SIMD PE determines which instructions from the stream to execute.

In MIMD mode, each PE is first broadcast its local program and data and then each PE is logically disconnected from its neighbor PEs and executes independently. Logical reconnection to the rest of the binary tree occurs when the PE has finished its computation.

In MSIMD mode, the binary tree of PEs is partitioned into a number of subtrees which maintain the full functionality of the ordinal tree. The root of each such subtree which is operating in MIMD mode is functionally identical to the root of the ordinal tree except for the I/O capabilities with a host. The system operating in MSIMD mode can therefore be viewed as a set of binary trees.

In SPMD mode each PE is first broadcast a copy of the common program and then broadcast its local data. Unlike MIMD mode, the PE does not logically disconnect itself at this point, but rather continues to receive the data stream that is broadcast from above. The computation of each PE is thus determined by three components, namely, the common program that each PE executes, the local data with which the PE was originally loaded and the continuous data stream being broadcast from above.

The I/O device must know whether its PE and its children's PEs are in the MIMD or SIMD mode because a PE in MIMD is logically disconnected from its parent and therefore no I/O communication may occur between them. Three bits of information corresponding to the MIMD/SIMD status of a PE, its left child and its right child are used by the I/O device.

To maintain these bits a writable bit in each I/O device is used to set itself to MIMD or SIMD. Another pair of bits MIMD_RC and MIMD_LC are used to indicate if that PE's children are in MIMD or SIMD mode. The pair of bits MIMD_RC and MIMD_LC are writable in two ways. One is directly by the parent processor. The second way is by propagation of an MIMD/SIMD status bit from the I/O device of a child to its parent. This bit is readable directly by the parent or it may be read and simultaneously latched into the MIMD_RC or MIMD_LC bits of the parent.

As indicated above, processor 30 and RAM 40 of each PE are off-the-shelf integrated circuits. The I/O device is not. The I/O device of a PE essentially performs five operations, namely the I/O functions of broadcast, resolve and report as well as functions of memory support and debugging. These functions are accomplished by the apparatus of FIGS. 6A and 6B comprising a broadcast block 100, a debug block 200, an instruction decoder block 300, a memory support block 400, a parity check block 500, a report-resolve block 600 and an address latch block 700.

Instruction decoder 300 controls the I/O device by controlling the addressing of the broadcast block 100, debug block 200, parity check block 500 and resolve-report block 600, as well as the MIMD status of its children and itself, supervises transmission of interrupts to the processor and records the address in the address latch 700 at the time of an interrupt.

Memory support block 400 handles all external memory operations. This block determines which 8K×8 RAM to select, enables the 16K×1 parity RAM.

Each broadcast block 100 handles system wide broadcasts of data and instructions. It is responsible for receiving a byte from a parent PE and transmitting a byte to children PEs within two 8751 processor instruction cycles and then re-synchronizing so another byte can be transmitted from the MIMD root processor.

Debug block 200 handles system wide interrupts from itself, its parent and its children and generally propagates the interrupt signal throughout the entire tree.

Parity check block 500 checks the byte communication among the numerous PEs as well as memory operations for parity errors.

Resolve-report block 600 is responsible for determining which single PE is to be enabled to report its result by transmitting it to the host coprocessor.

Address latch 700 provides te I/O device with addresses and/or data. Address latch 700 is controlled by the address latch enable on line ALE from processor 30. When ALE is high, the address on line AD(7..∅) or the data on line IO_BUS7..∅ is transmitted through the latch onto line AD_LATCH 7..∅ to instruction decoder 300.

Before discussing the individual components of I/O device 50 it is helpful to set forth the register organization of this device. As indicated above, the I/O device is memory mapped to the external RAM address space of the processor 30, illustratively to the first 256 bytes of an Intel 8751 microprocessor. In the present embodiment of the invention, there are 14 defined addresses, consisting of data, control, and I/O processor status registers, organized into three functional blocks of control/status block, broadcast block and resolve/report block. The description of these registers is set forth in Table I below:

TABLE I

| hex address | register | bit | bit name | description |
|---|---|---|---|---|
| 00 | SYNC | b0 | mimd_s | mimd status of self PE |
|  |  | b1 | mimd_rc | mimd status of right child PE |
|  |  | b2 | mimd_lc | mimd status of left child PE |
| 01 | CTRL | b0 | globl_int | initiate global interrupt |
|  |  | b1 | mimd_s | mimd status of self |
|  |  | b2 | parity_msk | disable parity interrupts |
|  |  | b4 | global_msk | disable global interrupts |
|  |  | b5 | kernel_mode | enable kernel mode |
| 02 | STAT | b0 | parity_err | a parity error has occurred |
|  |  | b1 | refresh_err | external RAM refresh is overdue |
|  |  | b2 | global_err | a global interrupt has occurred |
|  |  | b3 | mem_parity | bad parity source was external RAM |
|  |  | b4 | ext_mimd_lc | dynamic left child mimd status |
|  |  | b5 | ext_mimd_rc | dynamic right child mimd status |
| 03 | PCAR | — — |  | Parity Check Address Register |
| 04 | RESET | — — |  | Reset Register |
| 05 | STATE | b0 | parity-err | a parity error has occurred |
|  |  | b1 | b_ready | broadcast logic ready |
|  |  | b2 | b_dav | broadcast data register full |
|  |  | b3 | rr_ready | resolve/report logic ready |
|  |  | b4 | rr-dav | resolve/report data register full |
|  |  | b5 | global_int | global interrupt has occurred |
| 10 | B_IN | — — |  | Broadcast Input Register |
| 11 | B_OUT | — — |  | Broadcast Output Register |
| 12 | B_STATUS | b0 | sub_tree_rdy | broadcast ready state |
|  |  | b2 | b_ready | broadcast157 output logic is ready (mimd mode) |

TABLE I-continued

| hex address | register | bit | bit name | description |
|---|---|---|---|---|
| | | b3 | tree_read | logical AND of subtree ready lines (r/o) |
| | | b4 | b_dav | broadcast data is available (simd mode) |
| | | b5 | tree_enable | tree communication enable |
| | | b6 | output_parity | dynamic parity of B_OUT (r/o) |
| | | b7 | input_parity | dynamic parity of B_IN (r/o) |
| 20 | RR_IN | — | — | Resolve/Report Input Register |
| 21 | RESOLVE | — | — | Resolve Output Register |
| 22 | REPORT | — | — | Report Output Register |
| 23 | RR_STATE_0 | b0 | rc_fifo_enb | right child fifo enable |
| | | b1 | lc_fifo_enb | left child fifo enable |
| | | b2 | rr_go_logic | resolve/report "go" line to parent |
| | | b3 | rr_in_clk_enb | RR_IN clock enable |
| | | b4 | en_xmt | resolve/report transmitter enable |
| | | b5 | rr_ready | resolve/report logic is ready for next byte |
| | | b6 | rr_dav | resolve/report data is available |
| | | b7 | rr_in_parity | RR_IN parity bit (r/o) |
| 24 | RR_STATE_1 | b0 | obc_rc | right child one-bit-compare flag |
| | | b1 | obc_lc | left child one-bit-compare flag |
| | | b2 | obc_s | local one-bit-compare flag |
| | | b3 | kill-rc | kill right child flag (r/o) |
| | | b4 | kill_lc | kill left child flag (r/o) |
| | | b5 | suicide | kill self flag (r/o) |
| | | b6 | kill_p | kill parent flag (r/o) |
| | | b7 | rr_out_parity | resolve/report output parity bit (r/o) |

Unused registers in each of these blocks, and other registers between hex addresses 30 to 18FFFF are reserved for future expansion of the I/O device, and referencing these registers, as well as any registers beyond the upper limit of external RAM, will yield indeterminate results The function of these registers is as follows.

The Control/Status Block

The SYNC, CTRL, STAT, PCAR, RESET and STATE registers in the Control/Status Block are used to provide processor 30 with information about the current state of the I/O device and its neighbors, as well as allowing the processor 30 to save and restore its I/O device's context (during an interrupt handler, for instance) and providing explicit (though limited) control over the global communication paths.

The SYNC register allows processor 30 to specify the MIMD status flags used by the I/O device to control the handling of Broadcast and Resolve/Report operations. In normal operation, writing to the SYNC register causes the signals present on the I/O device's dynamic MIMD status lines to be stored in the internal SYNC latches, which values control the behavior of the Broadcast and Resolve/Report logic. In kernel mode, however, the internal SYNC latches are loaded from the source operand rather than the external MIMD status lines. This provides a way for processor 30 to explicitly control the behavior of Broadcast and Resolve/Report operation with respect to neighboring I/O devices, regardless of their actual state. Resetting the I/O device clears the SYNC register, indicating SIMD operation for the local I/O device as well as its descendants. Reading the SYNC register yields the contents of the I/O device's internal SYNC latches.

The CTRL (Control) register may be used to specify SIMD and MIMD operation for the local I/O device, specify which events will cause the I/O device to interrupt processor 30, enable or disable kernel mode operation, or initiate global interrupts.

The CTRL register contains bits corresponding to the I/O device's MIMD-self latch, the kernel mode enable latch, mask bits for the three sources of I/O device interrupts to processor 30 and a global interrupt trigger. With the exception of the global interrupt trigger, each of these bits is a simple latch, and may be read or written in either user mode or kernel mode. Writing a one bit to the global interrupt trigger initiates a global interrupt to the entire tree, and interrupts the I/O device regardless of the setting of the global interrupt mask bit. Resetting the I/O device places the I/O device in SIMD mode, disables parity and global interrupts, and disables kernel mode.

The STAT (Status) register provides processor 30 with various information about internal and external I/O device events. The presence of a one bit in any of parity_err, refresh_err, or global_err indicates that the corresponding event has occurred. The I/O device can also interrupt processor 30 whenever any of these events occurs, depending on the values of the interrupt mask bits in the CTRL register. When a parity error has been detected, the mem_parity bit will be one if the source of the bad parity was external RAM, zero if the source was the communications logic between processing elements. Resetting the I/O device clears these bits.

Reading ext_mimd_lc and ext_mimd_rc will return the current value of the signals on the external MIMD pins connected to the left and right descendant I/O devices. Since these values are not latched, write operations have no effect on them. (These are the values loaded into the internal SYNC latches by user mode writes to the SYNC register.)

The I/O device latches the low-order address byte from the address bus of processor 30 into the PCAR (Parity Check Address) register whenever a global interrupt occurs, provided that the PCAR register has been read by processor 30 (or a reset operation has been done) since the occurrence of the previous global interrupt. This interlock is provided so that the data in the PCAR register is not overwritten by new data if subsequent global interrupts occur before processor 30 is able to examine the PCAR register during processing of the initial interrupt. Read and reset operations write-enable the PCAR register internally. Resetting the I/O device also clears it to zero. Processor 30 is allowed to write data into this register only when the I/O device is in kernel mode.

The RESET register is written by processor 30 in order to perform a software reset of the I/O device, an operation that may only be done in kernel mode. The source operand of processor 30 is ignored during write operations, and read operations yield indeterminate data.

The STATE register contains status flags describing the state of the resolve-report and broadcast logic, as well as the parity error and global interrupt indicators.

Broadcast Block

The broadcast block contains the B_IN, B_OUT and B_STATUS registers accessed by processor 30 to retrieve global broadcast data in SIMD mode, and to broadcast data to the locally-rooted subtree in MIMD mode.

Reading the B_IN (Broadcast Input) register yields the most recent byte of broadcast data and enables the I/O device's broadcast ready pin, indicating that the I/O device is ready to receive the next byte from its MIMD ancestor. The B_IN register can be written by processor 30 only when the I/O device is in MIMD mode.

The B_OUT (Broadcast Output) register is written by processor 30 in MIMD mode in order to broadcast a byte of data to the MIMD subtree rooted at the local processing element. The data appears in the B_IN register of each descendant SIMD processing element, as well as the B_IN register of the local I/O device. (The semantics of the broadcast operation require that the MIMD root processing element read its own broadcast data, since MIMD mode processing elements will also function as SIMD processing elements in order to provide a complete binary tree.) If the B_OUT register is written in SIMD mode, the data will be transmitted when the I/O device is put in MIMD mode and the subtree is ready to receive it. This is not recommended, however, since a simultaneous broadcast from an ancestor processing element could either overwrite the data while the local I/O device is in SIMD mode or cause an I/O parity error while the local broadcast is in progress.

The B_STATUS (Broadcast Status) register contains three kinds of information: bits b_ready and b_dav indicate whether the broadcast logic is ready to accept the byte to be broadcast in MIMD mode, and whether new broadcast data is available in SIMD mode, respectively; tree_ready indicates whether or not the locally-rooted subtree is ready to receive data; input_parity and output_parity contain the dynamic parity bits for the B_IN and B_OUT registers, respectively.

Flag b_dav is set to one when the I/O device receives broadcast data in SIMD mode from an ancestor processing element, or broadcast data in MIMD mode (since processing elements always receive their own broadcasts). This flag is cleared whenever processor 30 reads the contents of the B_IN register or resets the I/O device. Flag b_ready is set to one whenever the I/O device is in MIMD mode and there is no outstanding data to be transmitted to descendant processing elements. This flag does not, however, indicate that the descendant processing elements have retrieved previous data from their I/O devices. It simply means that the local I/O device is ready to buffer another byte of output. Sub_tree_ready can be used in MIMD mode processing elements to determine whether a broadcast byte can be delivered immediately because it indicates that no processing elements have outstanding data in the B_IN registers of their local I/O device. Flag tree_enable can be cleared in order to disable all serial communication between the local I/O device and all of its children. This has the side-effect of clearing the sub_tree_ready flag in all ancestor processing elements.

Only b_ready, tree_enable, and b_dav are affected by write and reset operations, and then only if the I/O device is in kernel mode. Reset turns on b_enable, tree_enable, and b_ready, and turns off b_dav, indicating that no SIMD input data is available and no MIMD mode is pending.

Resolve/Report Block

The Resolve/Report block contains the RR_IN, RESOLVE, REPORT, RR_STATE_0 and RR_STATE_1 registers accessed by processor 30 to perform the Min-Resolve and Report operations.

When flag rr_dav of the RR_STATE_0 register is set, the RR_IN register contains the next available byte of resolve/report data. Reading the RR_IN register clears this flag. The RR_IN register is normally read only by a MIMD mode processor 30 or when the state of the I/O device must be saved.

The RESOLVE register accepts a byte of resolve/report data and initializes the resolve/report logic. Both MIMD and SIMD mode processing elements write resolve/report data to this register at the beginning of a resolve/report sequence. Each SIMD I/O device propagates the largest value calculated among itself and its two descendants up to its parent, until the MIMD processing element at the root of the subtree receives the largest such byte in its RR_IN register.

The REPORT register accepts successive bytes of resolve/report data following an initial byte written to the RESOLVE register.

A processing element in MIMD mode must read flag rr_dav of RR_STATE_0 register to determine whether or not resolve/report data is available in the RR_IN register. The other bits of this register are internal status registers and exist only to allow the state of the resolve/report logic to be preserved across interruptions in the resolve/report operation. In SIMD mode, bit_rr ready indicates whether or not the resolve/report logic is ready to accept a new byte of data in the RESOLVE or REPORT registers; bit rr_dav indicates that resolve/report data is available in the RR_IN register. The remaining bits in this register are used only to save or restore the context of the resolve/report logic during a context switch.

The RR_STATE_1 register contains additional resolve/report state information, including flags to indicate whether the local processing element is still eligible to compete in the resolve/report operation (i.e. it has not been "killed"), which are monitored by the resolve/report firmware.

Resetting the I/O device has the following effects on its internal registers:

in the SYNC register, the internal MIMD latches are cleared, indicating that the local I/O device and its immediate descendants are in SIMD mode;

in the CTRL register the internal MIMD-self latch is cleared, the parity interrupts and global interrupts are disabled and the kernel mode is disabled;

in the STAT register, parity and global interrupt event flags are cleared;

in the PCAR register, the register is cleared and enabled to receive the low-order address byte recorded at the next global interrupt;

in the STATE register, the broadcast and resolve/report logic are reset to their idle state, and parity error and global interrupt flags are cleared;

in the B_STATUS register, all broadcast logic is enabled and the broadcast data-available flag b_dav is cleared; and in the RR_STATE_0_ and RR_STATE_1 registers, all resolve/report logic is enabled and the resolve/report data-available flag rr_dav is cleared.

Figure 6A:
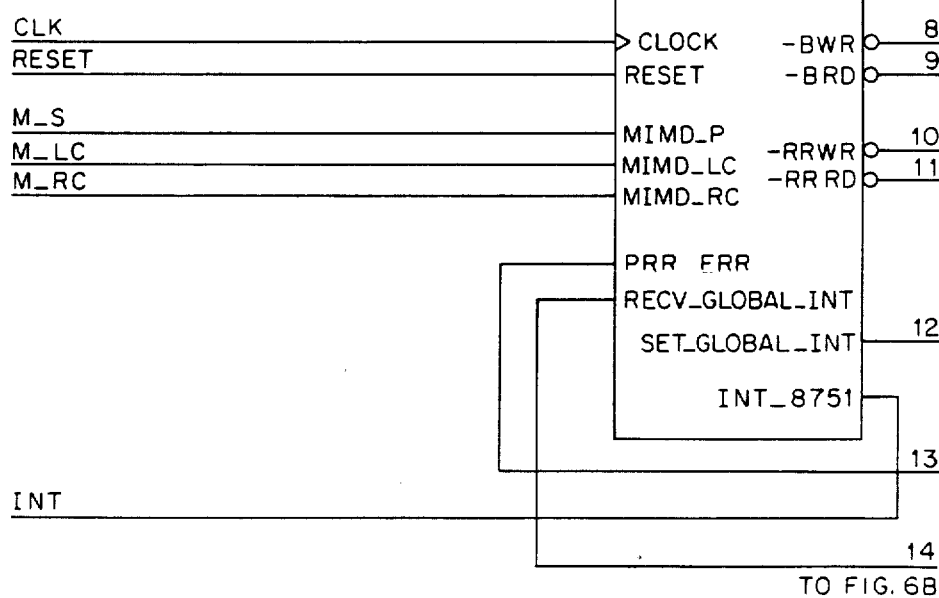
FIGS. 6A and 6B are a schematic diagram of the I/O device comprising broadcast, report-resolve, debug, parity check, instruction decoder, memory support and address latch blocks.
Figure 6B:
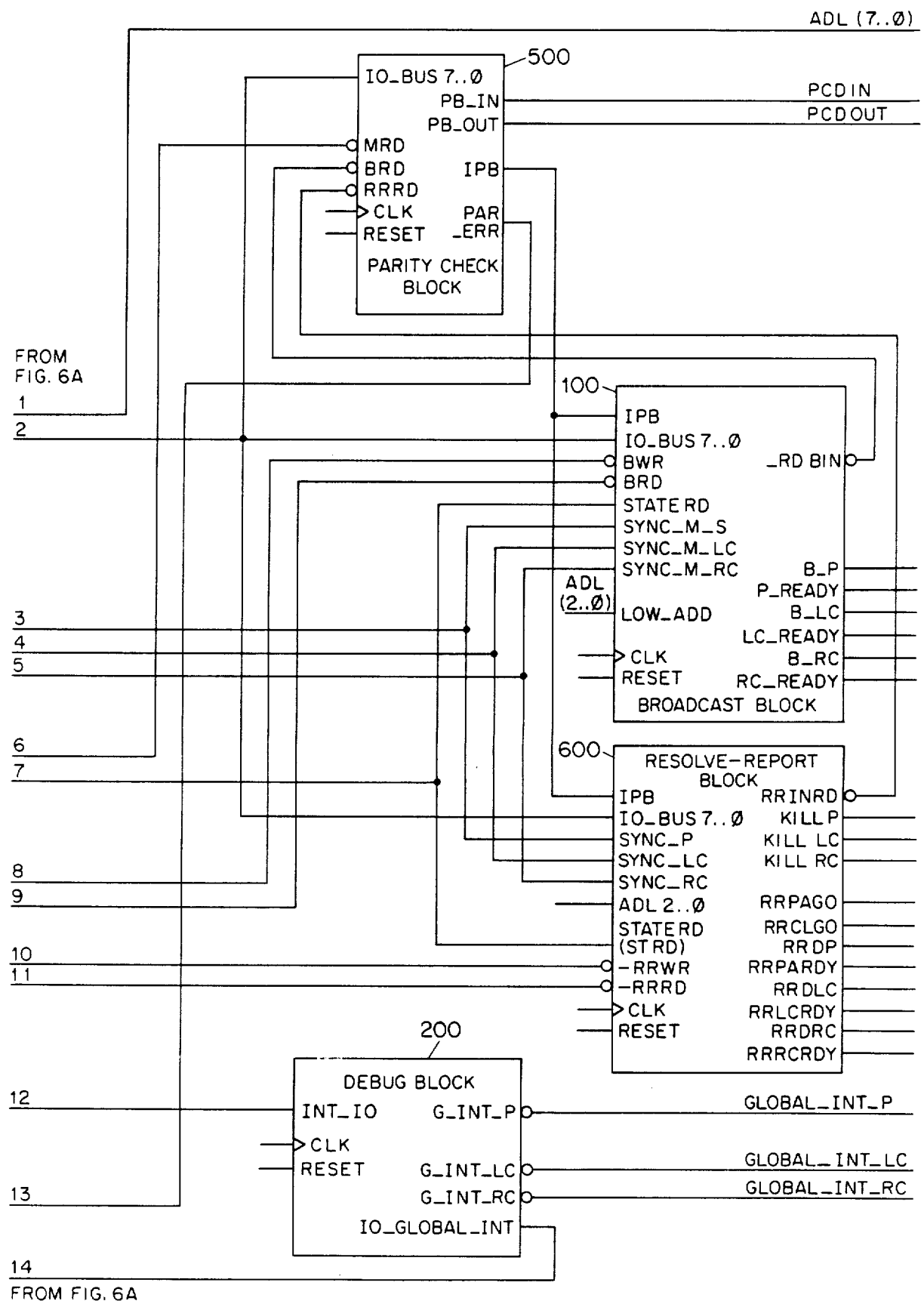
Figure 17A:
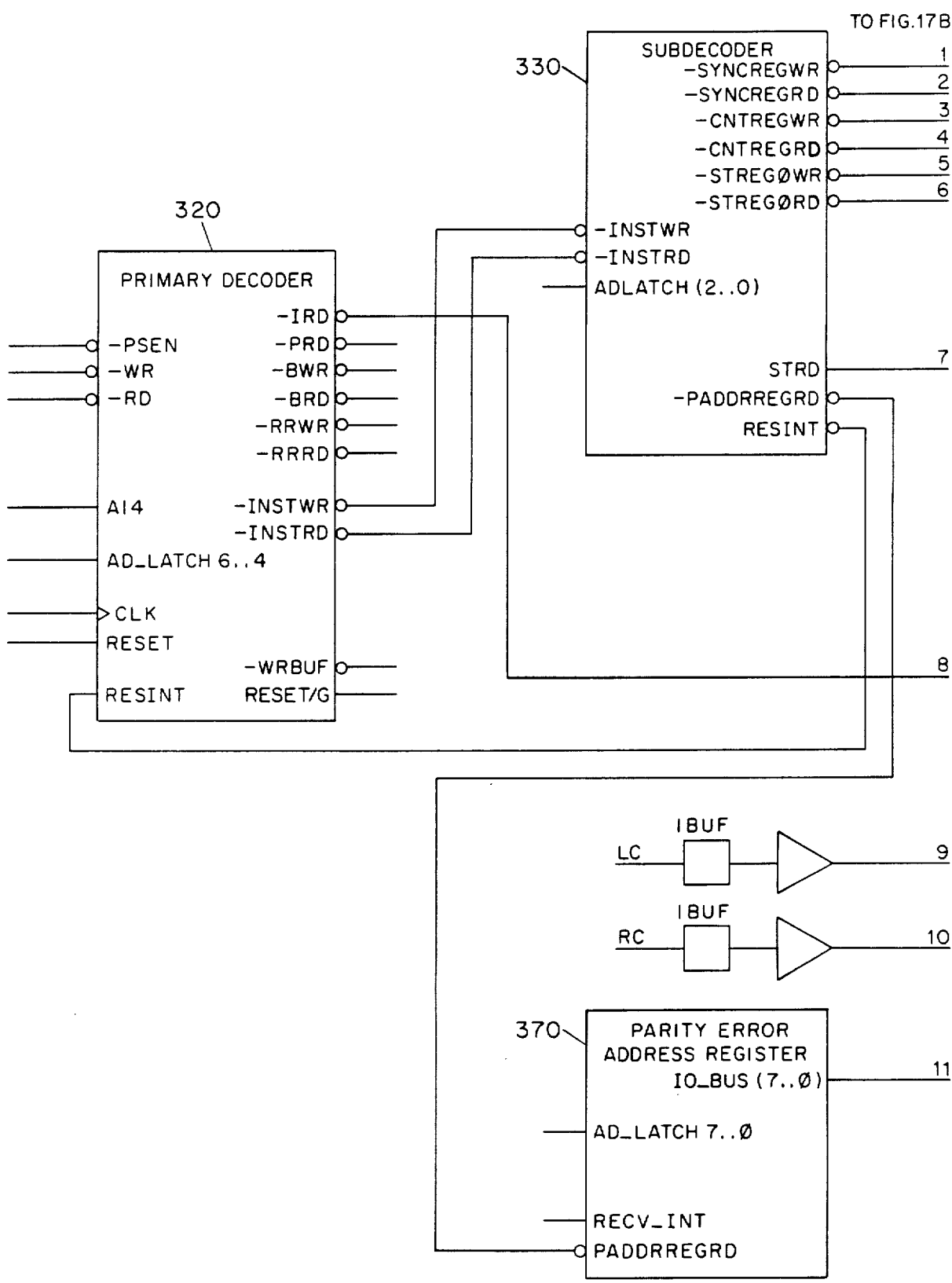
FIGS. 17A 17B are a detailed schematic of the instruction decoder block of FIGS. 6A and 6B.
Figure 17B:
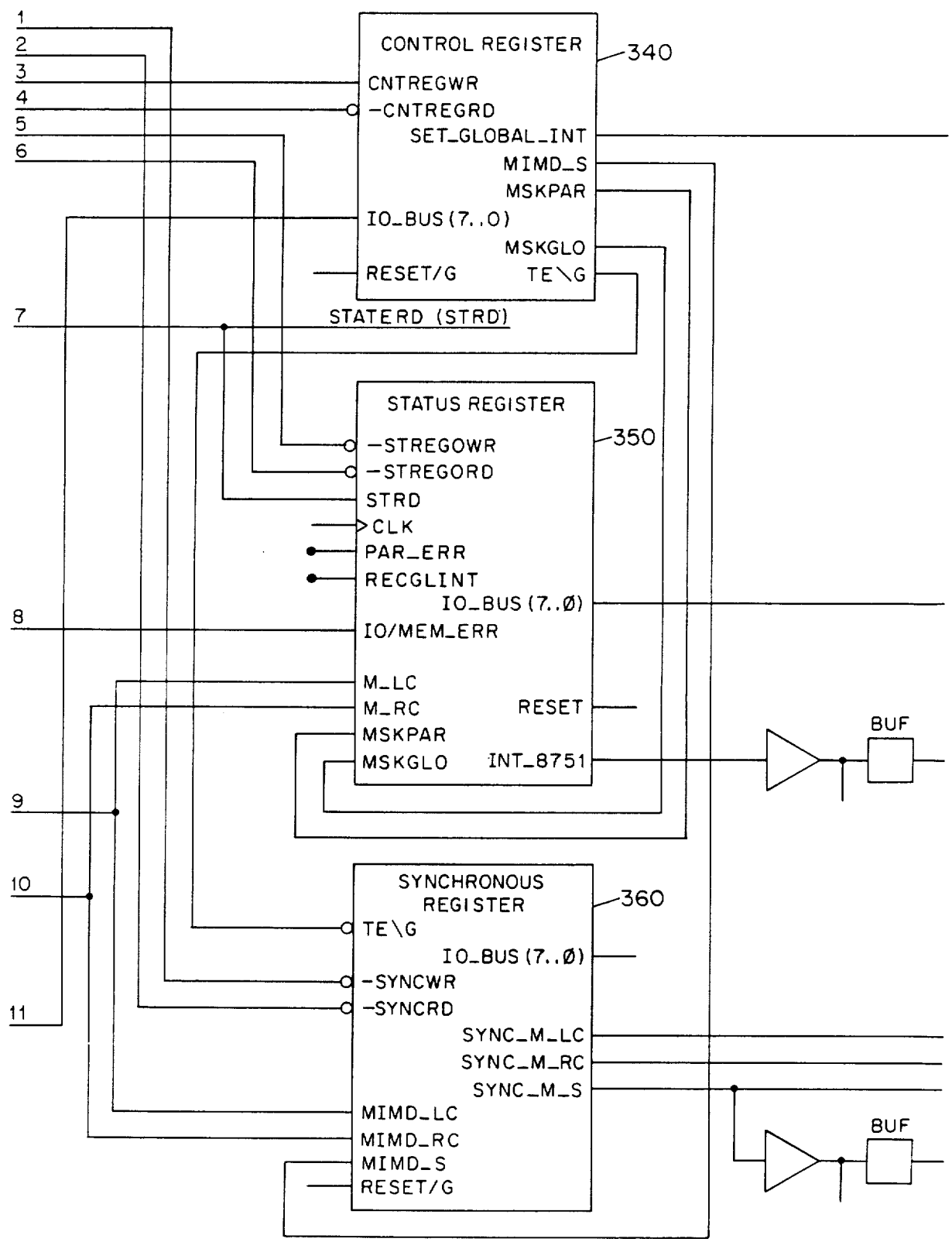

Instruction decoder 300 of FIGS. 6A and 6B is depicted in greater detail in FIGS. 17A and 17B. Instruction decoder 300 comprises six functional blocks, namely primary decoder 320, sub-decoder 330, control register 340, status register 350, synchronous register 360 and parity error address register 370. The four registers 340-370 are the CTRL, STAT, SYNC and PCAR registers described above.

Primary decoder 320 decodes the high order bits address latch 700 of FIGS. 6A and 6B over line AD_LATCH 6..4 and pin A14 of the 8751 processor of FIG. 4A to initially determine whether the I/O device is being addressed and then, if indeed it has been addressed, to select the appropriate block with either a read or write operation.

Sub-decoder 330 is a block which may be selected by primary decoder 320. Once selected, sub-decoder 330 will read the lowest 3 bits of the address on line AD-LATCH(2..∅) to sub-decoder 330 to select either an I/O device reset or control register 340 via control register write and control register read lines CNTREGWR, CNTREGRD, status register 350 via status register write and status register read lines STREG∅WR, STREG∅RD, synchronous register 360 via synchronous register write and synchronous register read lines SYNCREGWR, SYNCREGRD, or parity address register 370 via parity address register read line PADDRREGRD.

Control (CTRL) register 340 contains mask bits for interrupt handling, a kernel enable bit and a set global interrupt bit on line SET_GLOBAL_INT, all of which are used by status register 350. Control register 340 also provides a bit status on line MIMD_S for MIMD/SIMD operation. On reset all masks are enabled, the kernel bit is cleared and the device is configured for SIMD operation.

Status (STAT) register 350 allows for dynamic reading of the MIMD status of the left and right children PEs on lines MIMD_LC, MIMC_RC and receives information from the I/O device concerning the internal state of its children and itself. Status register 350 essentially serves to process parity errors and global interrupts and then to interrupt the processor if the masks are disabled. Once the processor is interrupted, it will read the status register to check if the interrupt was caused by a global interrupt or by a parity error. If the interrupt was caused by a parity error, the status register returns a bit which if set, indicates that the error was caused by a memory read operation. If this bit is not set, the parity error was caused by a transmission error in the Broadcast or Resolve-Report block. On reset, all registers are cleared.

Synchronous (SYNC) register 360, upon receiving a write command on line SYNCWR, latches the state information on the MIMD status lines MIMD_LD, MIMD_RC from the children and the MIMD status information MIMD_S in control register 340 so that this data is accessible to the other blocks of the I/O device. The kernel enable bit must be set to explicitly write to this register from the data bus. On reset, synchronous register 360 clears all bits causing all PE's to be in the SIMD mode.

Parity error address (PCAR) register 370 records the address in the address latch 700 of FIGS. 6A and 6B over line AD_LATCH7..∅ at the time of an interrupt. Parity error address register 370 is used primarily to record hardware memory chip failures.

Memory support block 400 of FIGS. 6A and 6B handles all external memory operations. This block determines which 8K×8 dynamic or static RAM memory chip 42,44 of FIG. 3 to select, enables the 16k×1 static parity memory chip 46 of FIG. 3 and controls the refreshing of two 8K×8 RAMs. Memory support block 400 is controlled by address latch enable ALE on line A14 of processor 30 and the low order bit of the address latch of processor 30 of FIG. 4A. Line A14 is examined to determine whether or not a memory operation may take place. Similarly, the low order bit of the address latch is examined to determine which of the two 8K×8 RAMS should be selected for a memory operation while the other RAM is refreshed. The parity chip is enabled over line PC_EN of memory support block 400 whenever an external memory operation occurs.

More specifically, if a memory operation is to occur, memory support block 400 of FIGS. 6A and 6B latches the low order eight bits of address that appear on port P0 of the processor 30 of FIGS. 3 and 4A and provides these low order eight bits to the external memory. Memory support block 400 must also determine whether the memory access is for the I/O device or for the external memory. This is accomplished by a bit fed to the I/O device from line A14 of port P2 of processor 30 of FIGS. 3 and 4A and subsequent memory support block generated control strobes sent to the external memory as well as the I/O device. With respect to error detection, memory support block 400 also generates and checks parity for both memory operation and I/O operations. Upon finding a parity error, the low order eight bits of the address are saved in the PCAR register by memory support block 400.

Figure 7:
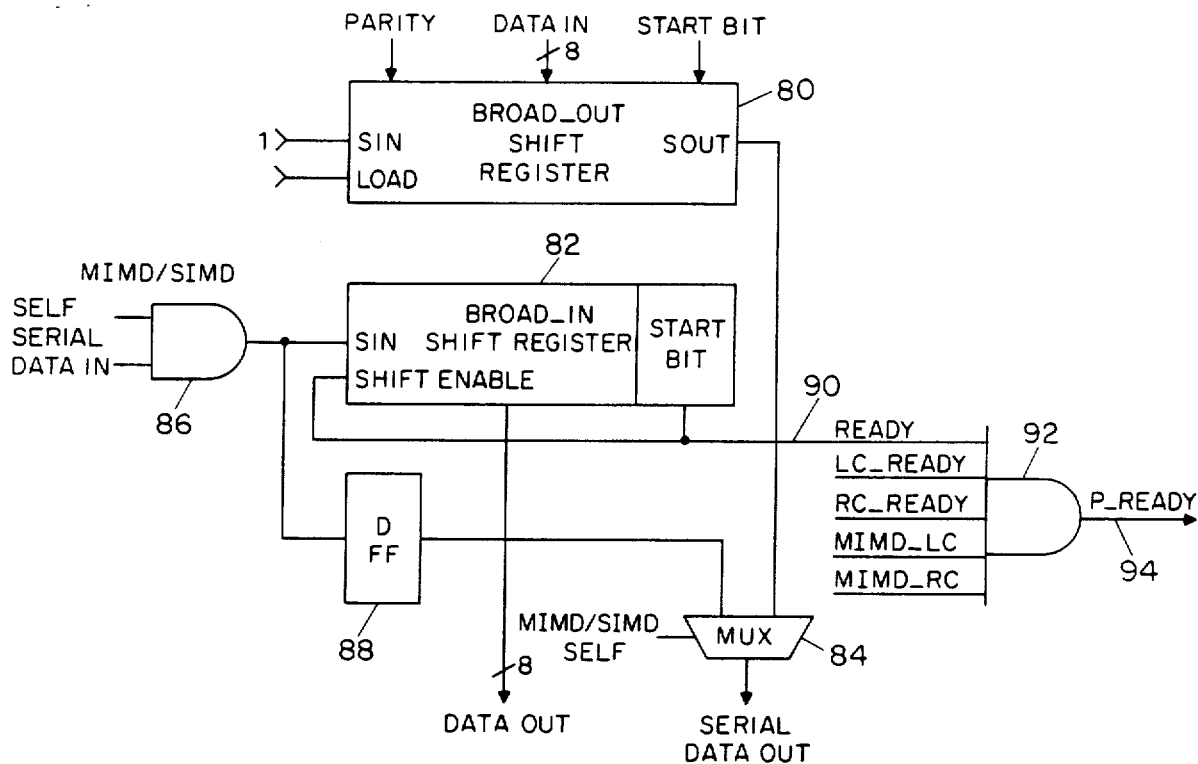
FIG. 7 is a general schematic of the broadcast block of FIGS. 6A and 6B.

A general schematic of the broadcast operation is shown in FIG. 7. Broadcast block 100 comprises a broadcast input register 82, a broadcast output register 80, a multiplexer 84, AND gates 86, 92 and a D-type flip flop 88. The broadcast input and broadcast output registers are the B_IN and B_OUT registers described above in conjunction with Table I. Broadcast is performed as a synchronous bit serial operation and depends on the mode of operation, i.e. SIMD, MSIMD, MIMD or SPMD. Broadcast comprises the transmission of instructions and/or data to/from the individual PEs. Illustratively, data and instructions are broadcast by the host coprocessor to a subset of PEs which then proceed to execute at least some of the transmitted instructions on at least some of the transmitted data.

The broadcast input register 82 is a shift register with serial input terminal $S_{in}$, a shift enable, and a parallel output terminal If the PE is in SIMD mode, incoming broadcast data illustratively originating from the host coprocessor and transmitted through higher level PEs is shifted serially into the input cell via AND gate 86. When a 0 start bit is shifted to the end of the shift register, it generates on line 90 a bin-ready signal that is routed to shift enable and disables shifting When the incoming data is read in parallel from the input register, 1-bits are parallel loaded into the input shift register to keep it from reading a data bit as a start bit. The parallel output from register 82 illustratively is connected to processor 30 via bus 51 and port 0.

The bin-ready signal provides a control signal to prevent output data from being lost if the output cell is loaded before all the children read the previous broadcast. To check for valid incoming data in input register 82, receiver PEs simply have to poll this control signal. To check whether a byte may be broadcast out, a broadcast-ready signal P_READY is generated on line 94 by each I/O device to be used by the PE and to be propagated up the tree to the I/O device of the parent PE. Broadcast-ready is generated by AND gate 92 of a PE by gating together its bin-ready signal on line 90 and the broadcast-ready signals from its two children and the MIMD/SIMD status bits for its children.

D-type flip-flop 88 also receives the incoming data from the parent PE via AND gate 86 and propagates the data through multiplexer 84 and down the tree to the children PEs delayed by one clock cycle. This data may be broadcast to all the PEs of the array with a delay of only one clock cycle for each level of the array. Thus, it takes only nine clock cycles for data to reach the lowest level (PEs 512-1023) of the array of FIG. 2 and another ten clock cycles to clock a start bit, eight bits of data and a parity bit into the broadcast input shift register 82. Since a processor instruction cycle typically requires over twenty clock cycles, there is sufficient time in one processor instruction cycle to broadcast data to all the PEs.

The broadcast output register 80 is a 10 bit shift register, 8 bits for data, 1 bit for parity and 1 bit for a 0 value start bit. The shift register has a serial input terminal $S_{in}$, a 10 bit parallel input terminal, a load terminal and a serial output terminal $S_{out}$. The serial input terminal $S_{in}$ is wired to logic 1. The output shift register shifts continuously. In a broadcast out operation, eight data bits which illustratively are the result of a computation by processor 30 or have been received from another PE, one parity bit and one start bit are parallel loaded into the shift register through the load line. These ten bits are then shifted out through the $S_{out}$ line and into a multiplexer 84 to provide a multiplexed serial output data.

Figure 8:
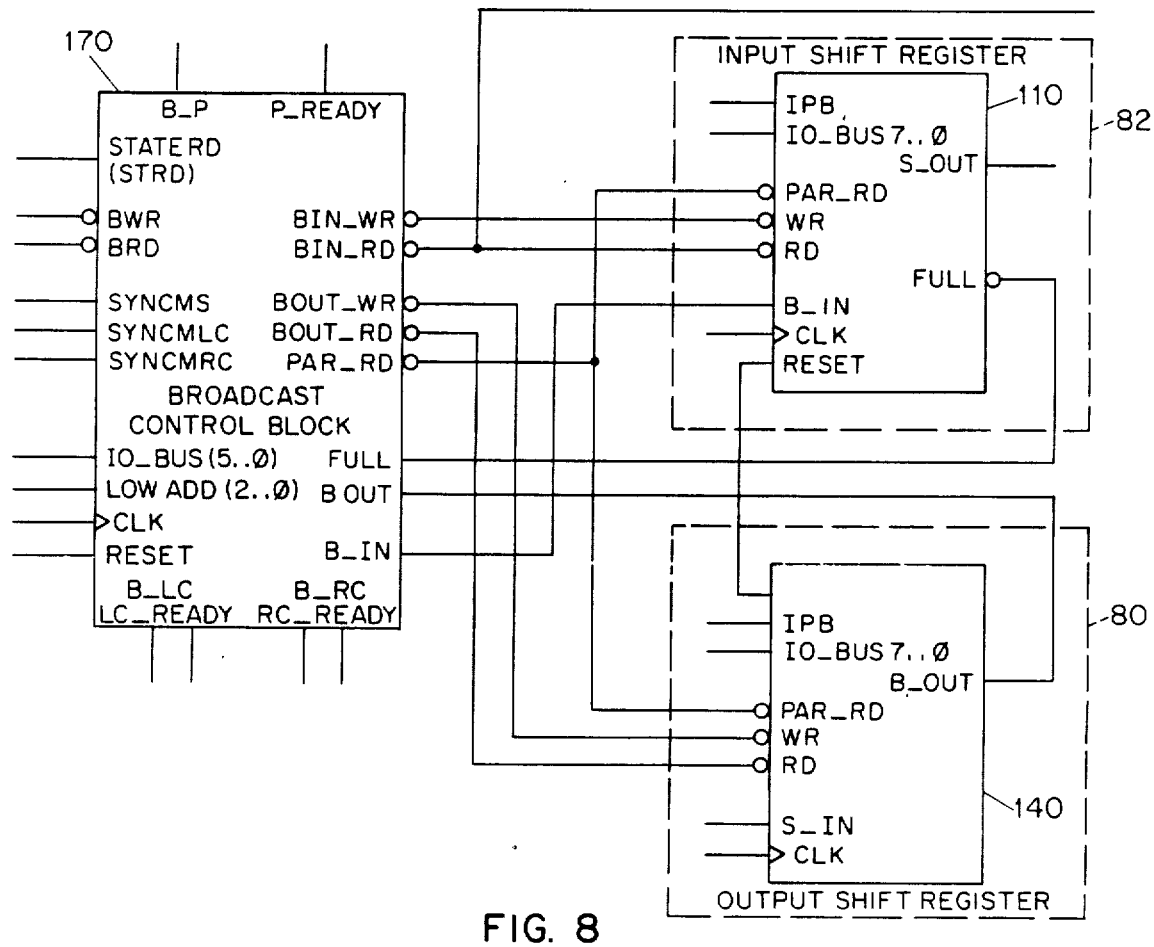
FIG. 8 is a detailed schematic of the broadcast block of FIG. 7.

Referring now to FIG. 8, broadcast block 100 of FIGS. 6A, 6B and 7 is depicted in greater detail The broadcast block functionally comprises broadcast input shift register 110 which receives and holds a byte sent to the I/O device, broadcast output shift register 140 which can transmit a byte throughout the lower subtree, and a broadcast control block 170 which performs synchronization and supervises the passage of data down the tree. As indicated above, broadcast input register 110 and output register 140 are both accessible through memory mapping, thus permitting the processor 30 to read or write a byte. The processor can determine whether a byte has been received by checking the b_dav status bit or whether a byte is available to be transmitted by checking the b_ready status bit. These bits may be read from address 12H (bits 4 and 0, respectively) or address 05H (bits 2 and 1, respectively).

Input shift register 110 and output shift register 140 of FIG. 8 correspond to input register 82 and output register 80 of FIG. 7. Broadcast control block 170 of FIG. 8 uses signals broadcast left child B_LC, left child ready LC_Ready, broadcast right child B₁₃RC and right child ready RC_Ready to determine when a byte may properly be broadcast. Similar broadcast parent and parent ready signals are provided for the parent processor on lines B_P and P_Ready of broadcast control block 170. The lines B_P and P_Ready are two of the eight lines 56 that connect the I/O device of a PE to the I/O device of its parent PE and these lines are received at the parent PE as two (B_LC, LC_Ready) of the eight lines 57 from a left child PE or two (B—RC, RC—Ready) of the eight lines 58 from a right child PE as the case may be.

The broadcast block of FIG. 8 may be in one of three states, namely idle, receive broadcast or transmit broadcast. The broadcast block generally spends a substantial amount of time in the idle state. If the processor is not in MIMD mode, it is possible for an I/O device to receive a broadcast issued from above itself in the binary tree. The transition from the idle state to the receive broadcast state is accomplished as follows. In the idle state the broadcast line to the parent B_P is held high by the parent while input shift register 110 constantly shifts in ones to prevent register 110 from reading a data bit as a 0 start bit as described in conjunction with FIG. 7. The broadcast lines to the children B_LC, B_RC are also held high by the broadcast control block 170. When a subtree signals the MIMD root PE that it is ready by setting the corresponding ready lines high, a broadcast is issued from the MIMD root PE above in the tree by sending a zero start bit. This start bit enables control block 170 and is passed on to each of the children. The bits are delayed through D flip-flop 88 so as to hold the transmission synchronous to the system clock. This causes a one bit clock delay per I/O device. Once 9 bits (8 bits data and 1 parity bit) are transmitted, the zero start bit disables input shift register 110 and drives the parent ready line P_Ready to the parent low. In like fashion, he P_Ready lines in subsequent levels of the tree go low as the zero start bit is shifted to the output of shift register 110 of that level and AND gate 92 is disabled.

At each level, the processor 30 checks its b_dav status bit to see if input shift register 110 has received the data byte. If so, the processor can read it from the I/O device. The I/O device checks input shift register 110 and if the processor has read the byte and the children's ready lines RC_Ready, LC_Ready are high, then the I/O device forces the parent ready line high signaling that it is ready to receive the next byte. If the processor has not read the byte, then control block 170 keeps the parent ready line low until the byte is read by the processor.

Figure 9:
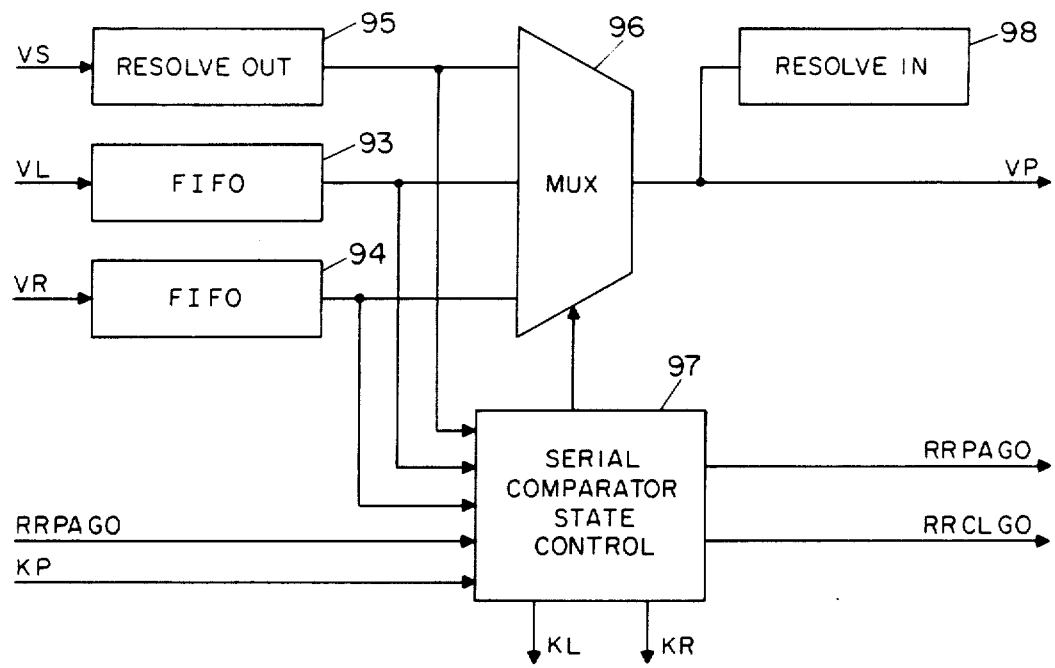
FIG. 9 is a general schematic of the resolve portion of the resolve-report block of FIGS. 6A and 6B.

Referring to FIG. 9, there is depicted a general schematic of the resolve portion of the resolve-report operation. Essentially, the resolve operation involves determining the identity of the single PE which will perform the operation of reporting the result of a computation carried out by a number of PEs. Each PE carrying out the computation is assigned a value. The single winning PE is notified that it has won and subsequently it alone reports the result. In the case of a tie, the resolve circuit designates as the winner the PE with the winning value that is encountered first in an "in order" traversal of the binary tree.

The resolve block of each I/O device computes the following values where VP is the minimum resolve value:

VP = Minimum (VS, VL, VR)

KL = KP OR (VS > VL) OR (VR > VL)

KR = KP OR (VS ≧ VR) OR (VL > VR)

KS = KP OR (VS ≦ VL) OR (VS < VR)

Where VS is the value of the number offered by the local PE, VL is the VP value computed by the left child and VR is the VP value computed by the right child. In other words, each I/O device computes the minimum of the resolve value offered locally and the minimum values computed by its two children.

KP, for kill from parent, is a Boolean signal coming into an I/O device indicating that the local PE can not be the winner of a resolve nor may any of its children be the winner. The left child is killed, KL, if there is a kill from its parent KP, or the value either at the local PE or from the right child was less than the value from the left child, VL. KR and KS, for kill right and kill self, are computed similarly. KS is the signal read locally within the PE to determine whether it is the winner of the resolve.

The minimizing part of resolve is computed bit serially as depicted in FIG. 9. Block 600 of FIGS. 6A and 6B comprises first and second FIFO serial registers 93, 94, buffer 95, multiplexer 96, comparator 97 and buffer 98. Buffer 95 and buffer 98 are the RESOLVE and RR_IN registers described in conjunction with Table I. Serial comparator 97 computes the current winning PE by comparing one bit at a time from each of the three sources VS, VL and VR and forwarding the winning bit via multiplexer 96 to the first or second FIFO serial register 93, 95 in a parent PE. Since the subtree that is computing the resolve may not be a complete binary tree, the value bits from the children may not arrive in the same clock cycle. FIFO buffers 93, 94 are used to align the incoming bits of the children with the bits of their parent in buffer 95.

Upon receipt of a KP signal or upon completion of a comparison, comparator 97 also issues the signals KL, KR and KS, determined as indicated by the logic equations set forth above.

The foregoing arrangement permits comparisons of values to be made in pipeline fashion simultaneously on several levels of the binary tree. Thus, the first bit of a winning value may be compared with the first bits of other winning values in a grandparent PE while the second bit is being compared in a parent PE and a third bit is being compared in a child PE and still additional bits are waiting to be compared. Advantageously, there is a delay of only a single clock cycle in performing the comparison at each level in the binary tree and the comparator is able to compare one bit of each of the offered values per clock cycle. As a result, the entire resolve operation can be performed in the time it takes a number offered by a PE to be clocked through the comparator plus the propagation time through the tree of one clock cycle per level. If the numbered offered is only a byte and the processor array has only ten levels, as in FIG. 2, the entire resolve operation can be completed in less than twenty-clock cycles which is less than the average processor instruction cycle.

The report operation is implemented in the kernel program by using the resolve circuit. Report is only well defined if there is a single enabled PE in the SIMD subtree. To implement the report operations, all PEs do a resolve where the SIMD disabled PEs use maximum values (e.g., FF(hex)) and the single enabled PE offers the value to be reported as its resolve value. The value offered by the enabled PE is therefore less than or equal to all other values resolved and the correct result is reported.

Figure 10A:
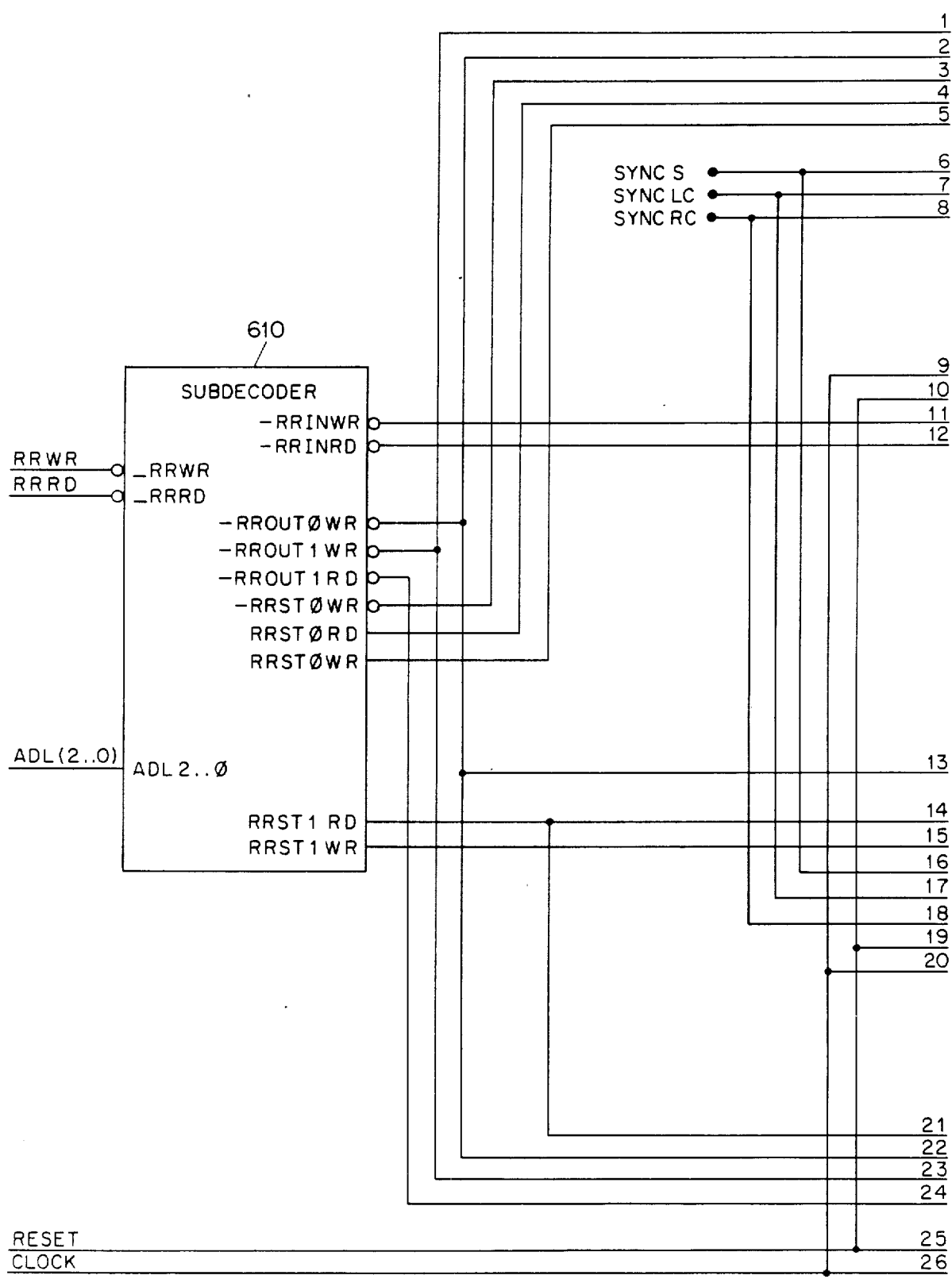
FIGS. 10A and 10B are a detailed schematic of the resolve-report block of FIGS. 6A and 6B.
Figure 10B:
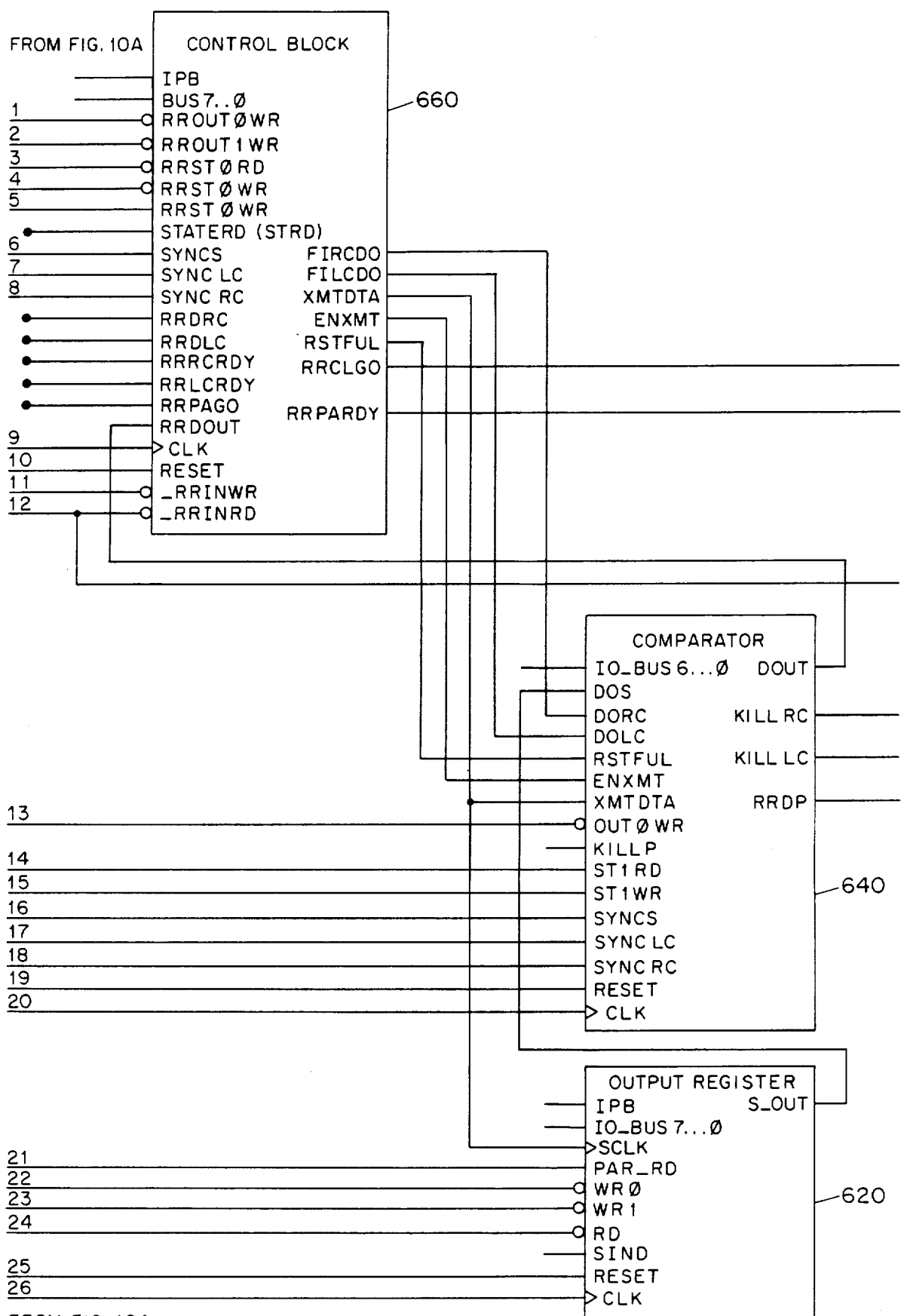

Resolve-report block 600 of FIGS. 6A and 6B is depicted in more detail in FIGS. 10A and 10B. Resolve-report block 600 comprises four blocks, namely subdecoder 610, output register 620, comparater 640 and control block 660. Subdecoder 610 performs decoding and transmits read/write enabling signals to output register 620, comparator 640 and control block 660. Output register 620 which is the RESOLVE register of Table I receives a byte from processor 30 which is to be transmitted up the binary tree on line BUS7..∅ of register 620. Comparator 640 is used primarily in the resolve operation and is a specific implementation of the serial comparator 97 of FIG. 9. Comparator 640 determines the winner of a resolve and issues KILL commands to children who do not have the proper value. Control block 660 performs transmitting, synchronizing and receiving functions. Each PE is responsible for receiving a byte from each of its children and transmitting the winning byte up to its parent as fast as possible. To do this as fast as possible, two FIFOs are used. Once this resolve is done, a data path is set up from the winning PE to the MIMD root PE.

In the practice of the invention, the report-resolve block of FIGS. 10A and 10B performs two types of transmissions, namely report and resolve. The resolve transmission utilizes two specific addresses. The first byte of a resolve is written into a first address which resets comparator 640. Following bytes are written to a second address but do not reset the comparator. If comparator 640 of the resolve-report block does a compare on the three bytes from itself and its two children and determines a winner, then that winner reports the result. However, if there is a tie involving the left child, comparator 640 will call the left child the winner; and if there is a tie between itself and the right child, the comparator determines itself to be the winner. In any case the I/O device will transmit up the winning byte with a 0 start bit. Upon encountering the last byte of a resolve, processor 30 reads the KILL signals from comparator 640 on lines kill right child KILLRC, kill left child KILLLC and kill parent KILLP in order to determine whether that byte was the winning byte of the resolve.

By this means successive levels of the binary tree select a single winning value, pass it on to the next level and disable all processing elements except the processing element which has the winning value.

The report function can then be implemented by having all the disabled processing elements report a maximum value such as FF(hex) when they are disabled and broadcasting an instruction to the winning processing element to report whatever of its data is of interest. Since all the other processing elements are set to a maximum value, operation of the resolve one more time will cause this data from the winning processing element to be selected consistently as the winning value and passed to the root processing element.

FIGS. 11-16 depict the elements of control block 660 of FIGS. 10A and 10B in greater detail. More specifically, input register 680 of FIG. 11 which is the RR—IN register of Table I receives and holds the winning byte transmitted from the child to an MIMD parent on line BUS(7..∅) of input register 680. Syncing and data enabling signals SYNC, XMTDTA are input to NAND gate 681 whose output serves as the clock to input register 680.

Figure 12:
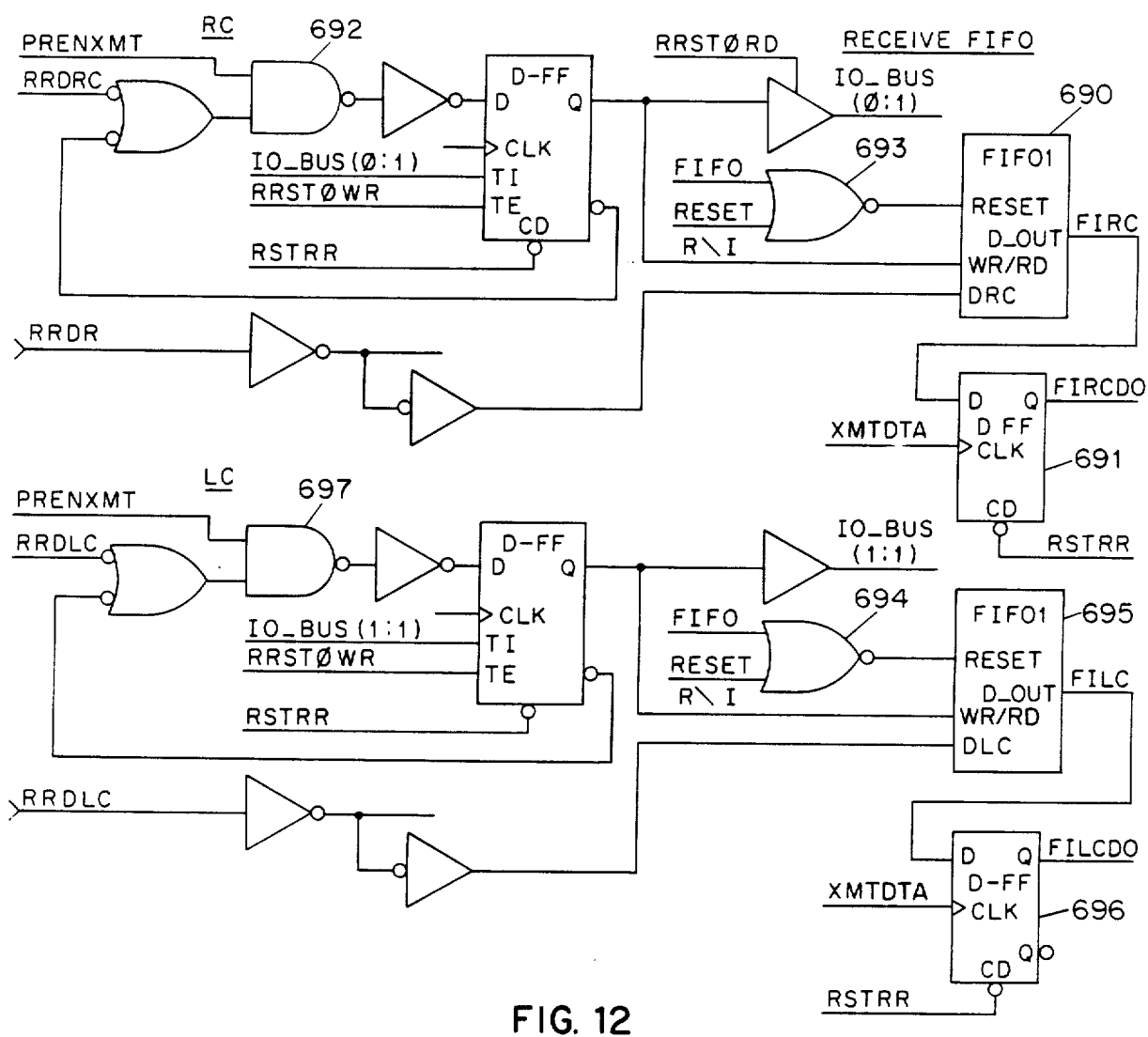

Two first-in first-out devices (FIFOs) 690, 695 of FIG. 12 receive bytes transmitted from SIMD children to their parent. These devices are depicted as FIFOs 93, 94 in FIG. 9. If FIFO 690 of the PE receives a winning byte from the PE's right child, it will transmit this winning byte up to its parent as fast as possible on line FIRCDO. Similarly, if FIFO 695 of the same PE receives a winning byte from the PE's left child, it will transmit this winning byte up to its parent as fast as possible on line FILCDO. More specifically, FIFO 690 is supplied with data from the right child over input line RRDRC of FIG. 12. Control signals PRENXMT applied to NAND gate 692 and XMTDTA applied to D-flip flop 691 permit the output of data to the PE. Similarly, FIFO 695 is supplied with data from the left child over input line RRDLC. Control signals PRENXMT applied to NAND gate 697 and XMTDTA applied to D-flip flop 696 permit the output of data to the PE. Reset signals are applied to lines FIFORESET and R/I of NOR gate 693 to reset FIFO 690 for the right child and to NOR gate 694 to reset FIFO 695 for the left child.

Figure 11:
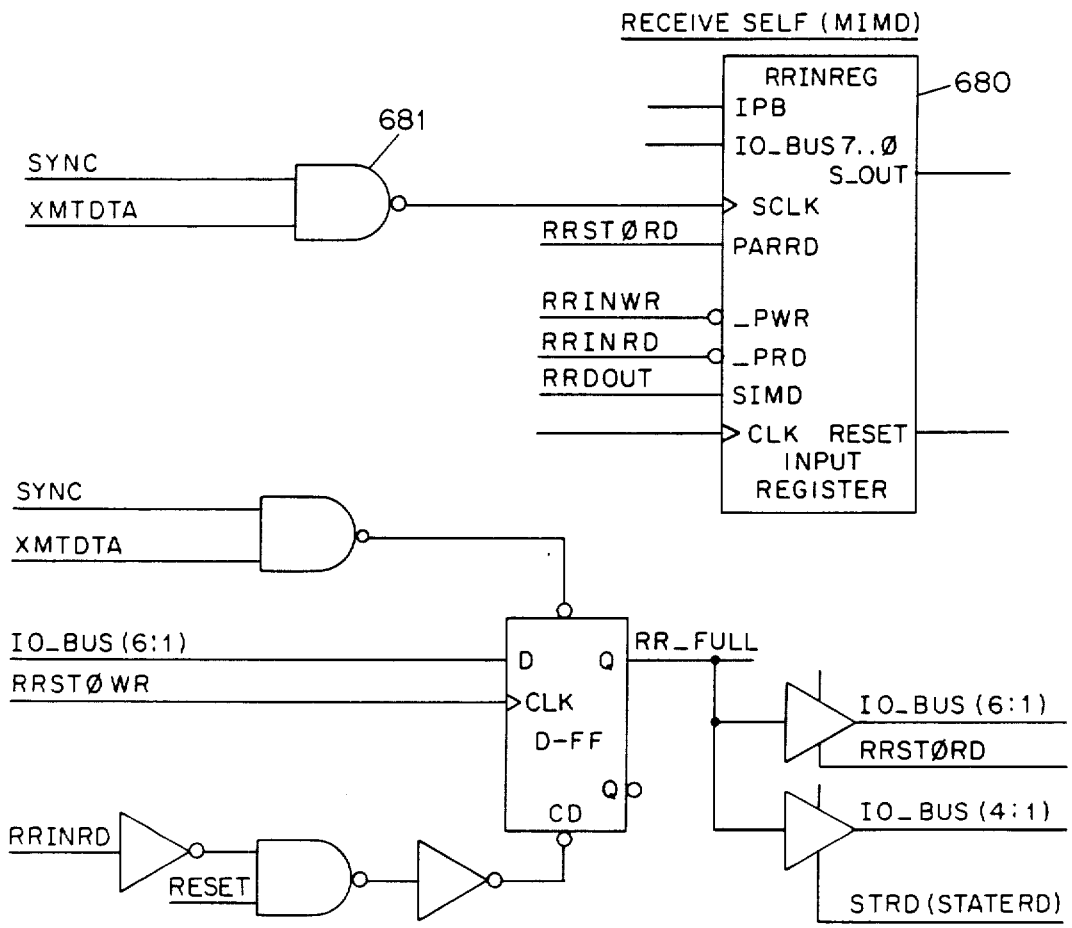
FIGS. 11 through 16 are detailed schematics of the block 660 of FIGS. 10A and 10B.

Input register 680 of FIG. 11 and output register 620 of FIGS. 10A and 10B are memory mapped to permit processor 30 to read or write a byte. Processor 30 may check the status of control block 660 to determine whether a byte has been received or needs to be transmitted.

Figure 13:
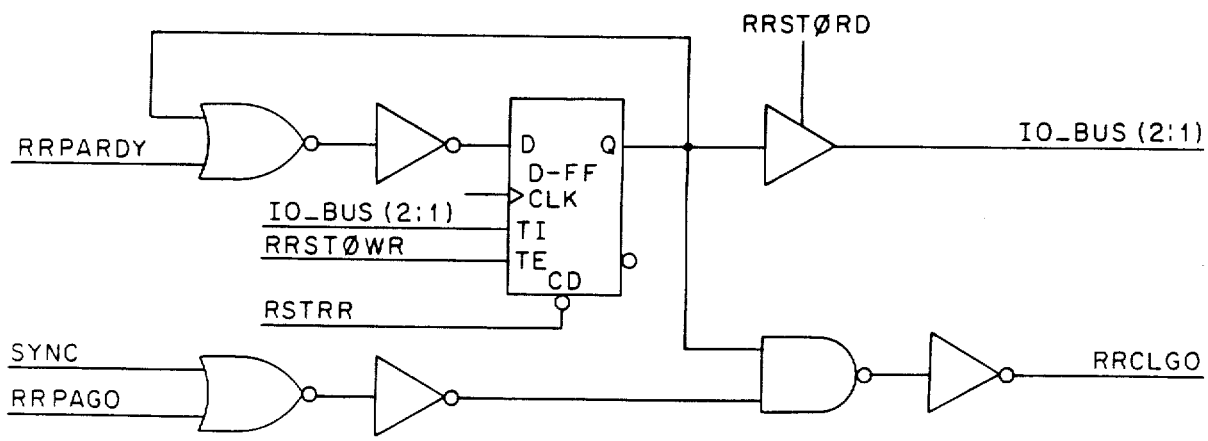

FIG. 13 depicts the GO circuitry to produce the status signal RRCLGO. Inputs to this circuit include signals RRPARDY and RRPAGO.

Figure 14:
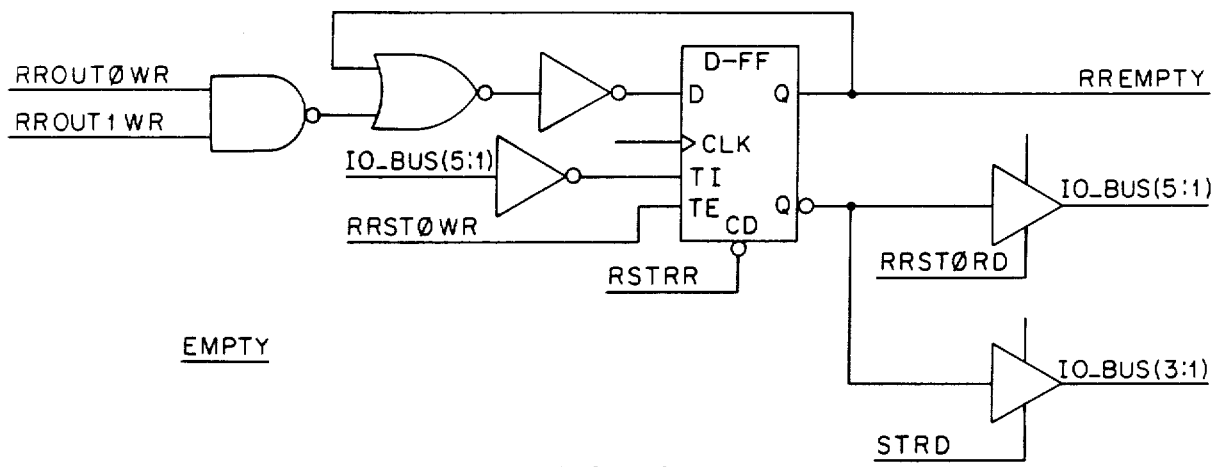

FIG. 14 depicts the EMPTY logic to produce the signal PREMPTY. Inputs to this circuit include signals ROUT∅WR and RROUT1WR.

Figure 15:
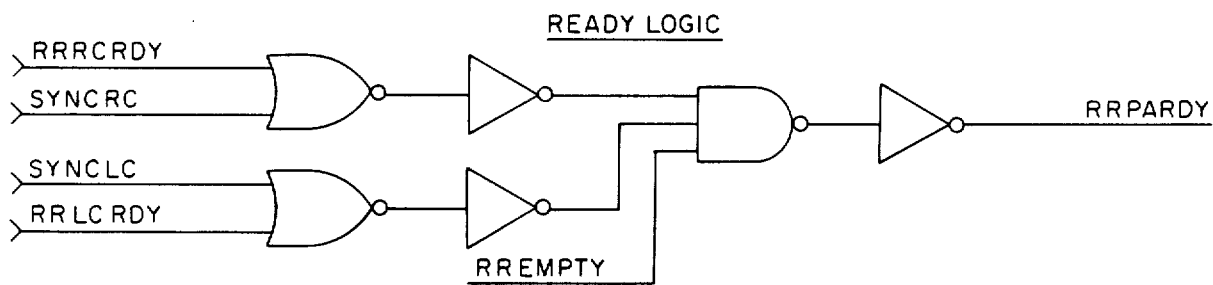

FIG. 15 depicts the READY logic to produce the signal RRPARDY. Inputs to this circuit include signals RRRCRDY, SYCRC RRLCRDY, SYNCLC and the RREMPTY signal produced by the EMPTY logic of FIG. 14.

Figure 16:
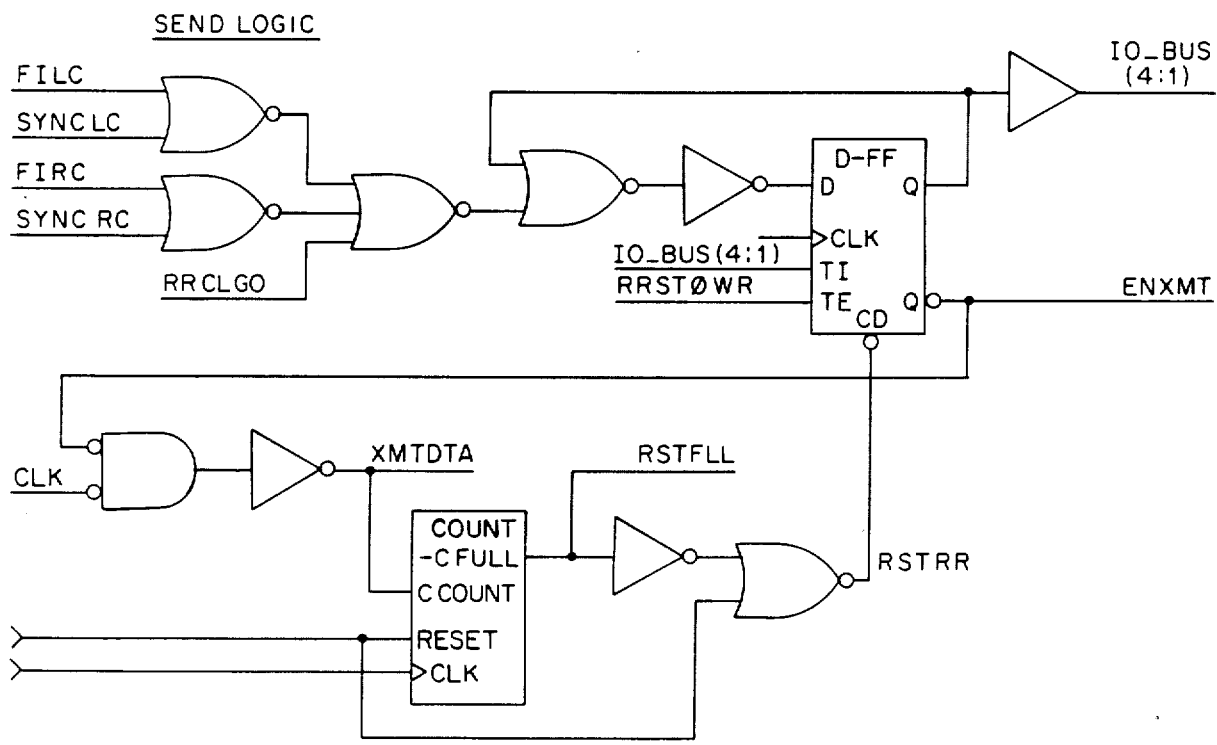

FIG. 16 depicts the SEND logic to produce the signals XMTDTA, ENXMT and RSTFLL. Inputs to this circuit include FILC, FIRC (both produced by the RECEIVE FIFO circuit of FIG. 12), SYNCLC, SYNCRC and RRCLGO (produced by the GO logic of FIG. 13).

The resolve-report block may be in any one of several states, namely, idle, transmit resolve-report byte, receive resolve-report byte and start resolve-report.

If the PE is not in MIMD root mode the idle state is defined as follows: a status signal on line RRCLGO of control block 660 of FIGS. 10A and 10B is held logic high by the MIMD Root parent; the right child and left child data lines RRDRC, RRDLC respectively, of control block 660 are held logic high; and the parent ready line RRPARDY also of control block 660 is held logic low by the child.

The I/O device leaves the idle state and enters the transmit resolve-report state when the SIMD children's processor 30 writes a resolve byte into the I/O chip's report-resolve output register 620 of FIGS. 10A and 10B. If the SIMD child is a leaf PE in the binary tree, the parent ready line RRPARDY of control block 660 of FIGS. 10A and 10B enters the logic high state. If the SIMD child is not a leaf PE, the resolve-report ready status bit, i.e, the bin-ready signal on line 90 of FIG. 7 is ANDed by AND Gate 92 of FIG. 7 with each of the children's ready lines to determine the value of the parent broadcast ready line, as shown in FIG. 7. Once a MIMD root PE determines that the SIMD sub tree is ready, the PE will cause the status signal on line RRCLGO of control block 660 of FIGS. 10A and 10B to enter the low state. When this occurs, the leaf PEs transmit up the value in output register 620 of FIGS. 10A and 10B. If the PE is not a leaf and in SIMD, then it must wait until both of its children have begun to transmit their resolve byte up the binary tree. FIFOs 690, 695 which receive bytes transmitted from SIMD right and left children to their parent permit comparator 640 of FIGS. 10A and 10B to compare the bits as soon as all three first bits from the left child, right child and their parent are received Once an SIMD PE has finished a one bit compare, it forces the status signal on line RRCLGO high, even if the parent still has a low line, so as to enable the next byte to be written without any delays.

In addition to the idle, transmit resolve-report byte and start resolve-report states, a MIMD root PE may also be in the receive resolve-report state. When a sub-tree signals to a MIMD root PE that it is ready to transmit up a byte, the MIMD root PE's I/O device initially checks that it has written a byte to output register 620 of FIGS. 10A and 10B as if it were an SIMD PE. At this point, the MIMD root PE's I/O device drops the status signal on line RRCLGO of control block 660, signalling the lowest portion of the tree to begin transmission. Signal RRCLGO is depicted in the GO Logic and the SEND logic of FIGS. 13, 16, respectively. The I/O device now enters the Receive resolve-report mode. Each child transmits up either its resolve byte or report byte, depending on the operation taking place. Once the children of the MIMD root PE transmit up the data, the MIMD root PE does a one bit compare on the data and, like any other SIMD PE, the winning byte is transmitted to resolve-report block's input register 680 of FIG. 10 over line BUS(7..∅), where it may be read by processor 30.

Referring again to FIGS. 6A and 6B, parity check block 500 checks the byte communication among the numerous PEs as well as memory operations for parity errors. Parity check block 500 essentially reads the parity of the eight-bit data line IO—BUS7..∅ connecting broadcast block 100, instruction decoder block 300, report-resolve block 600 and address latch block 700 and checks this parity against a parity bit to determine whether a parity error has occurred.

More specifically, if processor 30 writes to the broadcast block 100 or report-resolve block 600, a parity bit is placed on internal parity bit bus IPB of parity check block 500 and written as the ninth bit to the data registers of report-resolve block 600. Line IPB connects parity check block 500, broadcast block 100 and report-resolve block 600. When a memory write operation takes place, parity check block 500 generates a parity bit which is stored for future reference by being written through data line PB_OUT of parity check block 500 into 16k×1 parity RAM 46 of FIGS. 3, 4B.

Whenever processor 30 reads the data input registers in broadcast block 100 or resolve-report block 600, the parity of the data is checked against the parity bit transmitted with the data. If they fail to match, a parity error signal PAR_ERR is sent to instruction decoder block 300, which, if the parity error mask is disabled, will interrupt the processor. When an external memory read operation occurs, the parity of the data in the 8K×8 RAMs 42, 44 of FIG. 3 is checked against the parity originally written into the 16K×1 RAM 46 of FIG. 3. The line which brings this parity bit from the 16K×1 RAM to the I/O device is PB_IN of parity check block 500 of FIGS. 5A and 5B. If the parity of data bus IO_BUS7..∅ of parity check block 500 does not match PB_IN, then the parity error PAR_ERR line goes low. Parity error line PAR_ERR of parity check block 500 is connected to instruction decoder block 300 and informs the instruction decoder that a parity error has occurred. In both read cases, there is a delay of two clock cycles from when the read line toggles low until the parity bit is checked against the data bus IO_BUS7...∅. A bit in instruction decoder block 300 knows if the parity failure was local to the I/O device or was memory failure Referring back to FIGS. 6A and 6B, there is shown debug block 200 which handles system wide, or global, interrupts. These global interrupts may be generated by either processor 30 initiating its own global interrupt (known as debug) or by another I/O device.

Global interrupts permit any PE in the tree to initiate an interrupt in every other PE as well as the host coprocessor. Debug block 200 may be used to signal a hardware error or may be used to enter a debugging and diagnostic supervisor program. The I/O device is constructed so the processor may read and write the I/O device's state in order for context switching to be performed. Context switching involves saving the state of the I/O device in external memory. Upon a global interrupt, the state of the processor and the I/O device are saved and a supervisor program entered. Upon exiting the supervisor program the state of the PE and the I/O device may be restored and the tree may resume processing from where the interrupt occurred.

Debug block 200 is essentially a multidirectional bus repeater. Debug block 200 may receive an interrupt signal from four different sources; the local PE, as a result of writing a particular bit to the PE, or any of its three nearest neighbors (parent PE or left and right children PEs) in the tree. Upon receipt of an interrupt, debug block 200 will propagate the interrupt in the other three directions until the entire tree is interrupted. Upon removal of the interrupt signal from the interrupt source the block will stop propagating the signal in the other three directions.

Functionally, debug block 200 of FIGS. 6A and 6B is a finite state machine. Input signal IO_GLOBAL_INT to debug block 200 comes from instruction decoder 300 and is generated by a global interrupt status bit, which is set high or low by processor 30. Receive interrupt signal INT_IO from debug block 200 feeds instruction decoder 300 to generate an I/O device initiated interrupt. Input/output lines, global interrupt by parent G_INT_P, global interrupt by left child G_INT_LC, and global interrupt by right child G_INT_RC of debug block 200 may also be used to communicate interrupts. If the global interrupt was generated by the parent, left child or right child, and not by the I/O device, then whichever of these three lines was forced low indicating an interrupt will also force receive interrupt INT_IO low. If the global interrupt is caused by input signal IO_GLOBAL_INT to debug block 200, then signals G_INT_P, G_INT_LC and G_INT_RC will also be forced low. Once an interrupt occurs, processor 30 reads a status byte in instruction decoder block 300 which signifies whether the interrupt was local to the I/O device or was generated by a parent or child and also what should be done.

In accordance with the invention, once an interrupt occurs, all or part of the state of the I/O device should be saved in external memory to be restored at some later time. The state of instruction decoder block 300 of FIGS. 6A and 6B should be saved first, then the state of broadcast block 100, and finally the state of resolve-report block 600 in order to allow for any global communications which may have begun before the interrupt to finish before the state is saved. Following this order, no data will be lost as all broadcasts will have been completed by the time instruction decoder block 300 is read out, and all resolve-reports will have settled down by the time the broadcast block is finished being read out. After the state has been saved, a soft reset of the I/O device can be performed or a pre-determined state can be written to the I/O device. The state must be written in the same order as discussed above, since the state in instruction decoder block 300 is used in both the broadcast 100 and resolve 600 blocks.

Once the debugging is done, the state of the tree can be restored. The state of the I/O device is, again, restored in the same order as it was read out, except for one case. The broadcast input shift register must be read out by processor 30 first in order to re-initialize the register. Only after it has been read can data be written into the register. This case only applies to I/O devices which are to be restored into an MIMD status condition.

In the practice of invention, efficiency is maintained by controlling the amount of computation time required by each processor on a particular cycle. Since the amount of time required by each processor may be vastly different depending on its local state, balancing the load by copying a constrained subset of the data of a processor with a skewed computation load to other processors has been found advantageous. The data may be constrained and thereby partitioned based on any suitable ordering or hashing scheme, thus reducing the mean computation time as well as the standard deviation of the mean.

Additionally, the present invention may advantageously be practiced such that operation of the processors will essentially be assured after two successive faults as well as a 50% chance of proper operation after a third successive fault. Although common parity errors can be handled with conventional error correcting methods, complete and irrevocable non-operation of an integrated circuit poses a much more serious problem. However, this can be overcome by replicating the computation four times in a binary tree parallel processor of size $4N+3$, where $N=1023$ for the preferred embodiment.

Figure 18:
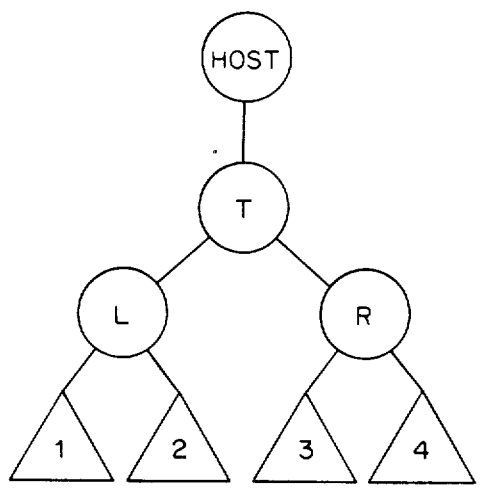
FIG. 18 is a general schematic of a fault control system.

Referring to FIG. 18, three additional nodes form the uppermost part of the N-size tree, namely T, L and R.

These three nodes essentially act as arbitrators assuring agreement between the four identical and concurrent processes in subtrees 1-4. Nodes L and R work concurrently to assure agreement between their descendant subtrees T assures agreement between L and R and aids in the isolation of faults if they occur. T, L and R themselves must be hardened against faults using conventional replicated voting logic.

More specifically, assuming a fault occurs in subtree 2, the results communicated to L by subtrees 1, 2 will differ at some point in the computation. Immediately upon noticing this discrepancy, L notifies T by setting a pin which T reads continually. As R has noticed no faults of its own, it communicates valid results to T. T proceeds to transmit R's results to the external host as well as to L.

Node L, using this value supplied by R via T verifies that subtree 2 has failed. Subsequent operation of L simply passes values from its operational subtree 1 directly to T. Sub-tree can now either work independently to isolate its own fault for direct manual repair, or remain disconnected.

If another fault occurs in one of valid subtrees 1, 3, 4, the other two computations will remain valid and isolate the faulty subtree in the same manner as discussed above. Thus, T is assured to respond with valid data through two faults. If a third fault occurs, T can choose randomly from the two remaining subtrees with a 50% probability of success. Such probability may be increased with the aid of hardware for fault detection.

Advantageously, such a fault control system can be implemented in accordance with the present invention without the need of additional PEs. Nodes T, L and R preferably perform relatively simple functions and do not require a dedicated PE.

Figure 19:
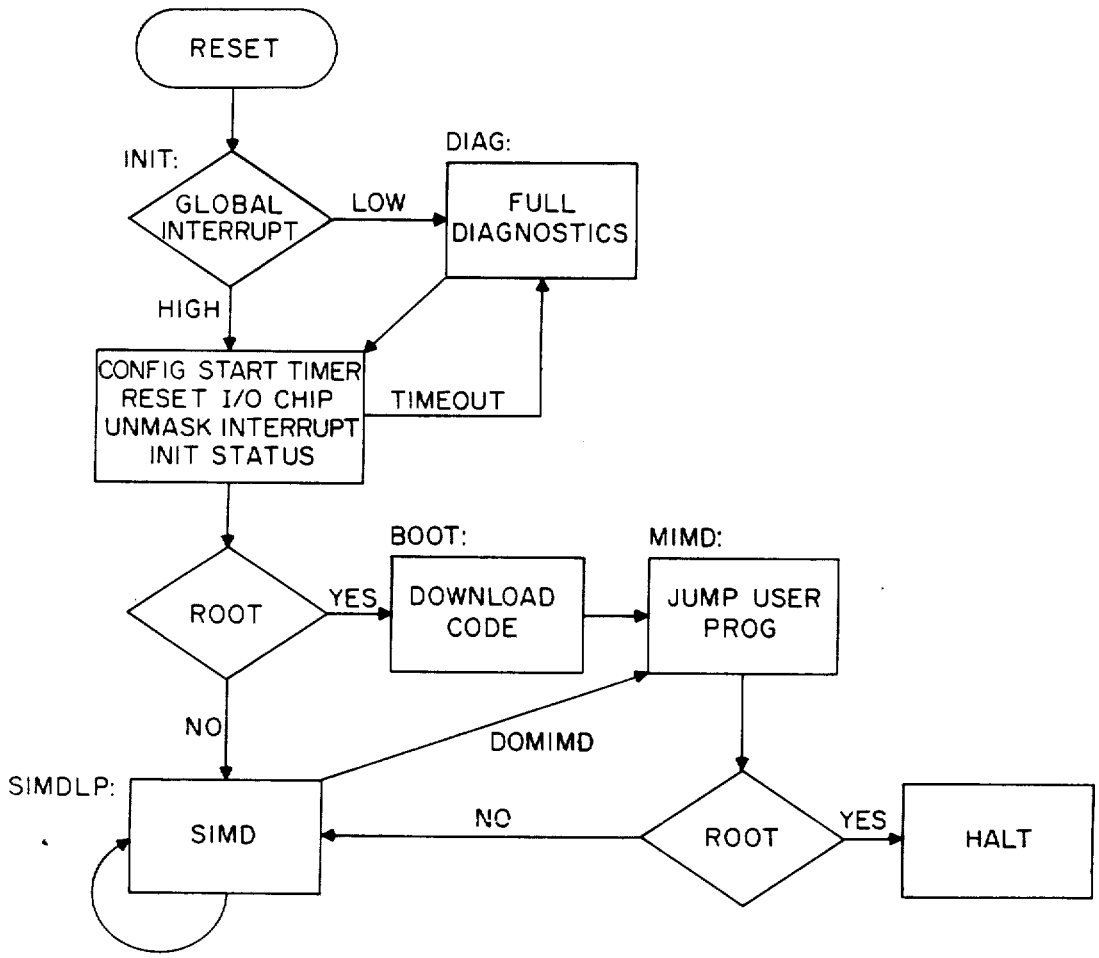
FIG. 19 is a flow chart of the software kernel.

Software control of each PE is preferably provided through a kernel system resident within EPROM of each PE. The kernel provides four functions: powerup diagnostics, low level I/O routines, high level language PPL/M support and high level language PPSL support depicted in the flow diagram of FIG. 19. Appendices I and II, respectively, list the machine code and assembly language versions of the kernel.

With respect to the powerup diagnostic function of the kernel, the PEs reset by initializing their memory to 00 upon the application of power and then examining the global interrupt lines. If the global interrupt lines are low, the PE will execute an EPROM resident diagnostic program to generally check the integrity of the PE. If the global interrupt lines are idle (i.e., high, 5 volts), the I/O device is reset, the interrupt masks are disabled, low level status bits are initialized and a timer which is activated at the beginning of initialization is checked for time-out. If the timer times-out because the initialization did not complete, the PE will execute the EPROM resident diagnostic program. Alternatively, if initialization is complete, the PE enters the PPL/M mode.

With respect to the low level I/O function of the kernel, the low level status bits located in the bit address space include bits to indicate whether a PE is a root PE, whether a PE is a right child, whether a PE is in MIMD and its parent is logically disconnected, whether a left child is logically connected, whether a right child is logically connected, whether a left child physically exists regardless of MIMD/SIMD state and whether a right child physically exists regardless of MIMD/SIMD state. Initialization software preferably examines external connections and assigns appropriate status to the low level status bits.

Low level I/O routines are generally byte oriented, except for the I/O switch context routines, which are word oriented. If a routine returns a value, the return value is left in the accumulator.

The only routines that may access the processor ports that are connected to parent and child ports of processor 30 are as follows:
 Write left child port.
 Write right child port.
 Write parent port.
 Write host (parent port, callable from root only).
 Write to both children at once.
 Write host one byte but use proper protocol (parent port, callable from root only).
 Read left child port.
 Read right child port.
 Read parent port.
 Read host (parent port, callable from root only).
 Read host one byte but use proper protocol (parent port, callable from root only).

These tree neighbor I/O routines are responsible for executing proper four cycle handshake protocol with the parent and children PEs that are logically connected to a local PE. If any such PE is not logically connected, a write is a "no operation" and a subsequent read will return a zero. While these routines test the status bits, the PPL/M high level kernel maintains the correctness of the status bits.

Since ports of a PE are generally configured for communication in a downward direction, the low level routines which move a byte upward in the binary tree must reconfigure their ports in an upward direction for the upward transmission and then return the ports to the downward direction before exiting The basic low level operation for performing tree neighbor I/O is standard four cycle handshake which requires a ready line and an acknowledge line (Ack). A typical handshake between a Master and a Slave comprises the following steps:

| Master | Slave |
| --- | --- |
| Assert data. | |
| Assert ready. | |
| | Wait until ready asserted. |
| | Pick up data, assert Ack. |
| Wait until Ack asserted. | |
| Reset ready. | |
| Remove data. | |
| | Wait until ready reset. |
| | Reset Ack. |
| Wait until Ack reset. | |
| Assert ready. | |
| | Wait until ready asserted. |

The following illustrative list of routines are performed through the I/O device:
 Read a broadcast byte;
 Send out a broadcast byte (MIMD PE only);
 Send out the first byte of a resolve;
 Send out subsequent bytes of a resolve;
 Send out bytes of a report;
 Read a resolved or reported byte (MIMD PE only);
 Set the local processor's I/O device to the children's current MIMD/SIMD state;
 Set the local processor's I/O device into an MIMD state;

Set the local processor's I/O device into an SIMD state.

Set the local processor's I/O device to have the left child in MIMD.

Set the local processor's I/O device to have the left child in SIMD.

Set the local processor's I/O device to have the right child in MIMD.

Set the local processor's I/O device to have the right child in SIMD.

Set global interrupt.

Reset global interrupt.

Mask off global interrupt.

Allow global interrupt in interrupt CPU.

Mask off parity interrupt.

Allow parity interrupt in interrupt CPU.

Predicate returns dynamic status of left child MIMD line. Nonzero means MIMD. (Affects carry bit.)

Predicate returns dynamic status of right child MIMD line. Nonzero means MIMD. (Affects carry bit.)

Predicate returns the status of the I/O device's left child state. Nonzero meand MIMD. (Affects carry.)

Predicate returns the status of the I/O device's right child state. Nonzero means MIMD. (Affects carry bit.)

Predicate returns the status of the I/O device's children's state. Nonzero means both are in MIMD. (Affects carry bit.)

Predicate returns the value of a winner bit in the carry.

Write I/O device control register.

Read I/O device control register.

Write I/O device status register.

Read I/O device status register.

Context save passed a pointer to an area of 12 bytes on an off chip RAM. This routine will write out the current context information of the I/O device and leave the I/O device reset and in SIMD mode. (Affects DPTR and carry.)

Restore context passed a pointer to an off device RAM containing a previously written context. This routine will restore the context to an I/O device. (Affects DPTR and carry.)

In general, the I/O device comprises a number of memory mapped data and status registers. Communication routines have the form, busy wait on a status bit, when the status bit indicates that the data register is ready and that the data may therefore be read or written. The predicates read and mask the appropriate status bits.

Referring back to FIG. 19, and with respect to the PPL/M high level kernel, the present invention powers up in PPL/M mode, with all PEs except the root starting to execute an SIMD interpretive loop SIMDLP. If a PE is determined to be a root PE, it will execute the bootstrap loader to download code and load in a user program.

The bootstrap loader is a PPL/M program itself. It has an MIMD part in the root and a SIMD part in each of the PEs. Input files are illustratively in Intel 8080 object module format. The bootstrap loader then decides if a particular record of an input file is part of the program image. If so, header information in the record dictates where the image part is to be loaded in an off chip RAM. This is done in all PEs so each PE has an identical program image in its memory. At the end of the file, control is passed to the user program, according to the start address dictated by the load module.

The parallel behavior of the present invention is achieved by placing identical program images of the user program in all PEs combining with the use of runtime routines to control execution and perform the communications. To illustrate this, a portion of PPL/M code before and after it has been transformed by a preprocessor is presented and the actions of the runtime routines are explained as follows: A segment of the PPL/M code:

```
main:
do;
    /*declarations of regular and slice
    variables*/
    declare a,b,c,d word external;
    declare s,t,u,v word slice external;
    /*code*/
    a = b + c;
    b = c * d;
    /*SIMD block*/
    do SIMD;
        s = t + v;
        a8 = s;
        send(lc);
        io8 = a8 + s;
        recv(p);
        t = s;
    end;
end;
```

The same segment of PPL/M code after preprocessing:

```
main:
do;
    /*declarations of regular and slice
    variables*/
    declare a,b,c,d word external;
    declare s,t,u,v word external;
    /*code*/
example: procedure;
    a = b + c;
    b = c * d;
    /*SIMD block*/
    call SIMD;
        goto 10:
        if (not en1) then goto 11;
        s = t + v;
        a8 = s;
    11:    send (lc);
        if (not en1) the goto 12;
        io8 = a8 + s;
        en1 = a1;
        if (not en1) then goto 12;
    12:    recv(p);
        if(not en1) then goto 13;
        t = s;
    13:    return;
    10:
    end;
end;
```

Notice the "do SIMD" statement has been changed to "call SIMD". Code runs conventionally in a MIND processor until a "call SIMD" is encountered. SIMD is a kernel function that looks at the return address stack of processor 30. The return address points to the instruction right after the call SIMD, which is 2 less (due to the jump 10:) than the first address of the SIMD block. Since the program image in all PEs is identical, this address will point to the same SIMD block in all PEs. The address is broadcast to all the SIMD PEs. The SIMD procedure then jumps to the SIMD block itself (since every MIMD PE must also behave like an SIMD PE). At the end of the SIMD block the return instruction acts like the return instruction of the initial SIMD call. This returns the program to the initial "goto" after the call SIMD.

The SIMD interpretive loop SIMDLP in the SIMD PE receives the two bytes of address and does an indirect subroutine call to the SIMD block. When the SIMD PE reaches the return address at the end of the SIMD block it causes the PE to return to the SIMD interpretive loop.

All PEs may now execute the same block of code, simulating SIMD behavior. Notice at the beginning of the SIMD block and right after each communication instruction and assignment to EN1 there is a statement: "if (not EN1) then goto 11;". This is how SIMD enable/disable state is simulated. Each time a communication instruction must execute it must be executed in every PE. In other words, every PE must execute precisely the same sequence of communication instructions.

The conditional jumps on EN1 jump from communication instruction to communication instruction. Other instructions are skipped only if the PE is disabled. This together with disallowing other conditionals in SIMD blocks as well as communication instructions in slice procedures insures discipline over the sequence of communications instructions.

In addition to the above, the following is a list of special locations used by the PPL/M high level kernel:

| | |
|---|---|
| En1 | The enable bit. Used by communication instructions and SIMD semantics. |
| A1 | Special bit register to hold the winner information of resolve. |
| A8 | Used as the source or destination of communication instructions. |
| IO8 | Used as the source or destination of communication instructions. |
| cprbyte | Destination of the report operation. |

Referring again to FIG. 19, DoMIMD is the primitive that will cause the partitioning of the binary tree and pass control to the roots of each of the subtrees in a three step process. First, the address of the MIMD routine to which control is being given is broadcast. The partitions and status bits are then setup. Last, the enabled P(s call the MIMD routine. In PPL/M mode the root is always in MIMD mode although if it is SIMD disabled, it will not do a routine called by DoMIMD.

An exit is placed at the end of the MIMD code to cause that subtree to reconnect above. In effect, the I/O device switches back into SIMD and updates the local MIMDflag. The last return from the MIMD procedure will unwind the return stack and leave the PE in the SIMD interpretive loop, SIMDLP.

Sync is a command that will cause a wait until all PEs below the PE executing sync have returned to SIMD mode and causes that subtree to completely reconnect.

Thus it can be seen that there is provided a new and improved system for fast, efficient and fault tolerant data processing through the use of plurality of processor elements arranged in a binary tree configuration wherein each processor element has associated with it an individual I/O device and memory.

APPENDIX 1
Copyright, Columbia University 1986

| ADDR: | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000H= | 02H | 0BH | 0CH | 02H | 0DH | 3FH | FFH | FFH | FFH | FFH | FFH | 02H | 0DH | 4FH | FFH | FFH |
| 0010H= | FFH | FFH | FFH | 02H | 0DH | 53H | FFH | FFH | FFH | FFH | FFH | 02H | 0DH | 57H | FFH | FFH |
| 0020H= | FFH | FFH | FFH | 02H | 0DH | 5BH | 02H | 02H | 40H | 02H | 02H | 5DH | 02H | 02H | 78H | 02H |
| 0030H= | 0AH | 6EH | 02H | 01H | 4DH | 02H | 0AH | 54H | 02H | 04H | 27H | 02H | 0AH | 89H | 02H | 0AH |
| 0040H= | 8DH | 02H | 02H | 19H | 02H | 0BH | 25H | 02H | 02H | 2FH | 02H | 0AH | E3H | 02H | 0DH | 74H |
| 0050H= | 02H | 0AH | 83H | 02H | 0AH | 86H | 02H | 03H | CEH | 02H | 03H | 7CH | 02H | 02H | E0H | 02H |
| 0060H= | 02H | 85H | 02H | 06H | 25H | 02H | 06H | 82H | 02H | 06H | CEH | 02H | 01H | 51H | 02H | 01H |
| 0070H= | 7BH | 02H | 01H | A6H | 02H | 01H | D1H | 02H | 01H | F5H | 02H | 06H | 0FH | 02H | 06H | 37H |
| 0080H= | 02H | 06H | 51H | 02H | 06H | 6BH | 02H | 06H | 9AH | 02H | 06H | B4H | 02H | 07H | 0CH | 02H |
| 0090H= | 06H | FDH | 02H | 07H | 3EH | 02H | 07H | 1AH | 02H | 07H | 26H | 02H | 07H | 32H | 02H | 07H |
| 00A0H= | 4FH | 02H | 07H | 62H | 02H | 07H | C1H | 02H | 07H | C8H | 02H | 07H | F1H | 02H | 07H | F7H |
| 00B0H= | 02H | 07H | FDH | 02H | 08H | 03H | 02H | 08H | 09H | 02H | 08H | 0FH | 02H | 08H | 17H | 02H |
| 00C0H= | 08H | 1FH | 02H | 08H | 45H | 02H | 08H | 54H | 02H | 08H | 8DH | 02H | 08H | 35H | 02H | 08H |
| 00D0H= | 3BH | 02H | 08H | 41H | 02H | 07H | 75H | 02H | 07H | 88H | 02H | 07H | 9BH | 02H | 07H | AEH |
| 00E0H= | 02H | 0BH | 28H | 02H | 0BH | 44H | 02H | 0BH | 65H | 02H | 0BH | 89H | 02H | 03H | 47H | 02H |
| 00F0H= | 03H | 8FH | 02H | 03H | E8H | FFH | 07H | 12H | 06H | 0FH | F5H | 30H | 85H | 2BH | 33H | 12H |
| 0100H= | 06H | CEH | 22H | A2H | 0EH | B3H | 50H | 06H | 85H | 2BH | 33H | 12H | 06H | 6BH | 12H | 06H |
| 0110H= | 37H | F5H | 30H | 22H | 30H | 0EH | 06H | 85H | 2BH | 33H | 12H | 06H | 6BH | 12H | 06H | 51H |
| 0120H= | F5H | 30H | 22H | A2H | 0EH | B3H | 50H | 07H | 12H | 06H | 0FH | F5H | 30H | 80H | 03H | 85H |
| 0130H= | 2BH | 30H | 85H | 2CH | 33H | 12H | 06H | 9AH | 22H | 30H | 0EH | 07H | 12H | 06H | 0FH | F5H |
| 0140H= | 30H | 80H | 03H | 85H | 2BH | 30H | 85H | 2CH | 33H | 12H | 06H | B4H | 22H | 12H | 0AH | 54H |
| 0150H= | 22H | A2H | 10H | 82H | 08H | B3H | E4H | 33H | F5H | 33H | 12H | 07H | 1AH | 30H | 0DH | 13H |
| 0160H= | 12H | 07H | 3EH | 30H | E0H | 02H | 80H | 03H | C3H | 80H | 01H | D3H | 92H | 0FH | A2H | 0FH |

```
0170H=B3H 92H 0FH 12H 08H 45H 82H 08H 92H 10H 22H 30H 08H 07H E5H 26H
0180H=F4H F5H 26H 80H 03H 75H 26H FFH 85H 26H 33H 12H 07H 1AH 30H 0DH
0190H=0DH 12H 07H 3EH F5H 30H 30H 08H 05H E5H 30H F4H F5H 2FH 12H 08H
01A0H=45H 82H 08H 92H 10H 22H 30H 08H 07H E5H 26H F4H F5H 26H 80H 03H
01B0H=75H 26H FFH 85H 26H 33H 12H 07H 26H 30H 0DH 0DH 12H 07H 3EH F5H
01C0H=30H 30H 08H 05H E5H 30H F4H F5H 2FH 12H 08H 45H 82H 08H 92H 10H
01D0H=22H A2H 08H B3H 50H 03H 75H 26H FFH 85H 26H 33H 12H 07H 1AH 30H
01E0H=0DH 0BH 12H 07H 3EH F5H 30H 30H 08H 03H 85H 30H 2FH 12H 08H 45H
01F0H=82H 08H 92H 10H 22H A2H 08H B3H 50H 03H 75H 26H FFH 85H 26H 33H
0200H=12H 07H 26H 30H 0DH 0BH 12H 07H 3EH F5H 30H 30H 08H 03H 85H 30H
0210H=2FH 12H 08H 45H 82H 08H 92H 10H 22H 12H 0DH 74H 80H 04H 12H 0BH
0220H=25H 22H A2H 11H B3H 50H 03H 12H 07H 62H A2H 11H 92H 0DH 22H 12H
0230H=0DH 74H 80H 04H 12H 0AH E3H 22H E5H 30H B4H 00H 02H 80H F0H 22H
0240H=E5H 26H 90H 05H FBH 25H E0H 73H 11H F7H 80H 0AH 31H 03H 80H 06H
0250H=31H 14H 80H 02H 80H 00H 30H 08H 03H 85H 30H 2CH 22H E5H 26H 90H
0260H=06H 05H 25H E0H 73H 80H 0AH 31H 23H 80H 06H 31H 39H 80H 02H 80H
0270H=00H 30H 08H 03H 85H 30H 2BH 22H 85H 26H 2EH 12H 0DH 74H 80H 04H
0280H=12H 0AH 6EH 22H 22H 85H 27H 26H 51H 78H 12H 0DH 74H 80H 04H 85H
0290H=2CH 27H 22H 85H 28H 26H 51H 78H 12H 0DH 74H 80H 04H 85H 2CH 28H
02A0H=22H 75H 33H 03H 12H 06H 82H 85H 29H 33H 12H 06H 82H 85H 2AH 33H
02B0H=12H 06H 82H AFH 29H AEH 2AH 74H 00H 6EH 4FH 60H 22H 78H 29H 12H
02C0H=0DH B4H 12H 0DH 74H 80H 10H 85H 27H 83H 85H 28H 82H E0H F5H 2CH
02D0H=31H 4DH 78H 27H 12H 0DH BCH 85H 2FH 33H 12H 06H 82H 80H D4H 22H
02E0H=85H 27H 26H 51H 78H 12H 0DH 74H 80H 04H 85H 2CH 27H 22H 85H 28H
02F0H=26H 51H 78H 12H 0DH 74H 80H 04H 85H 2CH 28H 22H 75H 33H 05H 12H
0300H=06H 82H 85H 29H 33H 12H 06H 82H 85H 2AH 33H 12H 06H 82H 12H 06H
0310H=25H F5H 29H 12H 06H 25H F5H 2AH AFH 29H AEH 2AH 74H 00H 6EH 4FH
0320H=60H 24H 78H 29H 12H 0DH B4H 12H 06H 25H F5H 30H 85H 30H 26H 51H
0330H=78H 12H 0DH 74H 80H 0EH 85H 27H 83H 85H 28H 82H E5H 2CH F0H 78H
0340H=27H 12H 0DH BCH 80H D2H 22H 75H 33H 03H 12H 06H 82H 85H 28H 33H
0350H=12H 06H 82H 85H 29H 33H 12H 06H 82H AFH 28H AEH 29H 74H 00H 6EH
0360H=4FH 60H 18H 78H 28H 12H 0DH B4H 85H 26H 83H 85H 27H 82H E0H F5H
0370H=33H 12H 06H 82H 78H 26H 12H 0DH BCH 80H DEH 22H 75H 33H 01H 12H
0380H=06H 82H 85H 26H 33H 12H 06H 82H 75H 33H 00H 12H 06H 82H 22H 75H
0390H=33H 05H 12H 06H 82H 75H 33H 00H 12H 06H 82H 75H 33H 00H 12H 06H
03A0H=82H 12H 06H 25H F5H 28H 12H 06H 25H F5H 29H AFH 28H AEH 29H 74H
03B0H=00H BFH 00H 03H 9EH 50H 16H 12H 06H 25H 85H 26H 83H 85H 27H 82H
03C0H=F0H 78H 28H 12H 0DH B4H 78H 26H 12H 0DH BCH 80H DEH 22H 75H 33H
03D0H=04H 12H 06H 82H 75H 33H 01H 12H 06H 82H 75H 33H 00H 12H 06H 82H
03E0H=12H 06H 25H F5H 30H E5H 30H 22H 75H 33H 05H 12H 06H 82H 85H 28H
03F0H=33H 12H 06H 82H 85H 29H 33H 12H 06H 82H 12H 06H 25H F5H 28H 12H
0400H=06H 25H F5H 29H AFH 28H AEH 29H 74H 00H BFH 00H 03H 9EH 50H 16H
0410H=12H 06H 25H 85H 26H 83H 85H 27H 82H F0H 78H 28H 12H 0DH B4H 78H
0420H=26H 12H 0DH BCH 80H DEH 22H 85H 27H 31H 85H 28H 32H 85H 31H 26H
0430H=51H 78H 12H 0DH 74H 80H 04H 12H 0AH 89H 22H 85H 32H 26H 51H 78H
0440H=12H 0DH 74H 80H 04H 12H 0AH 8DH 22H 22H 74H 02H 90H 40H 06H F0H
0450H=90H 40H 07H E5H 26H F0H A3H E5H 27H F0H 75H 89H 01H 75H 8CH 00H
0460H=75H 8AH 00H 75H 88H 10H 22H E5H 12H B4H 01H 13H A2H 03H 92H 09H
0470H=A2H 03H 92H 0BH 30H 03H 05H 12H 07H 88H 80H 03H 12H 07H 75H E5H
0480H=12H B4H 02H 13H A2H 03H 92H 0AH A2H 03H 92H 0CH 30H 03H 05H 12H
0490H=07H AEH 80H 03H 12H 07H 9BH 22H 85H 28H 12H 85H 81H 11H 7FH 0DH
04A0H=7EH 2BH 8FH 26H 8EH 27H 91H 4AH D3H 92H 03H 91H 67H 12H 0DH 74H
04B0H=80H 04H 12H 0AH 83H 22H 75H 26H 01H 51H 78H 12H 0DH 74H 80H 19H
04C0H=12H 06H 0FH F5H 30H 75H 33H 00H 12H 06H CEH D2H 10H 31H 51H A2H
04D0H=10H 92H 08H 31H 4DH 12H 0AH 83H 22H 75H 88H 00H C3H 92H 03H 91H
04E0H=67H D2H 00H 22H A2H 02H B3H 50H 30H 74H 01H F5H 28H 91H 98H A2H
04F0H=00H 92H 01H 74H 02H F5H 28H 91H 98H A2H 00H 92H 03H 91H 67H 75H
```

)500H=12H 01H A2H 01H 92H 03H 91H 67H 12H 0DH 74H 80H 04H 12H 0AH 83H
)510H=22H 75H 26H 01H 51H 78H 75H 2CH 00H 51H 19H 22H D2H 08H D2H A5H
)520H=C2H 02H C3H 92H 0AH 92H 09H C3H 92H 0BH 92H 0CH C2H 0DH C3H 92H
)530H=0EH 92H 0FH C2H B5H C2H B1H 90H 00H 00H E0H F5H 30H 90H 00H 00H
)540H=E0H F5H 30H A2H B0H 92H 0DH A2H 0DH 92H 11H 90H 00H 00H E0H F5H
)550H=30H D2H B5H D2H B1H 12H 0BH F8H 30H 0DH 05H 12H 07H 4FH 80H 03H
)560H=12H 07H 62H 90H 00H 10H E0H F5H 30H 90H 00H 20H E0H F5H 30H 90H
)570H=00H 00H E4H F0H 90H 00H 00H E0H 54H 06H B4H 06H 02H D2H 02H 12H
)580H=07H 75H 12H 07H 9BH A2H 11H B3H 50H 05H 12H 0DH 5FH 80H 30H D2H
)590H=0FH A2H 0FH B3H B3H 50H 28H 7FH 04H 7EH E4H 8FH 27H 8EH 28H 91H
)5A0H=27H 51H 2FH 12H 0DH 74H 80H 15H 12H 0AH 83H D2H 10H E5H 2CH B4H
)5B0H=01H 02H 80H 03H C3H 80H 01H D3H 92H 08H 31H 51H 22H 80H D2H 12H
)5C0H=0DH 74H 80H 34H 12H 0AH 83H 12H 06H 0FH 30H E0H 02H 80H 03H C3H
)5D0H=80H 01H D3H 92H 0EH 75H 33H 00H 12H 06H 9AH 75H 33H 01H 12H 06H
)5E0H=B4H 90H 00H 02H E4H F0H 30H 11H 08H 74H 12H 90H 00H 01H F0H 80H
)5F0H=06H 74H 10H 90H 00H 01H F0H 22H 12H 09H 04H 41H 48H 41H 4CH 41H
)600H=50H 41H 54H 41H 56H 41H 65H 41H 67H 41H 6BH 41H 6FH 41H 71H 20H
)610H=0DH 10H 20H 11H 0DH 20H B0H FDH E5H 90H C2H B3H 30H B0H FDH D2H
)620H=B3H 22H 74H 00H 22H 30H B0H FDH 75H 90H FFH D2H A5H C2H B3H 20H
)630H=B0H FDH E5H 90H D2H B3H 22H 20H 09H 03H 74H 00H 22H 75H 80H FFH
)640H=C2H A5H C2H B1H 20H A7H FDH E5H 80H D2H B1H D2H A5H 30H A7H FDH
)650H=22H 20H 0AH 03H 74H 00H 22H 75H 80H FFH C2H A5H C2H B5H 20H B4H
)660H=FDH E5H 80H D2H B5H D2H A5H 30H B4H FDH 22H 20H 0DH 13H 20H 11H
)670H=10H 20H B0H FDH 85H 33H 90H C2H B3H 30H B0H FDH 75H 90H FFH D2H
)680H=B3H 22H 30H B0H FDH C2H A5H 85H 33H 90H C2H B3H 20H B0H FDH 75H
)690H=90H FFH D2H B3H D2H A5H 30H B0H FDH 22H 20H 09H 01H 22H 30H A7H
)6A0H=FDH 85H 33H 80H D2H A5H C2H B1H 20H A7H FDH 75H 80H FFH D2H B1H
)6B0H=30H A7H FDH 22H 20H 0AH 01H 22H 30H B4H FDH 85H 33H 80H D2H A5H
)6C0H=C2H B5H 20H B4H FDH 75H 80H FFH D2H B5H 30H B4H FDH 22H 20H 0AH
)6D0H=03H D1H 9AH 22H 20H 09H 03H D1H B4H 22H 30H B4H FDH 30H A7H FAH
)6E0H=85H 33H 80H D2H A5H C2H B1H C2H B5H 20H B4H FDH 20H A7H FAH 75H
)6F0H=80H FFH D2H B1H D2H B5H 30H B4H FDH 30H A7H FAH 22H 30H 0DH 4DH
)700H=78H 05H E2H 30H E1H FCH 78H 11H E5H 33H F2H 22H 78H 05H E2H 30H
)710H=E2H FCH 78H 10H E2H F5H 33H F5H 30H 22H 78H 05H E2H 30H E3H FCH
)720H=78H 21H E5H 33H F2H 22H 78H 05H E2H 30H E3H FCH 78H 22H E5H 33H
)730H=F2H 22H 78H 05H E2H 30H E3H FCH 78H 22H E5H 33H F2H 22H 30H 0DH
)740H=0CH 78H 05H E2H 30H E4H FCH 78H 20H E2H F5H 33H 22H 80H FEH 78H
)750H=01H E2H 44H 22H F2H 78H 00H E2H 44H 01H F2H 78H 01H E2H 54H DFH
)760H=F2H 22H 78H 01H E2H 44H 20H F2H 78H 00H E2H 54H FEH F2H 78H 01H
)770H=E2H 54H DDH F2H 22H 78H 01H E2H 44H 20H F2H 78H 00H E2H 44H 04H
)780H=F2H 78H 01H E2H 54H DFH F2H 22H 78H 01H E2H 44H 20H F2H 78H 00H
)790H=E2H 54H FBH F2H 78H 01H E2H 54H DFH F2H 22H 78H 01H E2H 44H 20H
)7A0H=F2H 78H 00H E2H 44H 02H F2H 78H 01H E2H 54H DFH F2H 22H 78H 01H
)7B0H=E2H 44H 20H F2H 78H 00H E2H 54H FDH F2H 78H 01H E2H 54H DFH F2H
)7C0H=22H 78H 01H E2H 44H 01H F2H 22H 78H 01H E2H 54H FEH F2H 78H 02H
)7D0H=E2H 54H FBH F2H 22H 78H 01H E2H 44H 10H F2H 22H 78H 01H E2H 54H
)7E0H=EFH F2H 22H 78H 01H E2H 44H 04H F2H 22H 78H 01H E2H 54H FBH F2H
)7F0H=22H 78H 01H E5H 33H E2H 22H 78H 01H E2H F5H 33H 22H 78H 02H E5H
)800H=33H F2H 22H 78H 02H E2H F5H 33H 22H 78H 05H E2H F5H 33H 22H 78H
)810H=00H E2H A2H E2H 92H 12H 22H 78H 00H E2H A2H E1H 92H 12H 22H 78H
)820H=00H E2H C2H 12H 20H E1H 03H 02H 08H 32H 20H E2H 03H 02H 08H 32H
)830H=D2H 12H A2H 12H 22H 78H 02H E2H A2H E4H 22H 78H 02H E2H A2H E5H
)840H=22H 78H 00H F2H 22H 78H 05H E2H 30H E3H FCH 78H 24H E2H A2H E5H
)850H=B3H 92H 12H 22H 90H 4EH 00H 78H 00H E2H F0H A3H 08H E2H F0H A3H
)860H=08H E2H F0H A3H 08H E2H F0H A3H 78H 10H E2H F0H A3H 08H E2H F0H
)870H=A3H 08H E2H F0H A3H 78H 20H E2H F0H A3H 08H E2H F0H A3H 08H E2H
)880H=F0H A3H 08H E2H F0H A3H 08H E2H F0H A2H 12H 92H 13H 90H 4EH 00H

```
0890H=78H 00H E0H F2H A3H 08H F0H E2H A3H 08H E0H F2H A3H 08H E0H F2H
08A0H=A3H 78H 10H E2H E0H F2H A3H 08H E0H F2H A3H 08H E0H F2H 78H 21H
08B0H=A2H 13H 74H FFH 50H 02H 74H 00H F2H A3H 78H 20H E0H F2H A3H 08H
08C0H=E0H F2H A3H 08H E0H F2H A3H 08H E0H F2H 75H 26H 43H 12H 03H 7CH
08D0H=75H 26H 45H 12H 03H 7CH 22H 75H 26H 52H 12H 03H 7CH 75H 26H 45H
08E0H=12H 03H 7CH 22H 12H 06H 25H F5H 32H E5H 08H 25H 32H F5H 08H 12H
08F0H=06H 25H F5H 31H E5H 08H 25H 31H F5H 08H 22H 11H E4H 85H 31H 09H
0900H=85H 32H 0AH 22H C2H 10H C2H 0FH 75H 33H 05H 12H 06H 82H 75H 33H
0910H=00H 12H 06H 82H 75H 33H 00H 12H 06H 82H 12H 06H 25H F5H 30H 12H
0920H=06H 25H F5H 30H 12H 06H 25H F5H 08H 85H 08H 0DH 11H FBH E5H 0DH
0930H=B4H 02H 02H 80H 0EH E5H 0DH B4H 06H 02H 80H 45H E5H 0DH B4H 04H
0940H=02H 21H FBH 75H 10H 01H 75H 0FH 00H AFH 09H AEH 0AH 1EH BEH FFH
0950H=01H 1FH ADH 0FH ACH 10H EEH C3H 9CH EFH 9DH 40H 15H 12H 06H 25H
0960H=25H 08H F5H 08H 78H 10H 74H 01H 26H F6H 50H 04H 18H E4H 36H F6H
0970H=50H D7H 12H 06H 25H FFH E5H 08H F4H 04H 6FH 60H 02H D2H 10H 80H
0980H=A3H 12H 06H 25H 64H 00H 60H 02H D2H 0FH 11H E4H 85H 31H 26H 12H
0990H=02H 78H 12H 0DH 74H 80H 04H 85H 2CH 0BH 22H 85H 32H 26H 12H 02H
09A0H=78H 12H 0DH 74H 80H 04H 85H 2CH 0CH 22H 75H 10H 01H 75H 0FH 00H
09B0H=AEH 09H AFH 0AH 74H 04H 12H 0DH AAH ADH 0FH ACH 10H EFH C3H 9CH
09C0H=EEH 9DH 40H 28H 12H 06H 25H F5H 0EH 85H 0EH 26H 12H 02H 78H E5H
09D0H=08H 25H 0EH F5H 08H 12H 0DH 74H 80H 04H 12H 0BH B7H 22H 78H 10H
09E0H=74H 01H 26H F6H 50H 04H 18H E4H 36H F6H 50H C4H 12H 06H 25H FFH
09F0H=E5H 08H F4H 04H 6FH 60H 02H D2H 10H 21H 24H 12H 06H 25H F5H 0EH
0A00H=E5H 08H 25H 0EH F5H 08H 75H 10H 01H 75H 0FH 00H AEH 09H AFH 0AH
0A10H=74H 02H 12H 0DH AAH ADH 0FH ACH 10H EFH C3H 9CH EEH 9DH 40H 15H
0A20H=12H 06H 25H 25H 08H F5H 08H 78H 10H 74H 01H 26H F6H 50H 04H 18H
0A30H=E4H 36H F6H 50H D7H 12H 06H 25H FFH E5H 08H F4H 04H 6FH 60H 02H
0A40H=D2H 10H 30H 10H 02H 11H CAH 30H 0FH 02H 11H D7H 90H 40H 01H 12H
0A50H=0DH 9AH 21H 04H 30H 08H 08H 85H 2CH 33H 12H 07H 1AH 80H 06H 75H
0A60H=33H FFH 12H 07H 1AH 30H 0DH 05H 12H 07H 3EH F5H 2FH 22H 30H 0DH
0A70H=06H 85H 2EH 33H 12H 06H FDH 12H 07H 0CH F5H 30H 30H 08H 03H 85H
0A80H=30H 2CH 22H D2H 08H 22H C2H 08H 22H 85H 2CH 31H 22H 85H 2CH 32H
0A90H=30H 08H 03H 12H 07H 4FH 12H 06H 37H 30H E0H 02H 80H 03H C3H 80H
0AA0H=01H D3H B3H 82H 0BH 92H 09H 12H 06H 51H 30H E0H 02H 80H 03H C3H
0AB0H=80H 01H D3H B3H 82H 0CH 92H 0AH 12H 08H 41H A2H 0BH B3H 50H 03H
0AC0H=12H 07H 75H A2H 0CH B3H 50H 03H 12H 07H 9BH E4H A2H 08H 33H F5H
0AD0H=33H 12H 06H 6BH A2H 08H 72H 11H 92H 0DH 30H 08H 05H 78H 31H 12H
0AE0H=0DH A1H 22H 51H 83H 12H 06H 37H A2H 0BH B3H FFH E4H 33H 4FH F5H
0AF0H=30H 12H 06H 51H A2H 0CH B3H FFH E4H 33H 4FH 55H 30H F5H 30H 12H
0B00H=08H 41H 30H 0BH 08H 12H 08H 0FH B3H 92H 09H 80H 03H 12H 07H 75H
0B10H=30H 0CH 08H 12H 08H 17H B3H 92H 0AH 80H 03H 12H 07H 9BH 85H 30H
0B20H=33H 12H 06H 6BH 22H 51H 86H 22H 12H 06H 0FH F5H 2DH A2H 08H B3H
0B30H=50H 03H 75H 2CH 00H 78H 27H 12H 0DH A1H 85H E0H 30H 85H 30H 33H
0B40H=12H 06H CEH 22H 12H 06H 37H F5H 2DH 12H 06H 51H F5H 31H A2H 08H
0B50H=B3H 50H 03H 75H 2CH 00H 78H 27H 12H 0DH A1H 85H E0H 30H 85H 30H
0B60H=33H 12H 06H 6BH 22H 12H 06H 0FH F5H 2DH 12H 06H 0FH F5H 2EH A2H
0B70H=08H B3H 50H 03H 75H 2CH 00H 78H 27H 12H 0DH A1H 85H 2EH 33H 12H
0B80H=06H CEH 85H 2FH 33H 12H 06H CEH 22H 12H 06H 37H F5H 2DH 12H 06H
0B90H=37H F5H 2EH 12H 06H 51H F5H 31H 12H 06H 51H F5H 32H A2H 08H B3H
0BA0H=50H 03H 75H 2CH 00H 78H 27H 12H 0DH A1H 85H 2EH 33H 12H 06H 6BH
0BB0H=85H 2FH 33H 12H 06H 6BH 22H A2H 08H B3H 50H 02H 80H 18H AFH 0BH
0BC0H=AEH 0CH 7DH 0FH 7CH FFH EEH D3H 9CH EFH 9DH 40H 09H 85H 0BH 83H
0BD0H=85H 0CH 82H E5H 2CH F0H 78H 0BH 12H 0DH BCH 22H 75H D0H 00H 75H
0BE0H=81H 4DH 75H 80H FFH 75H 90H FFH 75H B0H FFH 75H A0H BFH E4H 78H
0BF0H=04H F2H 12H 0DH 4EH 02H 05H 1CH 74H 00H 90H 3FH FFH 7BH 40H 7AH
0C00H=FFH A3H F0H DAH FCH DBH F8H 78H 02H E2H 30H E2H 03H 12H 0CH 8CH
0C10H=90H 40H 00H 74H 01H C2H 00H F0H F5H 30H E0H B5H 30H 0EH 23H 30H
```

```
C20H=E0H F5H 20H 00H 12H D2H 00H 90H 40H 01H 80H EBH 30H 00H 04H C2H
C30H=A1H 80H FEH C2H A0H 80H FEH 90H 40H 00H 74H 01H 78H 01H C8H 08H
C40H=23H F5H 82H C8H F0H F5H 30H E0H B5H 30H 3BH 30H E7H F0H 90H 10H
C50H=04H F8H 74H 01H F9H 44H 40H F5H 83H E8H F0H F5H 30H E0H B5H 30H
C60H=25H E9H 23H 30H E4H EEH 75H A8H 83H 75H B8H 00H 90H 40H 0FH 74H
C70H=02H F0H 74H 40H A3H F0H 74H 0FH A3H F0H 78H 02H E2H 54H F8H F2H
C80H=74H 10H 78H 01H F2H 22H C2H A0H C2H A1H 80H FEH 12H 07H C8H F2H
C90H=78H 02H E2H 20H E2H F6H 78H 01H 74H 10H F2H 75H 08H FFH 12H 0CH
CA0H=AEH 75H 08H AAH 12H 0CH AEH 75H 08H CCH 12H 0CH AEH 22H C2H 00H
CB0H=90H 40H 00H 12H 0CH F0H 90H 40H 00H 12H 0CH FDH 12H 0DH 06H 20H
CC0H=00H 07H D2H 00H 90H 40H 01H 80H F0H C2H 00H 90H 40H 00H 7BH 20H
CD0H=7AH FFH 74H 01H F0H F5H 30H E0H B5H 30H 45H 23H 30H E0H F5H A3H
CE0H=A3H DAH EFH DBH EBH 20H 00H 07H D2H 00H 90H 40H 01H 80H DFH 22H
CF0H=7BH 40H 7AH FFH E5H 08H F0H A3H DAH FCH DBH F6H 22H 7AH FFH 7CH
D00H=FFH DCH FEH DAH FAH 22H 7BH 20H 7AH FFH E0H B5H 08H 12H 12H 0DH
D10H=18H A3H A3H DAH F5H DBH F1H 22H 30H B2H 01H 22H C2H A2H 80H FEH
D20H=30H 00H 04H C2H A1H 80H FEH C2H A0H 80H FEH 75H 88H 00H 12H 07H
D30H=C1H 85H 11H 81H C2H 03H 12H 04H 67H C2H 00H 12H 07H C8H 32H 78H
D40H=05H E2H 30H E0H 06H 76H 01H E2H 44H 01H F2H 12H 40H 0FH 32H 12H
D50H=40H 06H 32H 12H 40H 03H 32H 12H 40H 09H 32H 12H 40H 0CH 32H 90H
D60H=40H 15H 74H 02H F0H A3H 12H 07H 0CH F0H A3H 12H 07H 0CH F0H 12H
D70H=40H 15H 80H EBH A8H 81H 86H 83H 18H 86H 82H A3H A3H 85H 83H 33H
D80H=12H 06H FDH 12H 07H 0CH 85H 82H 33H 12H 06H FDH 12H 07H 0CH E4H
D90H=73H E4H 93H F5H F0H 74H 01H 93H 80H 0BH E0H F5H F0H A3H E0H 80H
DA0H=04H 86H F0H 08H E6H C0H E0H C0H F0H 22H 60H 07H F4H 04H 2FH FFH
DB0H=40H 01H 1EH 22H 08H 16H B6H FFH 02H 18H 16H 22H 08H 06H B6H 00H
DC0H=02H 18H 06H 22H
```

APPENDIX 2
Copyright, Columbia University 1986

```
dasm 0 to dc3h                                          0026H=LJMP  0240H
0000H=LJMP  0BDCH                                       0029H=LJMP  025DH
0003H=LJMP  0D3FH                                       002CH=LJMP  0278H
0006H=MOV   R7,A                                        002FH=LJMP  0A6EH
0007H=MOV   R7,A                                        0032H=LJMP  014DH
0008H=MOV   R7,A                                        0035H=LJMP  0A54H
0009H=MOV   R7,A                                        0038H=LJMP  0427H
000AH=MOV   R7,A                                        003BH=LJMP  0A89H
000BH=LJMP  0D4FH                                       003EH=LJMP  0A8DH
000EH=MOV   R7,A                                        0041H=LJMP  0219H
000FH=MOV   R7,A                                        0044H=LJMP  0B25H
0010H=MOV   R7,A                                        0047H=LJMP  022FH
0011H=MOV   R7,A                                        004AH=LJMP  0AE3H
0012H=MOV   R7,A                                        004DH=LJMP  0D74H
0013H=LJMP  0D53H                                       0050H=LJMP  0A83H
0016H=MOV   R7,A                                        0053H=LJMP  0A86H
0017H=MOV   R7,A                                        0056H=LJMP  03CEH
0018H=MOV   R7,A                                        0059H=LJMP  037CH
0019H=MOV   R7,A                                        005CH=LJMP  02E0H
001AH=MOV   R7,A                                        005FH=LJMP  0285H
001BH=LJMP  0D57H                                       0062H=LJMP  0625H
001EH=MOV   R7,A                                        0065H=LJMP  0682H
001FH=MOV   R7,A                                        0068H=LJMP  06CEH
0020H=MOV   R7,A                                        006BH=LJMP  0151H
0021H=MOV   R7,A                                        006EH=LJMP  017BH
0022H=MOV   R7,A                                        0071H=LJMP  01A6H
0023H=LJMP  0D5BH                                       0074H=LJMP  01D1H
```

```
0077H=LJMP    01F5H
007AH=LJMP    060FH
007DH=LJMP    0637H
0080H=LJMP    0651H
0083H=LJMP    066BH
0086H=LJMP    069AH
0089H=LJMP    06B4H
008CH=LJMP    070CH
008FH=LJMP    06FDH
0092H=LJMP    073EH
0095H=LJMP    071AH
0098H=LJMP    0726H
009BH=LJMP    0732H
009EH=LJMP    074FH
00A1H=LJMP    0762H
00A4H=LJMP    07C1H
00A7H=LJMP    07C8H
00AAH=LJMP    07F1H
00ADH=LJMP    07F7H
00B0H=LJMP    07FDH
00B3H=LJMP    0803H
00B6H=LJMP    0809H
00B9H=LJMP    080FH
00BCH=LJMP    0817H
00BFH=LJMP    081FH
00C2H=LJMP    0845H
00C5H=LJMP    0854H
00C8H=LJMP    088DH
00CBH=LJMP    0835H
00CEH=LJMP    083BH
00D1H=LJMP    0841H
00D4H=LJMP    0775H
00D7H=LJMP    0788H
00DAH=LJMP    079BH
00DDH=LJMP    07AEH
00E0H=LJMP    0B28H
00E3H=LJMP    0B44H
00E6H=LJMP    0B65H
00E9H=LJMP    0B89H
00ECH=LJMP    0347H
00EFH=LJMP    038FH
00F2H=LJMP    03E8H
00F5H=MOV     R7,A
00F6H=INC     @R1
00F7H=LCALL   060FH
00FAH=MOV     30H,A
00FCH=MOV     33H,2BH
00FFH=LCALL   06CEH
0102H=RET
0103H=MOV     C,0EH
0105H=CPL     C
0106H=JNC     010EH
0108H=MOV     33H,2BH
010BH=LCALL   066BH
010EH=LCALL   0637H
0111H=MOV     30H,A
0113H=RET
0114H=JNB     0EH,011DH
0117H=MOV     33H,2BH
011AH=LCALL   066BH
011DH=LCALL   0651H
0120H=MOV     30H,A
0122H=RET
0123H=MOV     C,0EH
0125H=CPL     C
0126H=JNC     012FH
0128H=LCALL   060FH
012BH=MOV     30H,A
012DH=SJMP    0132H
012FH=MOV     30H,2BH
0132H=MOV     33H,2CH
0135H=LCALL   069AH
0138H=RET
0139H=JNB     0EH,0143H
013CH=LCALL   060FH
013FH=MOV     30H,A
0141H=SJMP    0146H
0143H=MOV     30H,2BH
0146H=MOV     33H,2CH
0149H=LCALL   06B4H
014CH=RET
014DH=LCALL   0A54H
0150H=RET
0151H=MOV     C,10H
0153H=ANL     C,08H
0155H=CPL     C
0156H=CLR     A
0157H=RLC     A
0158H=MOV     33H,A
015AH=LCALL   071AH
015DH=JNB     0DH,0173H
0160H=LCALL   073EH
0163H=JNB     E0H,0168H
0166H=SJMP    016BH
0168H=CLR     C
0169H=SJMP    016CH
016BH=SETB    C
016CH=MOV     0FH,C
016EH=MOV     C,0FH
0170H=CPL     C
0171H=MOV     0FH,C
0173H=LCALL   0845H
0176H=ANL     C,08H
0178H=MOV     10H,C
017AH=RET
017BH=JNB     08H,0185H
017EH=MOV     A,26H
0180H=CPL     A
0181H=MOV     26H,A
0183H=SJMP    0188H
0185H=MOV     26H,#FFH
0188H=MOV     33H,26H
018BH=LCALL   071AH
018EH=JNB     0DH,019EH
```

```
0191H=LCALL   073EH
0194H=MOV     30H,A
0196H=JNB     08H,019EH
0199H=MOV     A,30H
019BH=CPL     A
019CH=MOV     2FH,A
019EH=LCALL   0845H
01A1H=ANL     C,08H
01A3H=MOV     10H,C
01A5H=RET
01A6H=JNB     08H,01B0H
01A9H=MOV     A,26H
01ABH=CPL     A
01ACH=MOV     26H,A
01AEH=SJMP    01B3H
01B0H=MOV     26H,#FFH
01B3H=MOV     33H,26H
01B6H=LCALL   0726H
01B9H=JNB     0DH,01C9H
01BCH=LCALL   073EH
01BFH=MOV     30H,A
01C1H=JNB     08H,01C9H
01C4H=MOV     A,30H
01C6H=CPL     A
01C7H=MOV     2FH,A
01C9H=LCALL   0845H
01CCH=ANL     C,08H
01CEH=MOV     10H,C
01D0H=RET
01D1H=MOV     C,08H
01D3H=CPL     C
01D4H=JNC     01D9H
01D6H=MOV     26H,#FFH
01D9H=MOV     33H,26H
01DCH=LCALL   071AH
01DFH=JNB     0DH,01EDH
01E2H=LCALL   073EH
01E5H=MOV     30H,A
01E7H=JNB     08H,01EDH
01EAH=MOV     2FH,30H
01EDH=LCALL   0845H
01F0H=ANL     C,08H
01F2H=MOV     10H,C
01F4H=RET
01F5H=MOV     C,08H
01F7H=CPL     C
01F8H=JNC     01FDH
01FAH=MOV     26H,#FFH
01FDH=MOV     33H,26H
0200H=LCALL   0726H
0203H=JNB     0DH,0211H
0206H=LCALL   073EH
0209H=MOV     30H,A
020BH=JNB     08H,0211H
020EH=MOV     2FH,30H
0211H=LCALL   0845H
0214H=ANL     C,08H
0216H=MOV     10H,C
0218H=RET
0219H=LCALL   0D74H
021CH=SJMP    0222H
021EH=LCALL   0B25H
0221H=RET
0222H=MOV     C,11H
0224H=CPL     C
0225H=JNC     022AH
0227H=LCALL   0762H
022AH=MOV     C,11H
022CH=MOV     0DH,C
022EH=RET
022FH=LCALL   0D74H
0232H=SJMP    0238H
0234H=LCALL   0AE3H
0237H=RET
0238H=MOV     A,30H
023AH=CJNE    A,#00H,023FH
023DH=SJMP    022FH
023FH=RET
0240H=MOV     A,26H
0242H=MOV     DPTR,#05FBH
0245H=ADD     A,.ACC
0247H=JMP     @A+DPTR
0248H=ACALL   00F7H
024AH=SJMP    0256H
024CH=ACALL   0103H
024EH=SJMP    0256H
0250H=ACALL   0114H
0252H=SJMP    0256H
0254H=SJMP    0256H
0256H=JNB     08H,025CH
0259H=MOV     2CH,30H
025CH=RET
025DH=MOV     A,26H
025FH=MOV     DPTR,#0605H
0262H=ADD     A,.ACC
0264H=JMP     @A+DPTR
0265H=SJMP    0271H
0267H=ACALL   0123H
0269H=SJMP    0271H
026BH=ACALL   0139H
026DH=SJMP    0271H
026FH=SJMP    0271H
0271H=JNB     08H,0277H
0274H=MOV     2BH,30H
0277H=RET
0278H=MOV     2EH,26H
027BH=LCALL   0D74H
027EH=SJMP    0284H
0280H=LCALL   0A6EH
0283H=RET
0284H=RET
0285H=MOV     26H,27H
```

```
0288H=ACALL   0278H
028AH=LCALL   0D74H
028DH=SJMP    0293H
028FH=MOV     27H,2CH
0292H=RET
0293H=MOV     26H,28H
0296H=ACALL   0278H
0298H=LCALL   0D74H
029BH=SJMP    02A1H
029DH=MOV     28H,2CH
02A0H=RET
02A1H=MOV     33H,#03H
02A4H=LCALL   0682H
02A7H=MOV     33H,29H
02AAH=LCALL   0682H
02ADH=MOV     33H,2AH
02B0H=LCALL   0682H
02B3H=MOV     R7,29H
02B5H=MOV     R6,2AH
02B7H=MOV     A,#00H
02B9H=XRL     A,R6
02BAH=ORL     A,R7
02BBH=JZ      02DFH
02BDH=MOV     R0,#29H
02BFH=LCALL   0DB4H
02C2H=LCALL   0D74H
02C5H=SJMP    02D7H
02C7H=MOV     .DPH,27H
02CAH=MOV     .DPL,28H
02CDH=MOVX    A,@DPTR
02CEH=MOV     2CH,A
02D0H=ACALL   014DH
02D2H=MOV     R0,#27H
02D4H=LCALL   0DBCH
02D7H=MOV     33H,2FH
02DAH=LCALL   0682H
02DDH=SJMP    02B3H
02DFH=RET
02E0H=MOV     26H,27H
02E3H=ACALL   0278H
02E5H=LCALL   0D74H
02E8H=SJMP    02EEH
02EAH=MOV     27H,2CH
02EDH=RET
02EEH=MOV     26H,28H
02F1H=ACALL   0278H
02F3H=LCALL   0D74H
02F6H=SJMP    02FCH
02F8H=MOV     28H,2CH
02FBH=RET
02FCH=MOV     33H,#05H
02FFH=LCALL   0682H
0302H=MOV     33H,29H
0305H=LCALL   0682H
0308H=MOV     33H,2AH
030BH=LCALL   0682H
030EH=LCALL   0625H
0311H=MOV     29H,A
0313H=LCALL   0625H
0316H=MOV     2AH,A
0318H=MOV     R7,29H
031AH=MOV     R6,2AH
031CH=MOV     A,#00H
031EH=XRL     A,R6
031FH=ORL     A,R7
0320H=JZ      0346H
0322H=MOV     R0,#29H
0324H=LCALL   0DB4H
0327H=LCALL   0625H
032AH=MOV     30H,A
032CH=MOV     26H,30H
032FH=ACALL   0278H
0331H=LCALL   0D74H
0334H=SJMP    0344H
0336H=MOV     .DPH,27H
0339H=MOV     .DPL,28H
033CH=MOV     A,2CH
033EH=MOVX    @DPTR,A
033FH=MOV     R0,#27H
0341H=LCALL   0DBCH
0344H=SJMP    0318H
0346H=RET
0347H=MOV     33H,#03H
034AH=LCALL   0682H
034DH=MOV     33H,28H
0350H=LCALL   0682H
0353H=MOV     33H,29H
0356H=LCALL   0682H
0359H=MOV     R7,28H
035BH=MOV     R6,29H
035DH=MOV     A,#00H
035FH=XRL     A,R6
0360H=ORL     A,R7
0361H=JZ      037BH
0363H=MOV     R0,#28H
0365H=LCALL   0DB4H
0368H=MOV     .DPH,26H
036BH=MOV     .DPL,27H
036EH=MOVX    A,@DPTR
036FH=MOV     33H,A
0371H=LCALL   0682H
0374H=MOV     R0,#26H
0376H=LCALL   0DBCH
0379H=SJMP    0359H
037BH=RET
037CH=MOV     33H,#01H
037FH=LCALL   0682H
0382H=MOV     33H,26H
0385H=LCALL   0682H
0388H=MOV     33H,#00H
038BH=LCALL   0682H
038EH=RET
038FH=MOV     33H,#05H
0392H=LCALL   0682H
```

```
395H=MOV     33H,#00H
398H=LCALL   0682H
39BH=MOV     33H,#00H
39EH=LCALL   0682H
3A1H=LCALL   0625H
3A4H=MOV     28H,A
3A6H=LCALL   0625H
3A9H=MOV     29H,A
3ABH=MOV     R7,28H
3ADH=MOV     R6,29H
3AFH=MOV     A,#00H
3B1H=CJNE    R7,#00H,03B7H
3B4H=SUBB    A,R6
3B5H=JNC     03CDH
3B7H=LCALL   0625H
3BAH=MOV     .DPH,26H
3BDH=MOV     .DPL,27H
3C0H=MOVX    @DPTR,A
3C1H=MOV     R0,#28H
3C3H=LCALL   0DB4H
3C6H=MOV     R0,#26H
3C8H=LCALL   0DBCH
3CBH=SJMP    03ABH
3CDH=RET
3CEH=MOV     33H,#04H
3D1H=LCALL   0682H
3D4H=MOV     33H,#01H
3D7H=LCALL   0682H
3DAH=MOV     33H,#00H
3DDH=LCALL   0682H
3E0H=LCALL   0625H
3E3H=MOV     30H,A
3E5H=MOV     A,30H
3E7H=RET
3E8H=MOV     33H,#05H
3EBH=LCALL   0682H
3EEH=MOV     33H,28H
3F1H=LCALL   0682H
3F4H=MOV     33H,29H
3F7H=LCALL   0682H
3FAH=LCALL   0625H
3FDH=MOV     28H,A
3FFH=LCALL   0625H
0402H=MOV    29H,A
0404H=MOV    R7,28H
0406H=MOV    R6,29H
0408H=MOV    A,#00H
040AH=CJNE   R7,#00H,0410H
040DH=SUBB   A,R6
040EH=JNC    0426H
0410H=LCALL  0625H
0413H=MOV    .DPH,26H
0416H=MOV    .DPL,27H
0419H=MOVX   @DPTR,A
041AH=MOV    R0,#28H
041CH=LCALL  0DB4H
041FH=MOV    R0,#26H
0421H=LCALL  0DBCH
0424H=SJMP   0404H
0426H=RET
0427H=MOV    31H,27H
042AH=MOV    32H,28H
042DH=MOV    26H,31H
0430H=ACALL  0278H
0432H=LCALL  0D74H
0435H=SJMP   043BH
0437H=LCALL  0A89H
043AH=RET
043BH=MOV    26H,32H
043EH=ACALL  0278H
0440H=LCALL  0D74H
0443H=SJMP   0449H
0445H=LCALL  0A8DH
0448H=RET
0449H=RET
044AH=MOV    A,#02H
044CH=MOV    DPTR,#4006H
044FH=MOVX   @DPTR,A
0450H=MOV    DPTR,#4007H
0453H=MOV    A,26H
0455H=MOVX   @DPTR,A
0456H=INC    DPTR
0457H=MOV    A,27H
0459H=MOVX   @DPTR,A
045AH=MOV    .TMOD,#01H
045DH=MOV    .TH0,#00H
0460H=MOV    .TL0,#00H
0463H=MOV    .TCON,#10H
0466H=RET
0467H=MOV    A,12H
0469H=CJNE   A,#01H,047FH
046CH=MOV    C,03H
046EH=MOV    09H,C
0470H=MOV    C,03H
0472H=MOV    0BH,C
0474H=JNB    03H,047CH
0477H=LCALL  0788H
047AH=SJMP   047FH
047CH=LCALL  0775H
047FH=MOV    A,12H
0481H=CJNE   A,#02H,0497H
0484H=MOV    C,03H
0486H=MOV    0AH,C
0488H=MOV    C,03H
048AH=MOV    0CH,C
048CH=JNB    03H,0494H
048FH=LCALL  07AEH
0492H=SJMP   0497H
0494H=LCALL  079BH
0497H=RET
0498H=MOV    12H,28H
049BH=MOV    11H,.SP
049EH=MOV    R7,#0DH
04A0H=MOV    R6,#2BH
```

```
04A2H=MOV      26H,R7
04A4H=MOV      27H,R6
04A6H=ACALL    044AH
04A8H=SETB     C
04A9H=MOV      03H,C
04ABH=ACALL    0467H
04ADH=LCALL    0D74H
04B0H=SJMP     04B6H
04B2H=LCALL    0A83H
04B5H=RET
04B6H=MOV      26H,#01H
04B9H=ACALL    0278H
04BBH=LCALL    0D74H
04BEH=SJMP     04D9H
04C0H=LCALL    060FH
04C3H=MOV      30H,A
04C5H=MOV      33H,#00H
04C8H=LCALL    06CEH
04CBH=SETB     10H
04CDH=ACALL    0151H
04CFH=MOV      C,10H
04D1H=MOV      08H,C
04D3H=ACALL    014DH
04D5H=LCALL    0A83H
04D8H=RET
04D9H=MOV      .TCON,#00H
04DCH=CLR      C
04DDH=MOV      03H,C
04DFH=ACALL    0467H
04E1H=SETB     00H
04E3H=RET
04E4H=MOV      C,02H
04E6H=CPL      C
04E7H=JNC      0519H
04E9H=MOV      A,#01H
04EBH=MOV      28H,A
04EDH=ACALL    0498H
04EFH=MOV      C,00H
04F1H=MOV      01H,C
04F3H=MOV      A,#02H
04F5H=MOV      28H,A
04F7H=ACALL    0498H
04F9H=MOV      C,00H
04FBH=MOV      03H,C
04FDH=ACALL    0467H
04FFH=MOV      12H,#01H
0502H=MOV      C,01H
0504H=MOV      03H,C
0506H=ACALL    0467H
0508H=LCALL    0D74H
050BH=SJMP     0511H
050DH=LCALL    0A83H
0510H=RET
0511H=MOV      26H,#01H
0514H=ACALL    0278H
0516H=MOV      2CH,#00H
0519H=ACALL    0219H
051BH=RET
051CH=SETB     08H
051EH=SETB     A5H
0520H=CLR      02H
0522H=CLR      C
0523H=MOV      0AH,C
0525H=MOV      09H,C
0527H=CLR      C
0528H=MOV      0BH,C
052AH=MOV      0CH,C
052CH=CLR      0DH
052EH=CLR      C
052FH=MOV      0EH,C
0531H=MOV      0FH,C
0533H=CLR      .T1
0535H=CLR      .TXD
0537H=MOV      DPTR,#0000H
053AH=MOVX     A,@DPTR
053BH=MOV      30H,A
053DH=MOV      DPTR,#0000H
0540H=MOVX     A,@DPTR
0541H=MOV      30H,A
0543H=MOV      C,.RXD
0545H=MOV      0DH,C
0547H=MOV      C,0DH
0549H=MOV      11H,C
054BH=MOV      DPTR,#0000H
054EH=MOVX     A,@DPTR
054FH=MOV      30H,A
0551H=SETB     .T1
0553H=SETB     .TXD
0555H=LCALL    0BF8H
0558H=JNB      0DH,0560H
055BH=LCALL    074FH
055EH=SJMP     0563H
0560H=LCALL    0762H
0563H=MOV      DPTR,#0010H
0566H=MOVX     A,@DPTR
0567H=MOV      30H,A
0569H=MOV      DPTR,#0020H
056CH=MOVX     A,@DPTR
056DH=MOV      30H,A
056FH=MOV      DPTR,#0000H
0572H=CLR      A
0573H=MOVX     @DPTR,A
0574H=MOV      DPTR,#0000H
0577H=MOVX     A,@DPTR
0578H=ANL      A,#06H
057AH=CJNE     A,#06H,057FH
057DH=SETB     02H
057FH=LCALL    0775H
0582H=LCALL    079BH
0585H=MOV      C,11H
0587H=CPL      C
0588H=JNC      058FH
058AH=LCALL    0D5FH
058DH=SJMP     05BFH
```

```
058FH=SETB    0FH
0591H=MOV     C,0FH
0593H=CPL     C
0594H=CPL     C
0595H=JNC     05BFH
0597H=MOV     R7,#04H
0599H=MOV     R6,#E4H
059BH=MOV     27H,R7
059DH=MOV     28H,R6
059FH=ACALL   0427H
05A1H=ACALL   022FH
05A3H=LCALL   0D74H
05A6H=SJMP    05BDH
05A8H=LCALL   0A83H
05ABH=SETB    10H
05ADH=MOV     A,2CH
05AFH=CJNE    A,#01H,05B4H
05B2H=SJMP    05B7H
05B4H=CLR     C
05B5H=SJMP    05B8H
05B7H=SETB    C
05B8H=MOV     08H,C
05BAH=ACALL   0151H
05BCH=RET
05BDH=SJMP    0591H
05BFH=LCALL   0D74H
05C2H=SJMP    05F8H
05C4H=LCALL   0A83H
05C7H=LCALL   060FH
05CAH=JNB     E0H,05CFH
05CDH=SJMP    05D2H
05CFH=CLR     C
05D0H=SJMP    05D3H
05D2H=SETB    C
05D3H=MOV     0EH,C
05D5H=MOV     33H,#00H
05D8H=LCALL   069AH
05DBH=MOV     33H,#01H
05DEH=LCALL   06B4H
05E1H=MOV     DPTR,#0002H
05E4H=CLR     A
05E5H=MOVX    @DPTR,A
05E6H=JNB     11H,05F1H
05E9H=MOV     A,#12H
05EBH=MOV     DPTR,#0001H
05EEH=MOVX    @DPTR,A
05EFH=SJMP    05F7H
05F1H=MOV     A,#10H
05F3H=MOV     DPTR,#0001H
05F6H=MOVX    @DPTR,A
05F7H=RET
05F8H=LCALL   0904H
05FBH=AJMP    0248H
05FDH=AJMP    024CH
05FFH=AJMP    0250H
0601H=AJMP    0254H
0603H=AJMP    0256H
0605H=AJMP    0265H
0607H=AJMP    0267H
0609H=AJMP    026BH
060BH=AJMP    026FH
060DH=AJMP    0271H
060FH=JB      0DH,0622H
0612H=JB      11H,0622H
0615H=JB      .RXD,0615H
0618H=MOV     A,.P1
061AH=CLR     .INT1
061CH=JNB     .RXD,061CH
061FH=SETB    .INT1
0621H=RET
0622H=MOV     A,#00H
0624H=RET
0625H=JNB     .RXD,0625H
0628H=MOV     .P1,#FFH
062BH=SETB    A5H
062DH=CLR     .INT1
062FH=JB      .RXD,062FH
0632H=MOV     A,.P1
0634H=SETB    .INT1
0636H=RET
0637H=JB      09H,063DH
063AH=MOV     A,#00H
063CH=RET
063DH=MOV     .P0,#FFH
0640H=CLR     A5H
0642H=CLR     .TXD
0644H=JB      A7H,0644H
0647H=MOV     A,.P0
0649H=SETB    .TXD
064BH=SETB    A5H
064DH=JNB     A7H,064DH
0650H=RET
0651H=JB      0AH,0657H
0654H=MOV     A,#00H
0656H=RET
0657H=MOV     .P0,#FFH
065AH=CLR     A5H
065CH=CLR     .T1
065EH=JB      .T0,065EH
0661H=MOV     A,.P0
0663H=SETB    .T1
0665H=SETB    A5H
0667H=JNB     .T0,0667H
066AH=RET
066BH=JB      0DH,0681H
066EH=JB      11H,0681H
0671H=JB      .RXD,0671H
0674H=MOV     .P1,33H
0677H=CLR     .INT1
0679H=JNB     .RXD,0679H
067CH=MOV     .P1,#FFH
067FH=SETB    .INT1
0681H=RET
0682H=JNB     .RXD,0682H
```

```
0685H=CLR    A5H
0687H=MOV    .P1,33H
068AH=CLR    .INT1
068CH=JB     .RXD,068CH
068FH=MOV    .P1,#FFH
0692H=SETB   .INT1
0694H=SETB   A5H
0696H=JNB    .RXD,0696H
0699H=RET
069AH=JB     09H,069EH
069DH=RET
069EH=JNB    A7H,069EH
06A1H=MOV    .P0,33H
06A4H=SETB   A5H
06A6H=CLR    .TXD
06A8H=JB     A7H,06A8H
06ABH=MOV    .P0,#FFH
06AEH=SETB   .TXD
06B0H=JNB    A7H,06B0H
06B3H=RET
06B4H=JB     0AH,06B8H
06B7H=RET
06B8H=JNB    .T0,06B8H
06BBH=MOV    .P0,33H
06BEH=SETB   A5H
06C0H=CLR    .T1
06C2H=JB     .T0,06C2H
06C5H=MOV    .P0,#FFH
06C8H=SETB   .T1
06CAH=JNB    .T0,06CAH
06CDH=RET
06CEH=JB     0AH,06D4H
06D1H=ACALL  069AH
06D3H=RET
06D4H=JB     09H,06DAH
06D7H=ACALL  06B4H
06D9H=RET
06DAH=JNB    .T0,06DAH
06DDH=JNB    A7H,06DAH
06E0H=MOV    .P0,33H
06E3H=SETB   A5H
06E5H=CLR    .TXD
06E7H=CLR    .T1
06E9H=JB     .T0,06E9H
06ECH=JB     A7H,06E9H
06EFH=MOV    .P0,#FFH
06F2H=SETB   .TXD
06F4H=SETB   .T1
06F6H=JNB    .T0,06F6H
06F9H=JNB    A7H,06F6H
06FCH=RET
06FDH=JNB    0DH,074DH
0700H=MOV    R0,#05H
0702H=MOVX   A,@R0
0703H=JNB    E1H,0702H
0706H=MOV    R0,#11H
0708H=MOV    A,33H
070AH=MOVX   @R0,A
070BH=RET
070CH=MOV    R0,#05H
070EH=MOVX   A,@R0
070FH=JNB    E2H,070EH
0712H=MOV    R0,#10H
0714H=MOVX   A,@R0
0715H=MOV    33H,A
0717H=MOV    30H,A
0719H=RET
071AH=MOV    R0,#05H
071CH=MOVX   A,@R0
071DH=JNB    E3H,071CH
0720H=MOV    R0,#21H
0722H=MOV    A,33H
0724H=MOVX   @R0,A
0725H=RET
0726H=MOV    R0,#05H
0728H=MOVX   A,@R0
0729H=JNB    E3H,0728H
072CH=MOV    R0,#22H
072EH=MOV    A,33H
0730H=MOVX   @R0,A
0731H=RET
0732H=MOV    R0,#05H
0734H=MOVX   A,@R0
0735H=JNB    E3H,0734H
0738H=MOV    R0,#22H
073AH=MOV    A,33H
073CH=MOVX   @R0,A
073DH=RET
073EH=JNB    0DH,074DH
0741H=MOV    R0,#05H
0743H=MOVX   A,@R0
0744H=JNB    E4H,0743H
0747H=MOV    R0,#20H
0749H=MOVX   A,@R0
074AH=MOV    33H,A
074CH=RET
074DH=SJMP   074DH
074FH=MOV    R0,#01H
0751H=MOVX   A,@R0
0752H=ORL    A,#22H
0754H=MOVX   @R0,A
0755H=MOV    R0,#00H
0757H=MOVX   A,@R0
0758H=ORL    A,#01H
075AH=MOVX   @R0,A
075BH=MOV    R0,#01H
075DH=MOVX   A,@R0
075EH=ANL    A,#DFH
0760H=MOVX   @R0,A
0761H=RET
0762H=MOV    R0,#01H
0764H=MOVX   A,@R0
0765H=ORL    A,#20H
0767H=MOVX   @R0,A
```

```
0768H=MOV    R0,#00H
076AH=MOVX   A,@R0
076BH=ANL    A,#FEH
076DH=MOVX   @R0,A
076EH=MOV    R0,#01H
0770H=MOVX   A,@R0
0771H=ANL    A,#DDH
0773H=MOVX   @R0,A
0774H=RET
0775H=MOV    R0,#01H
0777H=MOVX   A,@R0
0778H=ORL    A,#20H
077AH=MOVX   @R0,A
077BH=MOV    R0,#00H
077DH=MOVX   A,@R0
077EH=ORL    A,#04H
0780H=MOVX   @R0,A
0781H=MOV    R0,#01H
0783H=MOVX   A,@R0
0784H=ANL    A,#DFH
0786H=MOVX   @R0,A
0787H=RET
0788H=MOV    R0,#01H
078AH=MOVX   A,@R0
078BH=ORL    A,#20H
078DH=MOVX   @R0,A
078EH=MOV    R0,#00H
0790H=MOVX   A,@R0
0791H=ANL    A,#FBH
0793H=MOVX   @R0,A
0794H=MOV    R0,#01H
0796H=MOVX   A,@R0
0797H=ANL    A,#DFH
0799H=MOVX   @R0,A
079AH=RET
079BH=MOV    R0,#01H
079DH=MOVX   A,@R0
079EH=ORL    A,#20H
07A0H=MOVX   @R0,A
07A1H=MOV    R0,#00H
07A3H=MOVX   A,@R0
07A4H=ORL    A,#02H
07A6H=MOVX   @R0,A
07A7H=MOV    R0,#01H
07A9H=MOVX   A,@R0
07AAH=ANL    A,#DFH
07ACH=MOVX   @R0,A
07ADH=RET
07AEH=MOV    R0,#01H
07B0H=MOVX   A,@R0
07B1H=ORL    A,#20H
07B3H=MOVX   @R0,A
07B4H=MOV    R0,#00H
07B6H=MOVX   A,@R0
07B7H=ANL    A,#FDH
07B9H=MOVX   @R0,A
07BAH=MOV    R0,#01H
07BCH=MOVX   A,@R0
07BDH=ANL    A,#DFH
07BFH=MOVX   @R0,A
07C0H=RET
07C1H=MOV    R0,#01H
07C3H=MOVX   A,@R0
07C4H=ORL    A,#01H
07C6H=MOVX   @R0,A
07C7H=RET
07C8H=MOV    R0,#01H
07CAH=MOVX   A,@R0
07CBH=ANL    A,#FEH
07CDH=MOVX   @R0,A
07CEH=MOV    R0,#02H
07D0H=MOVX   A,@R0
07D1H=ANL    A,#FBH
07D3H=MOVX   @R0,A
07D4H=RET
07D5H=MOV    R0,#01H
07D7H=MOVX   A,@R0
07D8H=ORL    A,#10H
07DAH=MOVX   @R0,A
07DBH=RET
07DCH=MOV    R0,#01H
07DEH=MOVX   A,@R0
07DFH=ANL    A,#EFH
07E1H=MOVX   @R0,A
07E2H=RET
07E3H=MOV    R0,#01H
07E5H=MOVX   A,@R0
07E6H=ORL    A,#04H
07E8H=MOVX   @R0,A
07E9H=RET
07EAH=MOV    R0,#01H
07ECH=MOVX   A,@R0
07EDH=ANL    A,#FBH
07EFH=MOVX   @R0,A
07F0H=RET
07F1H=MOV    R0,#01H
07F3H=MOV    A,33H
07F5H=MOVX   A,@R0
07F6H=RET
07F7H=MOV    R0,#01H
07F9H=MOVX   A,@R0
07FAH=MOV    33H,A
07FCH=RET
07FDH=MOV    R0,#02H
07FFH=MOV    A,33H
0801H=MOVX   @R0,A
0802H=RET
0803H=MOV    R0,#02H
0805H=MOVX   A,@R0
0806H=MOV    33H,A
0808H=RET
0809H=MOV    R0,#05H
080BH=MOVX   A,@R0
080CH=MOV    33H,A
```

```
080EH=RET
080FH=MOV     R0,#00H
0811H=MOVX    A,@R0
0812H=MOV     C,E2H
0814H=MOV     12H,C
0816H=RET
0817H=MOV     R0,#00H
0819H=MOVX    A,@R0
081AH=MOV     C,E1H
081CH=MOV     12H,C
081EH=RET
081FH=MOV     R0,#00H
0821H=MOVX    A,@R0
0822H=CLR     12H
0824H=JB      E1H,082AH
0827H=LJMP    0832H
082AH=JB      E2H,0830H
082DH=LJMP    0832H
0830H=SETB    12H
0832H=MOV     C,12H
0834H=RET
0835H=MOV     R0,#02H
0837H=MOVX    A,@R0
0838H=MOV     C,E4H
083AH=RET
083BH=MOV     R0,#02H
083DH=MOVX    A,@R0
083EH=MOV     C,E5H
0840H=RET
0841H=MOV     R0,#00H
0843H=MOVX    @R0,A
0844H=RET
0845H=MOV     R0,#05H
0847H=MOVX    A,@R0
0848H=JNB     E3H,0847H
084BH=MOV     R0,#24H
084DH=MOVX    A,@R0
084EH=MOV     C,E5H
0850H=CPL     C
0851H=MOV     12H,C
0853H=RET
0854H=MOV     DPTR,#4E00H
0857H=MOV     R0,#00H
0859H=MOVX    A,@R0
085AH=MOVX    @DPTR,A
085BH=INC     DPTR
085CH=INC     R0
085DH=MOVX    A,@R0
085EH=MOVX    @DPTR,A
085FH=INC     DPTR
0860H=INC     R0
0861H=MOVX    A,@R0
0862H=MOVX    @DPTR,A
0863H=INC     DPTR
0864H=INC     R0
0865H=MOVX    A,@R0
0866H=MOVX    @DPTR,A
0867H=INC     DPTR
0868H=MOV     R0,#10H
086AH=MOVX    A,@R0
086BH=MOVX    @DPTR,A
086CH=INC     DPTR
086DH=INC     R0
086EH=MOVX    A,@R0
086FH=MOVX    @DPTR,A
0870H=INC     DPTR
0871H=INC     R0
0872H=MOVX    A,@R0
0873H=MOVX    @DPTR,A
0874H=INC     DPTR
0875H=MOV     R0,#20H
0877H=MOVX    A,@R0
0878H=MOVX    @DPTR,A
0879H=INC     DPTR
087AH=INC     R0
087BH=MOVX    A,@R0
087CH=MOVX    @DPTR,A
087DH=INC     DPTR
087EH=INC     R0
087FH=MOVX    A,@R0
0880H=MOVX    @DPTR,A
0881H=INC     DPTR
0882H=INC     R0
0883H=MOVX    A,@R0
0884H=MOVX    @DPTR,A
0885H=INC     DPTR
0886H=INC     R0
0887H=MOVX    A,@R0
0888H=MOVX    @DPTR,A
0889H=MOV     C,12H
088BH=MOV     13H,C
088DH=MOV     DPTR,#4E00H
0890H=MOV     R0,#00H
0892H=MOVX    A,@DPTR
0893H=MOVX    @R0,A
0894H=INC     DPTR
0895H=INC     R0
0896H=MOVX    @DPTR,A
0897H=MOVX    A,@R0
0898H=INC     DPTR
0899H=INC     R0
089AH=MOVX    A,@DPTR
089BH=MOVX    @R0,A
089CH=INC     DPTR
089DH=INC     R0
089EH=MOVX    A,@DPTR
089FH=MOVX    @R0,A
08A0H=INC     DPTR
08A1H=MOV     R0,#10H
08A3H=MOVX    A,@R0
08A4H=MOVX    A,@DPTR
08A5H=MOVX    @R0,A
08A6H=INC     DPTR
08A7H=INC     R0
```

```
A8H=MOVX    A,@DPTR
A9H=MOVX    @R0,A
AAH=INC     DPTR
ABH=INC     R0
ACH=MOVX    A,@DPTR
ADH=MOVX    @R0,A
AEH=MOV     R0,#21H
B0H=MOV     C,13H
B2H=MOV     A,#FFH
B4H=JNC     08B8H
B6H=MOV     A,#00H
B8H=MOVX    @R0,A
B9H=INC     DPTR
BAH=MOV     R0,#20H
BCH=MOVX    A,@DPTR
BDH=MOVX    @R0,A
BEH=INC     DPTR
BFH=INC     R0
8C0H=MOVX   A,@DPTR
8C1H=MOVX   @R0,A
8C2H=INC    DPTR
8C3H=INC    R0
8C4H=MOVX   A,@DPTR
8C5H=MOVX   @R0,A
8C6H=INC    DPTR
8C7H=INC    R0
8C8H=MOVX   A,@DPTR
8C9H=MOVX   @R0,A
8CAH=MOV    26H,#43H
8CDH=LCALL  037CH
8D0H=MOV    26H,#45H
8D3H=LCALL  037CH
8D6H=RET
8D7H=MOV    26H,#52H
8DAH=LCALL  037CH
8DDH=MOV    26H,#45H
8E0H=LCALL  037CH
8E3H=RET
8E4H=LCALL  0625H
8E7H=MOV    32H,A
8E9H=MOV    A,08H
8EBH=ADD    A,32H
8EDH=MOV    08H,A
8EFH=LCALL  0625H
08F2H=MOV   31H,A
08F4H=MOV   A,08H
08F6H=ADD   A,31H
08F8H=MOV   08H,A
08FAH=RET
08FBH=ACALL 08E4H
08FDH=MOV   09H,31H
0900H=MOV   0AH,32H
0903H=RET
0904H=CLR   10H
0906H=CLR   0FH
0908H=MOV   33H,#05H
090BH=LCALL 0682H
090EH=MOV   33H,#00H
0911H=LCALL 0682H
0914H=MOV   33H,#00H
0917H=LCALL 0682H
091AH=LCALL 0625H
091DH=MOV   30H,A
091FH=LCALL 0625H
0922H=MOV   30H,A
0924H=LCALL 0625H
0927H=MOV   08H,A
0929H=MOV   0DH,08H
092CH=ACALL 08FBH
092EH=MOV   A,0DH
0930H=CJNE  A,#02H,0935H
0933H=SJMP  0943H
0935H=MOV   A,0DH
0937H=CJNE  A,#06H,093CH
093AH=SJMP  0981H
093CH=MOV   A,0DH
093EH=CJNE  A,#04H,0943H
0941H=AJMP  09FBH
0943H=MOV   10H,#01H
0946H=MOV   0FH,#00H
0949H=MOV   R7,09H
094BH=MOV   R6,0AH
094DH=DEC   R6
094EH=CJNE  R6,#FFH,0952H
0951H=DEC   R7
0952H=MOV   R5,0FH
0954H=MOV   R4,10H
0956H=MOV   A,R6
0957H=CLR   C
0958H=SUBB  A,R4
0959H=MOV   A,R7
095AH=SUBB  A,R5
095BH=JC    0972H
095DH=LCALL 0625H
0960H=ADD   A,08H
0962H=MOV   08H,A
0964H=MOV   R0,#10H
0966H=MOV   A,#01H
0968H=ADD   A,@R0
0969H=MOV   @R0,A
096AH=JNC   0970H
096CH=DEC   R0
096DH=CLR   A
096EH=ADDC  A,@R0
096FH=MOV   @R0,A
0970H=JNC   0949H
0972H=LCALL 0625H
0975H=MOV   R7,A
0976H=MOV   A,08H
0978H=CPL   A
0979H=INC   A
097AH=XRL   A,R7
097BH=JZ    097FH
097DH=SETB  10H
```

```
097FH=SJMP    0924H
0981H=LCALL   0625H
0984H=XRL     A,#00H
0986H=JZ      098AH
0988H=SETB    0FH
098AH=ACALL   08E4H
098CH=MOV     26H,31H
098FH=LCALL   0278H
0992H=LCALL   0D74H
0995H=SJMP    099BH
0997H=MOV     0BH,2CH
099AH=RET
099BH=MOV     26H,32H
099EH=LCALL   0278H
09A1H=LCALL   0D74H
09A4H=SJMP    09AAH
09A6H=MOV     0CH,2CH
09A9H=RET
09AAH=MOV     10H,#01H
09ADH=MOV     0FH,#00H
09B0H=MOV     R6,09H
09B2H=MOV     R7,0AH
09B4H=MOV     A,#04H
09B6H=LCALL   0DAAH
09B9H=MOV     R5,0FH
09BBH=MOV     R4,10H
09BDH=MOV     A,R7
09BEH=CLR     C
09BFH=SUBB    A,R4
09C0H=MOV     A,R6
09C1H=SUBB    A,R5
09C2H=JC      09ECH
09C4H=LCALL   0625H
09C7H=MOV     0EH,A
09C9H=MOV     26H,0EH
09CCH=LCALL   0278H
09CFH=MOV     A,08H
09D1H=ADD     A,0EH
09D3H=MOV     08H,A
09D5H=LCALL   0D74H
09D8H=SJMP    09DEH
09DAH=LCALL   0BB7H
09DDH=RET
09DEH=MOV     R0,#10H
09E0H=MOV     A,#01H
09E2H=ADD     A,@R0
09E3H=MOV     @R0,A
09E4H=JNC     09EAH
09E6H=DEC     R0
09E7H=CLR     A
09E8H=ADDC    A,@R0
09E9H=MOV     @R0,A
09EAH=JNC     09B0H
09ECH=LCALL   0625H
09EFH=MOV     R7,A
09F0H=MOV     A,08H
09F2H=CPL     A
09F3H=INC     A
09F4H=XRL     A,R7
09F5H=JZ      09F9H
09F7H=SETB    10H
09F9H=AJMP    0924H
09FBH=LCALL   0625H
09FEH=MOV     0EH,A
0A00H=MOV     A,08H
0A02H=ADD     A,0EH
0A04H=MOV     08H,A
0A06H=MOV     10H,#01H
0A09H=MOV     0FH,#00H
0A0CH=MOV     R6,09H
0A0EH=MOV     R7,0AH
0A10H=MOV     A,#02H
0A12H=LCALL   0DAAH
0A15H=MOV     R5,0FH
0A17H=MOV     R4,10H
0A19H=MOV     A,R7
0A1AH=CLR     C
0A1BH=SUBB    A,R4
0A1CH=MOV     A,R6
0A1DH=SUBB    A,R5
0A1EH=JC      0A35H
0A20H=LCALL   0625H
0A23H=ADD     A,08H
0A25H=MOV     08H,A
0A27H=MOV     R0,#10H
0A29H=MOV     A,#01H
0A2BH=ADD     A,@R0
0A2CH=MOV     @R0,A
0A2DH=JNC     0A33H
0A2FH=DEC     R0
0A30H=CLR     A
0A31H=ADDC    A,@R0
0A32H=MOV     @R0,A
0A33H=JNC     0A0CH
0A35H=LCALL   0625H
0A38H=MOV     R7,A
0A39H=MOV     A,08H
0A3BH=CPL     A
0A3CH=INC     A
0A3DH=XRL     A,R7
0A3EH=JZ      0A42H
0A40H=SETB    10H
0A42H=JNB     10H,0A47H
0A45H=ACALL   08CAH
0A47H=JNB     0FH,0A4CH
0A4AH=ACALL   08D7H
0A4CH=MOV     DPTR,#4001H
0A4FH=LCALL   0D9AH
0A52H=AJMP    0904H
0A54H=JNB     08H,0A5FH
0A57H=MOV     33H,2CH
0A5AH=LCALL   071AH
0A5DH=SJMP    0A65H
0A5FH=MOV     33H,#FFH
```

```
0A62H=LCALL   071AH
0A65H=JNB     0DH,0A6DH
0A68H=LCALL   073EH
0A6BH=MOV     2FH,A
0A6DH=RET
0A6EH=JNB     0DH,0A77H
0A71H=MOV     33H,2EH
0A74H=LCALL   06FDH
0A77H=LCALL   070CH
0A7AH=MOV     30H,A
0A7CH=JNB     08H,0A82H
0A7FH=MOV     2CH,30H
0A82H=RET
0A83H=SETB    08H
0A85H=RET
0A86H=CLR     08H
0A88H=RET
0A89H=MOV     31H,2CH
0A8CH=RET
0A8DH=MOV     32H,2CH
0A90H=JNB     08H,0A96H
0A93H=LCALL   074FH
0A96H=LCALL   0637H
0A99H=JNB     E0H,0A9EH
0A9CH=SJMP    0AA1H
0A9EH=CLR     C
0A9FH=SJMP    0AA2H
0AA1H=SETB    C
0AA2H=CPL     C
0AA3H=ANL     C,0BH
0AA5H=MOV     09H,C
0AA7H=LCALL   0651H
0AAAH=JNB     E0H,0AAFH
0AADH=SJMP    0AB2H
0AAFH=CLR     C
0AB0H=SJMP    0AB3H
0AB2H=SETB    C
0AB3H=CPL     C
0AB4H=ANL     C,0CH
0AB6H=MOV     0AH,C
0AB8H=LCALL   0841H
0ABBH=MOV     C,0BH
0ABDH=CPL     C
0ABEH=JNC     0AC3H
0AC0H=LCALL   0775H
0AC3H=MOV     C,0CH
0AC5H=CPL     C
0AC6H=JNC     0ACBH
0AC8H=LCALL   079BH
0ACBH=CLR     A
0ACCH=MOV     C,08H
0ACEH=RLC     A
0ACFH=MOV     33H,A
0AD1H=LCALL   066BH
0AD4H=MOV     C,08H
0AD6H=ORL     C,11H
0AD8H=MOV     0DH,C
0ADAH=JNB     08H,0AE2H
0ADDH=MOV     R0,#31H
0ADFH=LCALL   0DA1H
0AE2H=RET
0AE3H=ACALL   0A83H
0AE5H=LCALL   0637H
0AE8H=MOV     C,0BH
0AEAH=CPL     C
0AEBH=MOV     R7,A
0AECH=CLR     A
0AEDH=RLC     A
0AEEH=ORL     A,R7
0AEFH=MOV     30H,A
0AF1H=LCALL   0651H
0AF4H=MOV     C,0CH
0AF6H=CPL     C
0AF7H=MOV     R7,A
0AF8H=CLR     A
0AF9H=RLC     A
0AFAH=ORL     A,R7
0AFBH=ANL     A,30H
0AFDH=MOV     30H,A
0AFFH=LCALL   0841H
0B02H=JNB     0BH,0B0DH
0B05H=LCALL   080FH
0B08H=CPL     C
0B09H=MOV     09H,C
0B0BH=SJMP    0B10H
0B0DH=LCALL   0775H
0B10H=JNB     0CH,0B1BH
0B13H=LCALL   0817H
0B16H=CPL     C
0B17H=MOV     0AH,C
0B19H=SJMP    0B1EH
0B1BH=LCALL   079BH
0B1EH=MOV     33H,30H
0B21H=LCALL   066BH
0B24H=RET
0B25H=ACALL   0A86H
0B27H=RET
0B28H=LCALL   060FH
0B2BH=MOV     2DH,A
0B2DH=MOV     C,08H
0B2FH=CPL     C
0B30H=JNC     0B35H
0B32H=MOV     2CH,#00H
0B35H=MOV     R0,#27H
0B37H=LCALL   0DA1H
0B3AH=MOV     30H,.ACC
0B3DH=MOV     33H,30H
0B40H=LCALL   06CEH
0B43H=RET
0B44H=LCALL   0637H
0B47H=MOV     2DH,A
0B49H=LCALL   0651H
0B4CH=MOV     31H,A
0B4EH=MOV     C,08H
```

```
0B50H=CPL    C
0B51H=JNC    0B56H
0B53H=MOV    2CH,#00H
0B56H=MOV    R0,#27H
0B58H=LCALL  0DA1H
0B5BH=MOV    30H,.ACC
0B5EH=MOV    33H,30H
0B61H=LCALL  066BH
0B64H=RET
0B65H=LCALL  060FH
0B68H=MOV    2DH,A
0B6AH=LCALL  060FH
0B6DH=MOV    2EH,A
0B6FH=MOV    C,08H
0B71H=CPL    C
0B72H=JNC    0B77H
0B74H=MOV    2CH,#00H
0B77H=MOV    R0,#27H
0B79H=LCALL  0DA1H
0B7CH=MOV    33H,2EH
0B7FH=LCALL  06CEH
0B82H=MOV    33H,2FH
0B85H=LCALL  06CEH
0B88H=RET
0B89H=LCALL  0637H
0B8CH=MOV    2DH,A
0B8EH=LCALL  0637H
0B91H=MOV    2EH,A
0B93H=LCALL  0651H
0B96H=MOV    31H,A
0B98H=LCALL  0651H
0B9BH=MOV    32H,A
0B9DH=MOV    C,08H
0B9FH=CPL    C
0BA0H=JNC    0BA5H
0BA2H=MOV    2CH,#00H
0BA5H=MOV    R0,#27H
0BA7H=LCALL  0DA1H
0BAAH=MOV    33H,2EH
0BADH=LCALL  066BH
0BB0H=MOV    33H,2FH
0BB3H=LCALL  066BH
0BB6H=RET
0BB7H=MOV    C,08H
0BB9H=CPL    C
0BBAH=JNC    0BBEH
0BBCH=SJMP   0BD6H
0BBEH=MOV    R7,0BH
0BC0H=MOV    R6,0CH
0BC2H=MOV    R5,#0FH
0BC4H=MOV    R4,#FFH
0BC6H=MOV    A,R6
0BC7H=SETB   C
0BC8H=SUBB   A,R4
0BC9H=MOV    A,R7
0C45H=MOV    30H,A
0C47H=MOVX   A,@DPTR
0C48H=CJNE   A,30H,0C86H
0C4BH=JNB    E7H,0C3EH
0C4EH=MOV    DPTR,#1004H
0C51H=MOV    R0,A
0C52H=MOV    A,#01H
0C54H=MOV    R1,A
0C55H=ORL    A,#40H
0C57H=MOV    .DPH,A
0C59H=MOV    A,R0
0C5AH=MOVX   @DPTR,A
0C5BH=MOV    30H,A
0C5DH=MOVX   A,@DPTR
0C5EH=CJNE   A,30H,0C86H
0C61H=MOV    A,R1
0C62H=RL     A
0C63H=JNB    E4H,0C54H
0C66H=MOV    .IE,#83H
0C69H=MOV    .IP,#00H
0C6CH=MOV    DPTR,#400FH
0C6FH=MOV    A,#02H
0C71H=MOVX   @DPTR,A
0C72H=MOV    A,#40H
0C74H=INC    DPTR
0C75H=MOVX   @DPTR,A
0C76H=MOV    A,#0FH
0C78H=INC    DPTR
0C79H=MOVX   @DPTR,A
0C7AH=MOV    R0,#02H
0C7CH=MOVX   A,@R0
0C7DH=ANL    A,#F8H
0C7FH=MOVX   @R0,A
0C80H=MOV    A,#10H
0C82H=MOV    R0,#01H
0C84H=MOVX   @R0,A
0C85H=RET
0C86H=CLR    A0H
0C88H=CLR    A1H
0C8AH=SJMP   0C8AH
0C8CH=LCALL  07C8H
0C8FH=MOVX   @R0,A
0C90H=MOV    R0,#02H
0C92H=MOVX   A,@R0
0C93H=JB     E2H,0C8CH
0C96H=MOV    R0,#01H
0C98H=MOV    A,#10H
0C9AH=MOVX   @R0,A
0C9BH=MOV    08H,#FFH
0C9EH=LCALL  0CAEH
0CA1H=MOV    08H,#AAH
0CA4H=LCALL  0CAEH
0CA7H=MOV    08H,#CCH
0CAAH=LCALL  0CAEH
0CADH=RET
0CAEH=CLR    00H
0CB0H=MOV    DPTR,#4000H
0CB3H=LCALL  0CF0H
0CB6H=MOV    DPTR,#4000H
```

```
CAH=SUBB    A,R5                    0C43H=XCH    A,R0
CBH=JC      0BD6H                   0C44H=MOVX   @DPTR,A
CDH=MOV     .DPH,0BH                0CB9H=LCALL  0CFDH
D0H=MOV     .DPL,0CH                0CBCH=LCALL  0D06H
D3H=MOV     A,2CH                   0CBFH=JB     00H,0CC9H
D5H=MOVX    @DPTR,A                 0CC2H=SETB   00H
D6H=MOV     R0,#0BH                 0CC4H=MOV    DPTR,#4001H
D8H=LCALL   0DBCH                   0CC7H=SJMP   0CB9H
DBH=RET                             0CC9H=CLR    00H
DCH=MOV     .PSW,#00H               0CCBH=MOV    DPTR,#4000H
DFH=MOV     .SP,#4DH                0CCEH=MOV    R3,#20H
E2H=MOV     .P0,#FFH                0CD0H=MOV    R2,#FFH
E5H=MOV     .P1,#FFH                0CD2H=MOV    A,#01H
E8H=MOV     .P3,#FFH                0CD4H=MOVX   @DPTR,A
EBH=MOV     .P2,#BFH                0CD5H=MOV    30H,A
EEH=CLR     A                       0CD7H=MOVX   A,@DPTR
EFH=MOV     R0,#04H                 0CD8H=CJNE   A,30H,0D20H
F1H=MOVX    @R0,A                   0CDBH=RL     A
F2H=LCALL   0D4EH                   0CDCH=JNB    E0H,0CD4H
F5H=LJMP    051CH                   0CDFH=INC    DPTR
F8H=MOV     A,#00H                  0CE0H=INC    DPTR
FAH=MOV     DPTR,#3FFFH             0CE1H=DJNZ   R2,0CD2H
FDH=MOV     R3,#40H                 0CE3H=DJNZ   R3,0CD0H
FFH=MOV     R2,#FFH                 0CE5H=JB     00H,0CEFH
01H=INC     DPTR                    0CE8H=SETB   00H
02H=MOVX    @DPTR,A                 0CEAH=MOV    DPTR,#4001H
03H=DJNZ    R2,0C01H                0CEDH=SJMP   0CCEH
05H=DJNZ    R3,0BFFH                0CEFH=RET
07H=MOV     R0,#02H                 0CF0H=MOV    R3,#40H
09H=MOVX    A,@R0                   0CF2H=MOV    R2,#FFH
0AH=JNB     E2H,0C10H               0CF4H=MOV    A,08H
0DH=LCALL   0C8CH                   0CF6H=MOVX   @DPTR,A
10H=MOV     DPTR,#4000H             0CF7H=INC    DPTR
13H=MOV     A,#01H                  0CF8H=DJNZ   R2,0CF6H
15H=CLR     00H                     0CFAH=DJNZ   R3,0CF2H
17H=MOVX    @DPTR,A                 0CFCH=RET
18H=MOV     30H,A                   0CFDH=MOV    R2,#FFH
1AH=MOVX    A,@DPTR                 0CFFH=MOV    R4,#FFH
1BH=CJNE    A,30H,0C2CH             0D01H=DJNZ   R4,0D01H
1EH=RL      A                       0D03H=DJNZ   R2,0CFFH
1FH=JNB     E0H,0C17H               0D05H=RET
22H=JB      00H,0C37H               0D06H=MOV    R3,#20H
25H=SETB    00H                     0D08H=MOV    R2,#FFH
27H=MOV     DPTR,#4001H             0D0AH=MOVX   A,@DPTR
2AH=SJMP    0C17H                   0D0BH=CJNE   A,08H,0D20H
2CH=JNB     00H,0C33H               0D0EH=LCALL  0D18H
2FH=CLR     A1H                     0D11H=INC    DPTR
31H=SJMP    0C31H                   0D12H=INC    DPTR
33H=CLR     A0H                     0D13H=DJNZ   R2,0D0AH
35H=SJMP    0C35H                   0D15H=DJNZ   R3,0D08H
37H=MOV     DPTR,#4000H             0D17H=RET
3AH=MOV     A,#01H                  0D18H=JNB    .INT0,0D1CH
3CH=MOV     R0,#01H                 0D1BH=RET
3EH=XCH     A,R0                    0D1CH=CLR    A2H
3FH=INC     R0                      0D1EH=SJMP   0D1EH
0H=RL       A                       0D20H=JNB    00H,0D27H
1H=MOV      .DPL,A                  0D23H=CLR    A1H
```

```
0D25H=SJMP    0D25H
0D27H=CLR     A0H
0D29H=SJMP    0D29H
0D2BH=MOV     .TCON,#00H
0D2EH=LCALL   07C1H
0D31H=MOV     .SP,11H
0D34H=CLR     03H
0D36H=LCALL   0467H
0D39H=CLR     00H
0D3BH=LCALL   07C8H
0D3EH=RETI
0D3FH=MOV     R0,#05H
0D41H=MOVX    A,@R0
0D42H=JNB     E0H,0D4BH
0D45H=MOV     R0,#01H
0D47H=MOVX    A,@R0
0D48H=ORL     A,#01H
0D4AH=MOVX    @R0,A
0D4BH=LCALL   400FH
0D4EH=RETI
0D4FH=LCALL   4006H
0D52H=RETI
0D53H=LCALL   4003H
0D56H=RETI
0D57H=LCALL   4009H
0D5AH=RETI
0D5BH=LCALL   400CH
0D5EH=RETI
0D5FH=MOV     DPTR,#4015H
0D62H=MOV     A,#02H
0D64H=MOVX    @DPTR,A
0D65H=INC     DPTR
0D66H=LCALL   070CH
0D69H=MOVX    @DPTR,A
0D6AH=INC     DPTR
0D6BH=LCALL   070CH
0D6EH=MOVX    @DPTR,A
0D6FH=LCALL   4015H
0D72H=SJMP    0D5FH
0D74H=MOV     R0,.SP
0D76H=MOV     .DPH,@R0
0D78H=DEC     R0
0D79H=MOV     .DPL,@R0
0D7BH=INC     DPTR
0D7CH=INC     DPTR
0D7DH=MOV     33H,.DPH
0D80H=LCALL   06FDH
0D83H=LCALL   070CH
0D86H=MOV     33H,.DPL
0D89H=LCALL   06FDH
0D8CH=LCALL   070CH
0D8FH=CLR     A
0D90H=JMP     @A+DPTR
0D91H=CLR     A
0D92H=MOVC    A,@A+DPTR
0D93H=MOV     .B,A
0D95H=MOV     A,#01H
0D97H=MOVC    A,@A+DPTR
0D98H=SJMP    0DA5H
0D9AH=MOVX    A,@DPTR
0D9BH=MOV     .B,A
0D9DH=INC     DPTR
0D9EH=MOVX    A,@DPTR
0D9FH=SJMP    0DA5H
0DA1H=MOV     .B,@R0
0DA3H=INC     R0
0DA4H=MOV     A,@R0
0DA5H=PUSH    .ACC
0DA7H=PUSH    .B
0DA9H=RET
0DAAH=JZ      0DB3H
0DACH=CPL     A
0DADH=INC     A
0DAEH=ADD     A,R7
0DAFH=MOV     R7,A
0DB0H=JC      0DB3H
0DB2H=DEC     R6
0DB3H=RET
0DB4H=INC     R0
0DB5H=DEC     @R0
0DB6H=CJNE    @R0,#FFH,0DBBH
0DB9H=DEC     R0
0DBAH=DEC     @R0
0DBBH=RET
0DBCH=INC     R0
0DBDH=INC     @R0
0DBEH=CJNE    @R0,#00H,0DC3H
0DC1H=DEC     R0
0DC2H=INC     @R0
0DC3H=RET
*exit
```

What is claimed is:

1. A parallel processor array comprising:
a plurality of processing elements, each comprising:
a processor having an arithmetic logic unit, control store, program sequences and instruction decoder;
a read/write memory associated with said processor;
an input/output means associated with said processor and read/write memory;
means for interconnecting said processing elements in a binary tree in which each processing element except those at extremities of the binary tree is connected to one parent processing element and at least first and second child processing elements;
said input/output means comprising:
means for broadcasting information received from a parent processing element to said child processing elements, such that common information is distributed to each processing element of the binary tree or a subtree thereof without direct control of the processors of the processing elements; and
means for determining a priority among respective values of information received from said child processing elements and information received from the processor with which said input/output means is associated without direct control of the processors of the processing elements;

wherein the input/output means of the processing elements connected in said binary tree cooperate so that information is broadcast from a first parent processing element to the child processing elements in said binary tree or subtree that are most remote from said first parent processing element, and a priority is determined among values of information at each processing element in said binary tree or subtree, each in a time on the order of the logarithm of the number of processing elements in said binary tree or subtree multiplied by the time for the broadcasting of information from a parent processing element to child processing elements connected thereto, and the time required to determine priority amoung values of information received from the processor of a processing element and the child processing elements connected thereto, respectively.

2. The apparatus of claim 1 wherein said broadcasting means comprises:

register having a serial data input and an output to said processor, flip-flop, first means for applying data signals simultaneously to said serial data input and said flip-flop, and second means for applying data signals from said flip-flop to said first means in first and second child processing elements, whereby data signals are propagated through the binary tree or subtree by means of the flip-flops of the processing elements of the binary tree or subtree.

3. The apparatus of claim 2 further comprising:

means for generating a register full signal when said register is full and means for disabling the transmission of additional data to said plurality of processing elements while said register full signal is being generated.

4. The apparatus of claim 1 wherein the determining means comprises:

first, second and third register, said first register storing data associated with said processing element and said second and third registers storing data associated with said first and second child processing elements, a comparator for comparing the data stored in said first, second and third registers to select a winning data in accordance with a predetermined priority, and means for reporting said winning data to one of said second or third registers in a parent processing element.

5. The apparatus of claim 4 further comprising means for disabling each processing element whose data is not selected a winning data, as a result of which every processing element except one is disabled by the time the winning data is reported to the first parent processing element in the binary tree or subtree.

6. The apparatus of claim 5 further comprising means for reporting to the first parent processing element in the binary tree information stored by the processing element that is not disabled.

7. The apparatus of claim 1 further comprising means for subdividing the binary tree into a plurality of sub-trees.

8. The apparatus of claim 7 wherein each sub-tree is operated in a single instruction multiple data mode and the plurality of sub-trees are operated in a multiple instruction multiple data mode.

9. The apparatus of claim 7 wherein at least two of the sub-trees execute identical programs on identical data and the results of such program execution are compared to detect faults in the sub-trees.

* * * * *

UNITED STATES PATENT AND TRADEMARK OFFICE
CERTIFICATE OF CORRECTION

PATENT NO. : 4,860,201
DATED : August 22, 1989
INVENTOR(S) : Salvatore J. Stolfo et al It is certified that error appears in the above-identified patent and that said Letters Patent is hereby corrected as shown below:

Title page, Page 2, under OTHER PUBLICATIONS,
first column, third from bottom line, "Algorighms" should read -- Algorithms --; second column, seventh line, "Simultanieous" should read -- Simultaneous --. Col. 2, line 68, before "Thus" insert a period (.). Col. 4, line 29, "5.Searching ..." should start a new paragraph. Col. 7, line 49, "principle" should read -- principal --. Col. 12, line 20, "te" should read -- the --; penultimate line, "broadcast157" should read -- broadcast --. Col. 13, line 4, "read" should read -- ready --; line 63, "I/O)" should read -- I/O --. Col. 17, line 64 "MIMC_RC" should read -- MIMD_RC --. Col. 19, line 51, after "to" insert -- a --. Col. 20, line 13, "$B_{13}RC$" should read -- B_RC --. Col. 22, line 3, "numbered" should read -- number --. Col. 27, line 5, "subtrees T" should read -- subtrees.  T --; line 20, after "Sub-tree" insert -- 2 --.

UNITED STATES PATENT AND TRADEMARK OFFICE
CERTIFICATE OF CORRECTION

PATENT NO. : 4,860,201

DATED : August 22, 1989

INVENTOR(S) : Salvatore J. Stolfo et al

It is certified that error appears in the above-identified patent and that said Letters Patent is hereby corrected as shown below:

Col. 29, line 23, "meand" should read -- means --; line 24, after "carry" insert -- bit --. Col. 30, line 48, "the goto" should read -- then goto --; line 59, "MIND" should read -- MIMD --. Col. 31, lines 29-30, "communicatlons" should read -- communications --. Col. 32, line 16, "P(s" should read -- PEs --. Col. 72, line 6 "register" (first occurrence) should read -- registers --; line 18, "selected a" should read -- selected as --.

Signed and Sealed this

Eleventh Day of December, 1990

Attest:

HARRY F. MANBECK, JR.

*Attesting Officer*          *Commissioner of Patents and Trademarks*